US012535581B2

(12) United States Patent
Ono et al.

(10) Patent No.: US 12,535,581 B2
(45) Date of Patent: *Jan. 27, 2026

(54) DISTANCE MEASURING DEVICE AND DISTANCE MEASURING METHOD

(71) Applicant: SONY SEMICONDUCTOR SOLUTIONS CORPORATION, Kanagawa (JP)

(72) Inventors: Hiroaki Ono, Kanagawa (JP); Takashi Kusakari, Kanagawa (JP); Takuro Kamiya, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 1099 days.

This patent is subject to a terminal disclaimer.

(21) Appl. No.: 17/431,685

(22) PCT Filed: Feb. 10, 2020

(86) PCT No.: PCT/JP2020/005028
§ 371 (c)(1),
(2) Date: Aug. 17, 2021

(87) PCT Pub. No.: WO2020/175117
PCT Pub. Date: Sep. 3, 2020

(65) Prior Publication Data
US 2022/0137215 A1    May 5, 2022

(30) Foreign Application Priority Data
Feb. 25, 2019   (JP) .................. 2019-032073

(51) Int. Cl.
G01S 17/18    (2020.01)
G01S 7/4861   (2020.01)
(Continued)

(52) U.S. Cl.
CPC ............ G01S 17/18 (2020.01); G01S 7/4861 (2013.01); G01S 7/4865 (2013.01); G01S 17/89 (2013.01)

(58) Field of Classification Search
CPC ...... G01S 17/18; G01S 7/4861; G01S 7/4865; G01S 17/89
See application file for complete search history.

(56) References Cited

U.S. PATENT DOCUMENTS 5,694,130 A      12/1997  Suzuki et al.
10,996,320 B2 *   5/2021  Aoki .................... G01S 7/4914
(Continued)

FOREIGN PATENT DOCUMENTS

CN    107852472 A    3/2018
CN    110832346 A    2/2020
(Continued)

OTHER PUBLICATIONS

International Search Report and Written Opinion of PCT Application No. PCT/JP2020/005028, issued on May 12, 2020, 09 pages of ISRWO.

Primary Examiner — Isam A Alsomiri
Assistant Examiner — Benjamin Wade Clouser
(74) Attorney, Agent, or Firm — CHIP LAW GROUP

(57) ABSTRACT

Provided is a distance measuring device including a light emitting unit that emits irradiation light, a light receiving unit that receives reflected light of the irradiation light reflected by an object, a calculation unit that calculates a distance to the object, on the basis of the time from emission of the irradiation light to reception of the reflected light, and a control unit that controls the light emitting unit and the light receiving unit. The control unit controls first imaging that causes the light receiving unit to perform exposure for a first exposure time, and second imaging that causes the light receiving unit to perform exposure for a second expo-
(Continued)

sure time. The calculation unit calculates the distance, using a signal obtained by the first imaging and a signal obtained by the second imaging. The present technology can be applied to a distance measuring device that measures a distance to a predetermined object, for example.

12 Claims, 46 Drawing Sheets

(51) Int. Cl.
*G01S 7/4865* (2020.01)
*G01S 17/89* (2020.01)

(56) References Cited

U.S. PATENT DOCUMENTS

| | | | |
|---|---|---|---|
| 2006/0114333 A1* | 6/2006 | Gokturk | G01S 7/4868 348/222.1 |
| 2017/0195604 A1* | 7/2017 | Shen | H04N 25/78 |
| 2018/0108145 A1* | 4/2018 | Miura | H04N 13/344 |
| 2019/0109972 A1 | 4/2019 | Hitomi | |

FOREIGN PATENT DOCUMENTS

| | | | | |
|---|---|---|---|---|
| JP | 08-189965 A | 7/1996 | | |
| JP | 2016-090268 A | 5/2016 | | |
| JP | 2017-528714 A | 9/2017 | | |
| KR | 10-2019-0019035 A | 2/2019 | | |
| WO | 2006/088722 A2 | 8/2006 | | |
| WO | WO-2016040271 A1 * | 3/2016 | | G06F 3/017 |
| WO | 2017/217240 A1 | 12/2017 | | |
| WO | 2019/012756 A1 | 1/2019 | | |

\* cited by examiner

FIG. 17

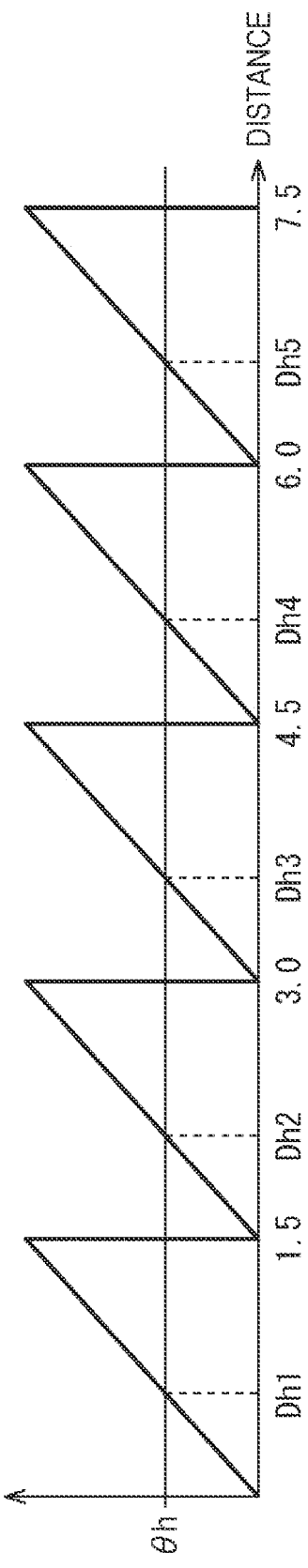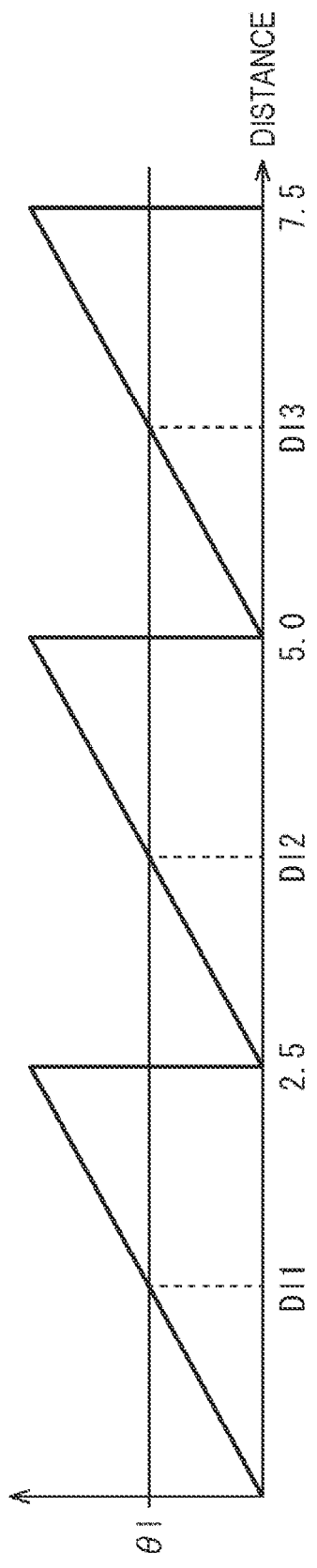

DISTANCE MEASURING DEVICE AND DISTANCE MEASURING METHOD

CROSS REFERENCE TO RELATED APPLICATIONS

This application is a U.S. National Phase of International Patent Application No. PCT/JP2020/005028 filed on Feb. 10, 2020, which claims priority benefit of Japanese Patent Application No. JP 2019-032073 filed in the Japan Patent Office on Feb. 25, 2019. Each of the above-referenced applications is hereby incorporated herein by reference in its entirety.

TECHNICAL FIELD

The present technology relates to a distance measuring device, a distance measuring method, and a program, and more particularly, to a distance measuring device, a distance measuring method, and a program for enabling distance measurement with a long measurable range, for example.

BACKGROUND ART

In recent years, distance measuring devices that measure distances to objects have become smaller and smaller with the progress of semiconductor technology. As a result, distance measuring devices are actually mounted on mobile terminals such as so-called smartphones, which are small information processing devices having communication functions, for example. Examples of distance measuring devices (sensors) that measure distances to objects include a time of flight (TOF) sensor (see Patent Document 1, for example).

CITATION LIST

Patent Document

Patent Document 1: Japanese Patent Application Laid-Open No. 2016-090268

SUMMARY OF THE INVENTION

Problems to be Solved by the Invention

As a distance measuring method for a distance measuring device, an indirect TOF method is known. A distance measuring system that implements the indirect TOF method measures the distance to an object, using the amount of charge generated by receiving the light reflected by the object when active light emitted from a light emitting diode (LED) or a laser that repeatedly emits light with a predetermined pulse width reaches the object.

Because the measurable distance range is limited by the frequency of the active light, extension of the measurable distance range is desired. Improvement of a so-called dynamic range that enables distance measurement without saturation is also desired.

The present technology has been made in view of such circumstances, and aims to extend the measurable distance range and enable distance measurement with an improved dynamic range.

Solutions to Problems

A first distance measuring device according to one aspect of the present technology includes: a light emitting unit that emits irradiation light; a light receiving unit that receives reflected light of the irradiation light reflected by an object; a calculation unit that calculates a distance to the object, on the basis of the time from emission of the irradiation light to reception of the reflected light; and a control unit that controls the light emitting unit and the light receiving unit. The control unit controls first imaging that causes the light receiving unit to perform exposure for a first exposure time, and second imaging that causes the light receiving unit to perform exposure for a second exposure time. The calculation unit calculates the distance, using a signal obtained by the first imaging and a signal obtained by the second imaging.

In a first distance measuring method according to one aspect of the present technology, a distance measuring device that performs distance measurement includes: a light emitting unit that emits irradiation light; a light receiving unit that receives reflected light of the irradiation light reflected by an object; a calculation unit that calculates a distance to the object, on the basis of the time from emission of the irradiation light to reception of the reflected light; and a control unit that controls the light emitting unit and the light receiving unit. The control unit controls first imaging that causes the light receiving unit to perform exposure for a first exposure time, and second imaging that causes the light receiving unit to perform exposure for a second exposure time. The calculation unit calculates the distance, using a signal obtained by the first imaging and a signal obtained by the second imaging.

A program according to one aspect of the present technology is to be executed by a computer of a distance measuring device that includes: a light emitting unit that emits irradiation light; a light receiving unit that receives reflected light of the irradiation light reflected by an object; a calculation unit that calculates a distance to the object, on the basis of the time from emission of the irradiation light to reception of the reflected light; and a control unit that controls the light emitting unit and the light receiving unit. The program causes the computer to perform a process including steps in which the control unit controls first imaging that causes the light receiving unit to perform exposure for a first exposure time, and second imaging that causes the light receiving unit to perform exposure for a second exposure time, and the calculation unit calculates the distance, using a signal obtained by the first imaging and a signal obtained by the second imaging.

A second distance measuring device according to one aspect of the present technology includes: a light emitting unit that emits irradiation light; a light receiving unit that receives reflected light of the irradiation light reflected by an object; a calculation unit that calculates a distance to the object, on the basis of the time from emission of the irradiation light to reception of the reflected light; and a control unit that controls the light emitting unit and the light receiving unit. The control unit controls first imaging that causes the light emitting unit to emit light at a first duty ratio, and second imaging that causes the light receiving unit to emit light at a second duty ratio that is lower than the first duty ratio. The calculation unit calculates the distance, using a signal obtained by the first imaging and a signal obtained by the second imaging.

In a second distance measuring method according to one aspect of the present technology, a distance measuring device that performs distance measurement includes: a light emitting unit that emits irradiation light; a light receiving unit that receives reflected light of the irradiation light reflected by an object; a calculation unit that calculates a distance to the object, on the basis of the time from emission of the irradiation light to reception of the reflected light; and a control unit that controls the light emitting unit and the light receiving unit. The control unit controls first imaging that causes the light emitting unit to emit light at a first duty ratio, and second imaging that causes the light receiving unit to emit light at a second duty ratio that is lower than the first duty ratio. The calculation unit calculates the distance, using a signal obtained by the first imaging and a signal obtained by the second imaging.

A third distance measuring device according to one aspect of the present technology includes: a light emitting unit that emits irradiation light; a light receiving unit that receives reflected light of the irradiation light reflected by an object; a calculation unit that calculates a distance to the object, on the basis of the time from emission of the irradiation light to reception of the reflected light; and a control unit that controls the light emitting unit and the light receiving unit. The control unit controls first imaging that causes the light emitting unit to emit light at a first emission intensity, and second imaging that causes the light receiving unit to emit light at a second emission intensity that is lower than the first emission intensity. The calculation unit calculates the distance, using a signal obtained by the first imaging and a signal obtained by the second imaging.

In a third distance measuring method according to one aspect of the present technology, a distance measuring device that performs distance measurement includes: a light emitting unit that emits irradiation light; a light receiving unit that receives reflected light of the irradiation light reflected by an object; a calculation unit that calculates a distance to the object, on the basis of the time from emission of the irradiation light to reception of the reflected light; and a control unit that controls the light emitting unit and the light receiving unit. The control unit controls first imaging that causes the light emitting unit to emit light at a first emission intensity, and second imaging that causes the light receiving unit to emit light at a second emission intensity that is lower than the first emission intensity. The calculation unit calculates the distance, using a signal obtained by the first imaging and a signal obtained by the second imaging.

In the first distance measuring device, the first distance measuring method, and the program according to one aspect of the present technology, the distance measuring device includes: a light emitting unit that emits irradiation light; a light receiving unit that receives reflected light of the irradiation light reflected by an object; a calculation unit that calculates a distance to the object, on the basis of the time from emission of the irradiation light to reception of the reflected light; and a control unit that controls the light emitting unit and the light receiving unit. The control unit controls first imaging that causes the light receiving unit to perform exposure for a first exposure time, and second imaging that causes the light receiving unit to perform exposure for a second exposure time. The calculation unit calculates the distance, using a signal obtained by the first imaging and a signal obtained by the second imaging.

In the second distance measuring device and the second distance measuring method according to one aspect of the present technology, the distance measuring device includes: a light emitting unit that emits irradiation light; a light receiving unit that receives reflected light of the irradiation light reflected by an object; a calculation unit that calculates a distance to the object, on the basis of the time from emission of the irradiation light to reception of the reflected light; and a control unit that controls the light emitting unit and the light receiving unit. The control unit controls first imaging that causes the light emitting unit to emit light at a first duty ratio, and second imaging that causes the light receiving unit to emit light at a second duty ratio that is lower than the first duty ratio. The calculation unit calculates the distance, using a signal obtained by the first imaging and a signal obtained by the second imaging.

In the third distance measuring device and the third distance measuring method according to one aspect of the present technology, the distance measuring device includes: a light emitting unit that emits irradiation light; a light receiving unit that receives reflected light of the irradiation light reflected by an object; a calculation unit that calculates a distance to the object, on the basis of the time from emission of the irradiation light to reception of the reflected light; and a control unit that controls the light emitting unit and the light receiving unit. The control unit controls first imaging that causes the light emitting unit to emit light at a first emission intensity, and second imaging that causes the light receiving unit to emit light at a second emission intensity that is lower than the first emission intensity. The calculation unit calculates the distance, using a signal obtained by the first imaging and a signal obtained by the second imaging.

Note that the distance measuring device may be an independent device, or may be an internal block forming a single device.

Further, the program to be provided may be transmitted via a transmission medium or may be recorded on a recording medium.

BRIEF DESCRIPTION OF DRAWINGS

FIG. 17 is a chart for explaining the relationship between detection periods and detection signals.

FIGS. 20A and 20B are charts for explaining a measurable distance range.

MODES FOR CARRYING OUT THE INVENTION

The following is a description of modes (hereinafter referred to as embodiments) for carrying out the present technology.

The present technology can be applied to light receiving elements constituting a distance measuring system that performs distance measurement by an indirect TOF method, for example, and to an imaging device and the like including such light receiving elements.

For example, a distance measuring system can be applied to an in-vehicle system that is mounted on a vehicle and measures the distance to a target object outside the vehicle, a gesture recognizing system that measures the distance to a target object such as the user's hand and recognizes a gesture of the user on the basis of the result of the measurement, and the like. In this case, the result of the gesture recognition can be used in an operation of a car navigation system or the like, for example.

<Example Configuration of a Distance Measuring Device>

Figure 1:
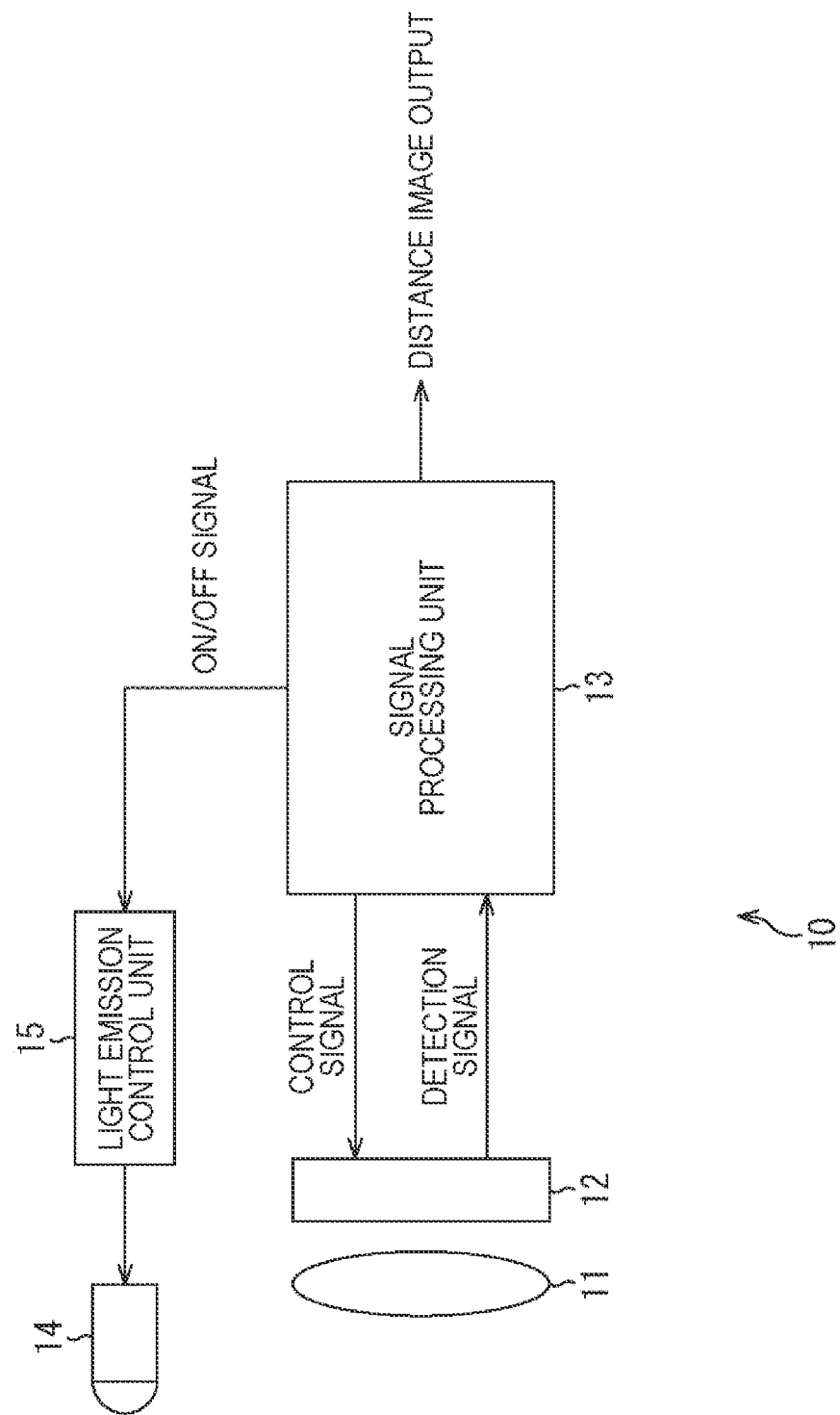
FIG. 1 is a diagram showing the configuration of an embodiment of a distance measuring device to which the present technology is applied.

FIG. 1 is a diagram showing an example configuration of an embodiment of a distance measuring device to which the present technology is applied.

A distance measuring device 10 includes a lens 11, a light receiving unit 12, a signal processing unit 13, a light emitting unit 14, and a light emission control unit 15. The distance measuring device 10 in FIG. 1 irradiates an object with light, and receives light (reflected light) that is the light (irradiation light) reflected by the object, to measure the distance to the object.

The light emission system of the distance measuring device 10 is formed with the light emitting unit 14 and the light emission control unit 15. In the light emission system, the light emission control unit 15 causes the light emitting unit 14 to emit infrared light (IR), under the control of the signal processing unit 13. An IR band filter may be provided between the lens 11 and the light receiving unit 12, and the light emitting unit 14 may emit infrared light corresponding to the transmission wavelength band of the IR band filter.

The light emitting unit 14 may be disposed in the housing of the distance measuring device 10, or may be disposed outside the housing of the distance measuring device 10. As will be described later, the light emission control unit 15 causes the light emitting unit 14 to emit light at a predetermined frequency.

The signal processing unit 13 functions as a calculation unit that calculates the distance from the distance measuring device 10 to an object, on the basis of a detection signal supplied from the light receiving unit 12, for example.

<Configuration of an Imaging Element>

Figure 2:
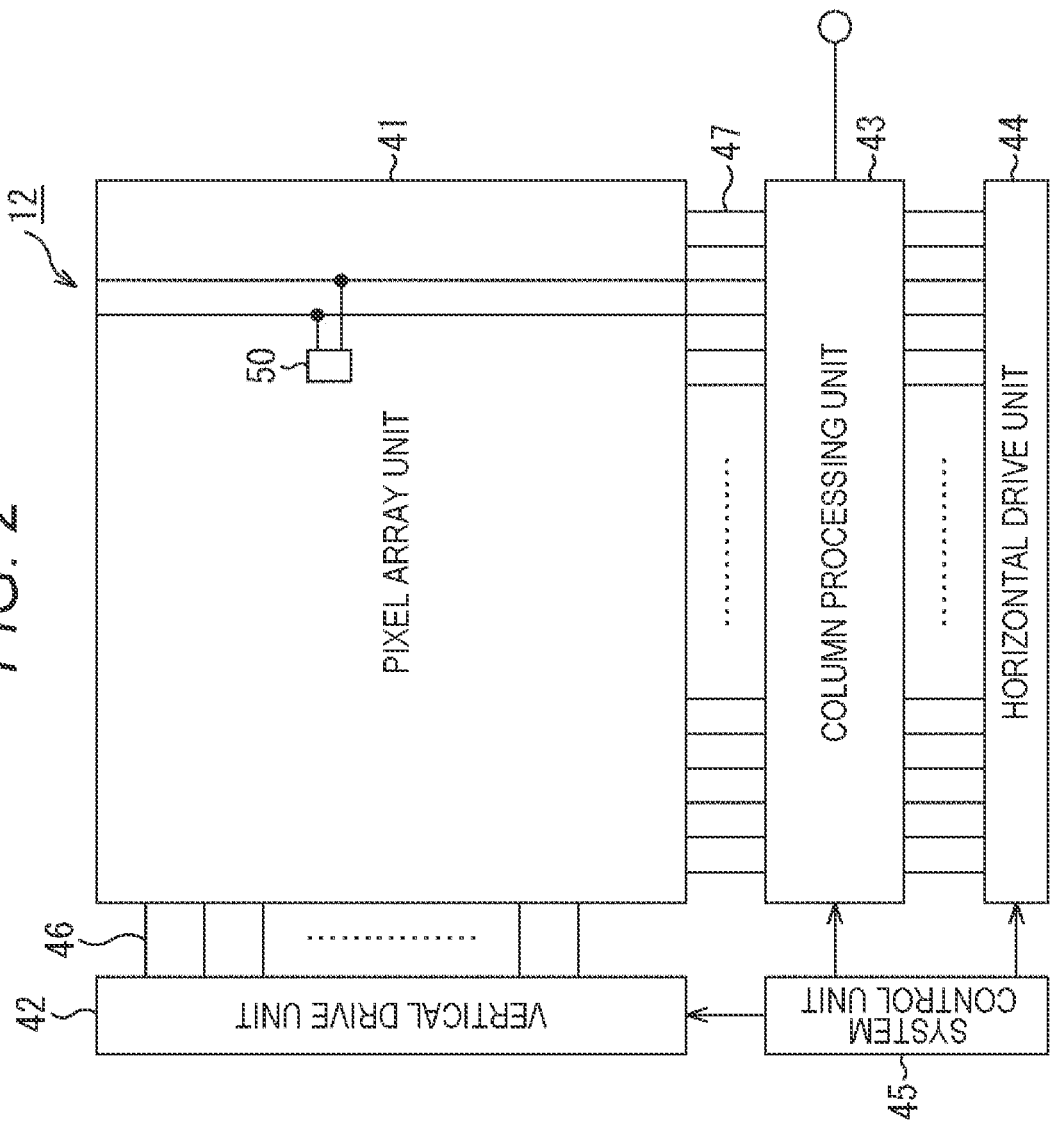
FIG. 2 is a diagram showing an example configuration of a light receiving unit.

FIG. 2 is a block diagram showing an example configuration of the light receiving unit 12. The light receiving unit 12 can be a complementary metal oxide semiconductor (CMOS) image sensor.

The light receiving unit 12 includes a pixel array unit 41, a vertical drive unit 42, a column processing unit 43, a horizontal drive unit 44, and a system control unit 45. The pixel array unit 41, the vertical drive unit 42, the column processing unit 43, the horizontal drive unit 44, and the system control unit 45 are formed on a semiconductor substrate (a chip) that is not shown in the drawing.

In the pixel array unit 41, unit pixels (pixels 50 in FIG. 3, for example) having photoelectric conversion elements that generate and store therein photoelectric charges of a charge amount corresponding to an amount of incident light are two-dimensionally arranged in a matrix. Note that, in the description below, a photoelectric charge of a charge amount corresponding to an amount of incident light may be simply referred to as an "electric charge", and a unit pixel may be simply referred to as a "pixel".

In the matrix-like pixel array of the pixel array unit 41, pixel drive lines 46 are further formed for the respective rows in the transverse direction (the array direction of the pixels in the pixel rows) in the drawing, and vertical signal lines 47 are formed for the respective columns in the vertical direction (the array direction of the pixels in the pixel columns) in the drawing. One end of each pixel drive line 46 is connected to the output end of the vertical drive unit 42 corresponding to the respective rows.

The vertical drive unit 42 is a pixel drive unit that is formed with a shift register, an address decoder, and the like, and drives the respective pixels in the pixel array unit 41 collectively or row by row, for example. Pixel signals that are output from the respective unit pixels of a pixel row selected and scanned by the vertical drive unit 42 are input to the column processing unit 43 through the respective vertical signal lines 47. For the respective pixel columns of the pixel array unit 41, the column processing unit 43 performs predetermined signal processing on pixel signals that are output from the respective unit pixels of a selected row through the vertical signal lines 47, and temporarily holds the pixel signals subjected to the signal processing.

Specifically, the column processing unit 43 performs at least a denoising process such as a correlated double sampling (CDS) process, for example, as the signal processing. Through this correlated double sampling performed by the column processing unit 43, reset noise and the fixed pattern noise unique to the pixels, such as a threshold variation among amplification transistors, are removed. Note that the column processing unit 43 can be made not only to perform the denoising process but also to have an analog-digital (AD) conversion function, for example, and output signal levels as digital signals.

The horizontal drive unit 44 is formed with a shift register, an address decoder, and the like, and sequentially selects the unit circuits corresponding to the pixel columns of the column processing unit 43. As a result of this selective scanning by the horizontal drive unit 44, the pixel signals subjected to the signal processing by the column processing unit 43 are sequentially output to the signal processing unit 48.

The system control unit 45 is formed with a timing generator or the like that generates various timing signals, and performs drive control on the vertical drive unit 42, the column processing unit 43, the horizontal drive unit 44, and the like, on the basis of the various timing signals generated by the timing generator.

In the matrix-like pixel array of the pixel array unit 41, the pixel drive lines 46 are provided in the row direction in the respective pixel rows, and two vertical signal lines 47 are provided in the column direction in each pixel column. For example, the pixel drive lines 46 transmit drive signals for performing driving when signals are read from the pixels. Note that, in FIG. 2, each pixel drive line 46 is shown as one wiring line, but is not necessarily one wiring line. One end of each pixel drive line 46 is connected to the output end of the vertical drive unit 42 corresponding to the respective rows.

<Structure of the Unit Pixels>

Next, a specific structure of the unit pixels 50 arranged in a matrix in the pixel array unit 41 is described.

A pixel 50 is designed so that electric charges generated in one photodiode 61 are distributed to a tap 51-1 and a tap 51-2. Of the electric charges generated in the photodiode 61, the electric charge distributed to the tap 51-1 then is read out from a vertical signal line 47-1 and is output as a detection signal A. Also, the electric charge distributed to the tap 51-2 is read out from a vertical signal line 47-2 and is output as a detection signal B.

The tap 51-1 includes a transfer transistor 62-1, a floating diffusion (FD) portion 63-1, a selection transistor 64-1, and a reset transistor 65-1. Likewise, the tap 51-2 includes a transfer transistor 62-2, an FD portion 63-2, a selection transistor 64-2, and a reset transistor 65-2.

The distribution of electric charges in a pixel 50 is now described with reference to FIG. 4. Here, the distribution means that the electric charges accumulated in a pixel 50 (a photodiode 31) are read at different timings to perform reading for the respective taps.

Figure 4:
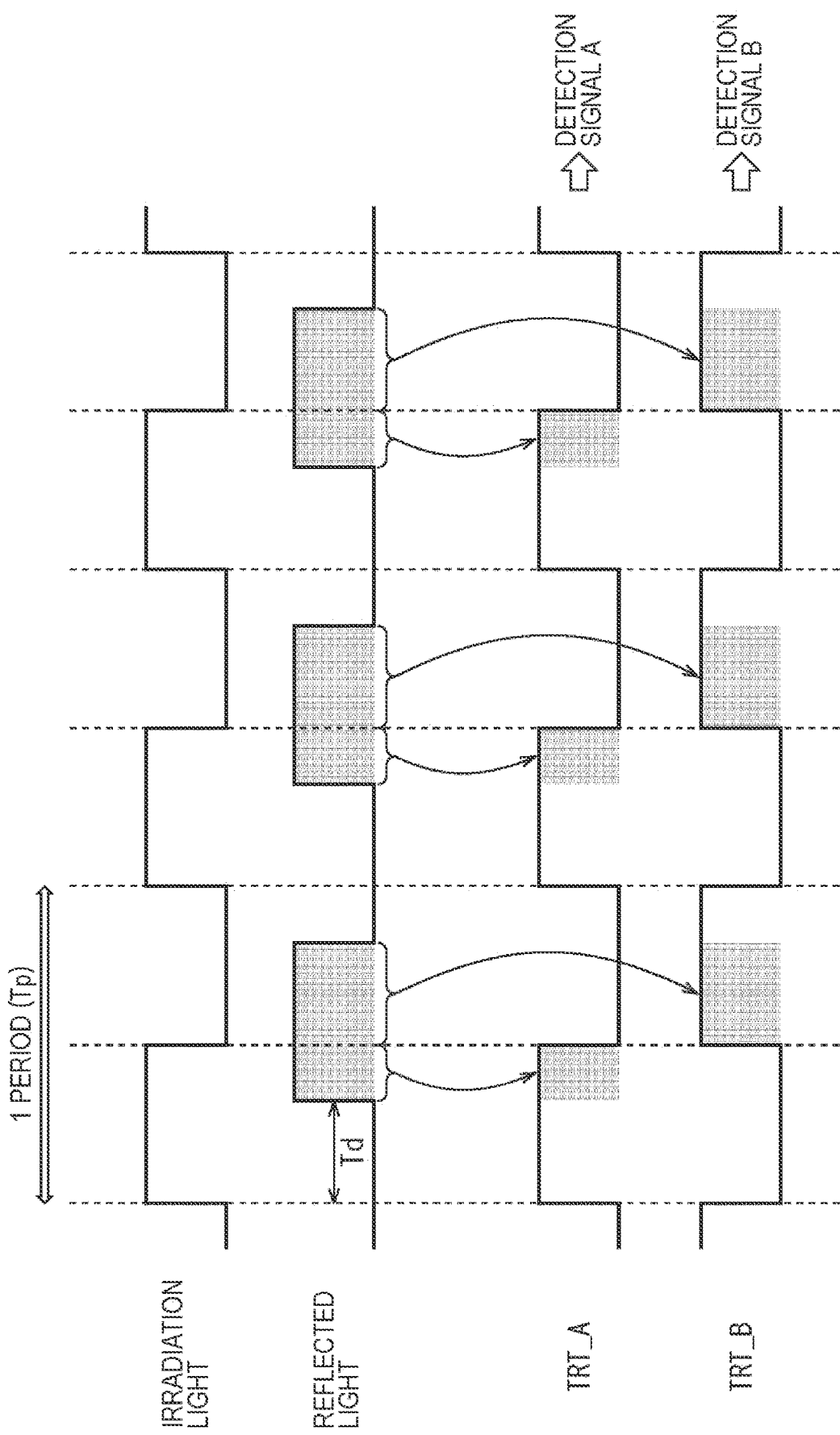
FIG. 4 is a chart for explaining distribution of electric charges in a pixel.

As shown in FIG. 4, irradiation light modulated (one cycle=Tp) so as to repeatedly switch on/off irradiation within the irradiation time is output from the light emitting unit 14, and reflected light is received by the photodiode 61 with a delay time Td depending on the distance to an object.

A transfer control signal TRT_A controls switching on/off of the transfer transistor 62-1, and a transfer control signal TRT_B controls switching on/off of the transfer transistor 62-2. As shown in the drawing, while the transfer control signal TRT_A is in the same phase as the irradiation light, the transfer control signal TRT_B is in a phase that is the inversion of the transfer control signal TRT_A.

Accordingly, while the transfer transistor 62-1 is on in accordance with the transfer control signal TRT_A, electric charges generated by the photodiode 61 receiving reflected light is transferred to the FD portion 63-1. On the other hand, while the transfer transistor 62-2 is on in accordance with the transfer control signal TRT_B, the electric charges are transferred to the FD portion 63-2. As a result, in a predetermined period during which irradiation light with the irradiation time T is periodically emitted, the electric charges transferred via the transfer transistor 62-1 are sequentially accumulated in the FD portion 63-1, and the electric charges transferred via the transfer transistor 62-2 are sequentially accumulated in the FD portion 63-2.

Further, when the selection transistor 64-1 is turned on in accordance with a selection signal SELm1 after the end of the period during which electric charges are accumulated, the electric charges accumulated in the FD portion 63-1 are read out via the vertical signal line 47-1, and the detection signal A corresponding to the charge amount is output from the light receiving unit 12. Likewise, when the selection transistor 64-2 is turned on in accordance with a selection signal SELm2, the electric charges accumulated in the FD portion 63-2 are read out via the vertical signal line 47-2, and the detection signal B corresponding to the charge amount is output from the light receiving unit 12.

The electric charges accumulated in the FD portion 63-1 are released when the reset transistor 65-1 is turned on in accordance with a reset signal RST_A. The electric charges accumulated in the FD portion 63-2 are released when the reset transistor 65-2 is turned on in accordance with a reset signal RST_B.

As described above, the pixel 50 can distribute the electric charges generated by the photodiode 61 receiving the reflected light to the tap 51-1 and the tap 51-2 in accordance with the delay time Td, and output the detection signal A and the detection signal B. Further, the delay time Td corresponds to the time in which light emitted by the light emitting unit 14 flies to the object, is reflected by the object, and then flies to the light receiving unit 12, which is the distance to the object. Thus, the distance measuring device 10 can calculate the distance (depth) to the object from the delay time Td, on the basis of the detection signal A and the detection signal B.

<Distance Measurement, with the Phase Shifted on the Light Receiving Side>

Referring now to FIGS. 5 to 9, a case where the reception side receives light with a shifted phase and acquires detection signals is described.

Figure 5:
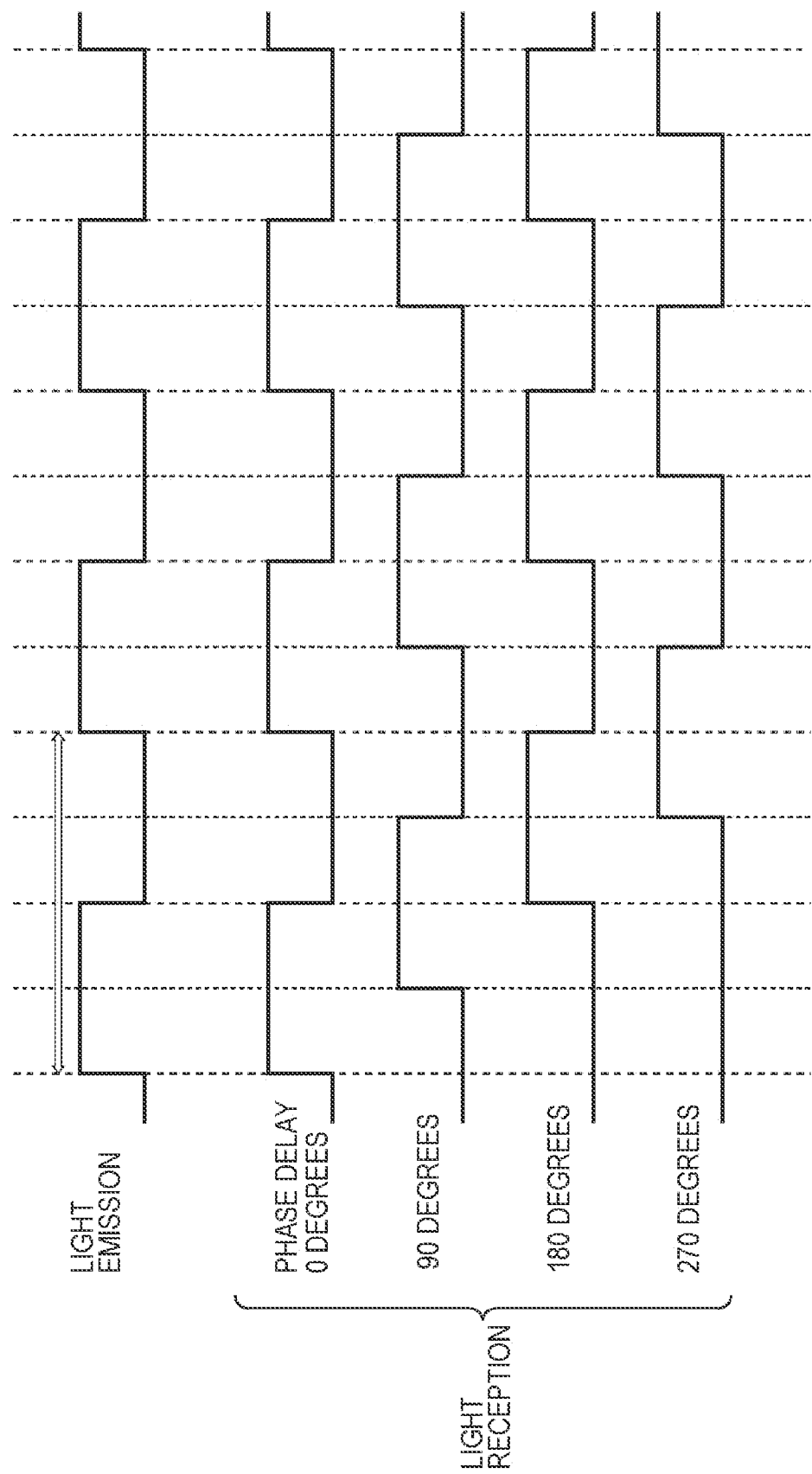
FIG. 5 is a chart showing an example of four kinds of received light, with the phase being delayed by 90 degrees each time.

For example, as shown in FIG. 5, four kinds of light reception with the phase being delayed by 90 degrees each time are performed. That is, on the basis of light reception with a phase delay of 0 degrees for receiving light without any phase shift from that of the light emitting side, light reception with a phase delay of 90 degrees, light reception with a phase delay of 180 degrees, and light reception with a phase delay of 270 degrees are performed, and a period (quad) for detecting the detection signal A and the detection signal B is provided four times.

Figure 6:
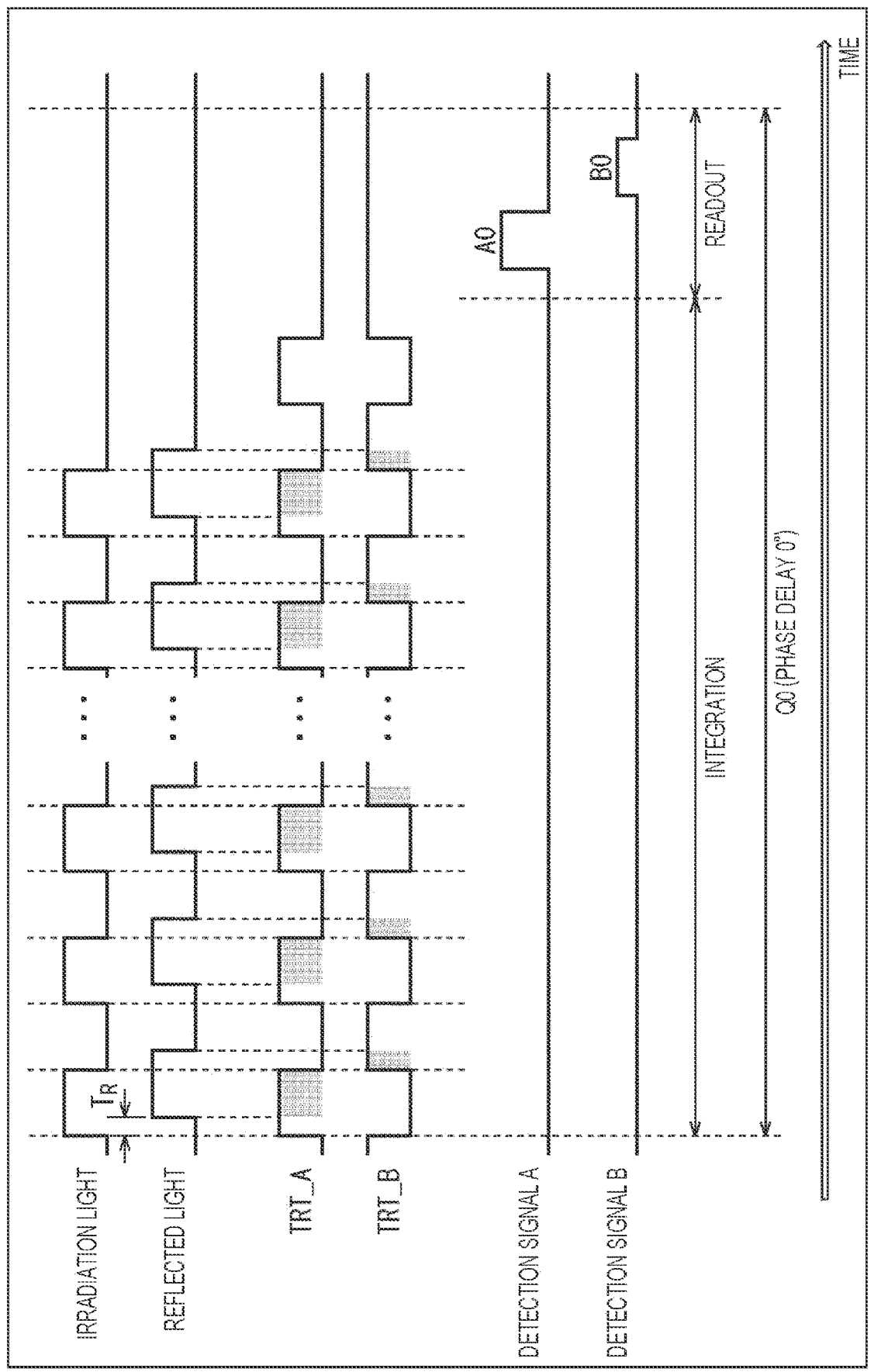
FIG. 6 is a chart showing an example of detection signals during a detection period of received light with a phase delay of 0 degrees.

That is, as shown in FIG. 6, a detection period Q0 for detecting reflected light by receiving light with a phase delay of 0 degrees, a detection period Q1 for detecting reflected light by receiving light with a phase delay of 90 degrees, a detection period Q2 for detecting reflected light by receiving light with a phase delay of 180 degrees, and a detection period Q3 for detecting reflected light by receiving light with a phase delay of 270 degrees are provided in a continuous manner, for example.

FIG. 6 shows an example of the received light, the reflected light, the transfer control signal TRT_A and the transfer control signal TRT_B, and the detection signal A and the detection signal B during the detection period Q0. As shown in FIG. 6, the transfer control signal TRT_A of the tap 51-1 is turned on at the same timing (a phase delay of 0 degrees) as the start of emission of irradiation light, and light reception (transfer) is started at the tap 51-1. Also, at the timing to turn off the transfer control signal TRT_A, the transfer control signal TRT_B is turned on, and the tap 51-2 starts receiving (transferring) light.

As light reception with a phase delay of 0 degrees is performed in this manner, electric charges are distributed to the tap 51-1 and the tap 51-2 with the charge amount depending on the delay time TR, and the respective electric charges are accumulated during an integration period. After that, during a readout period, the electric charges of the charge amount accumulated during the integration period are read out, and a detection signal A0 and a detection signal B0 during the detection period Q0 are output.

Figure 7:
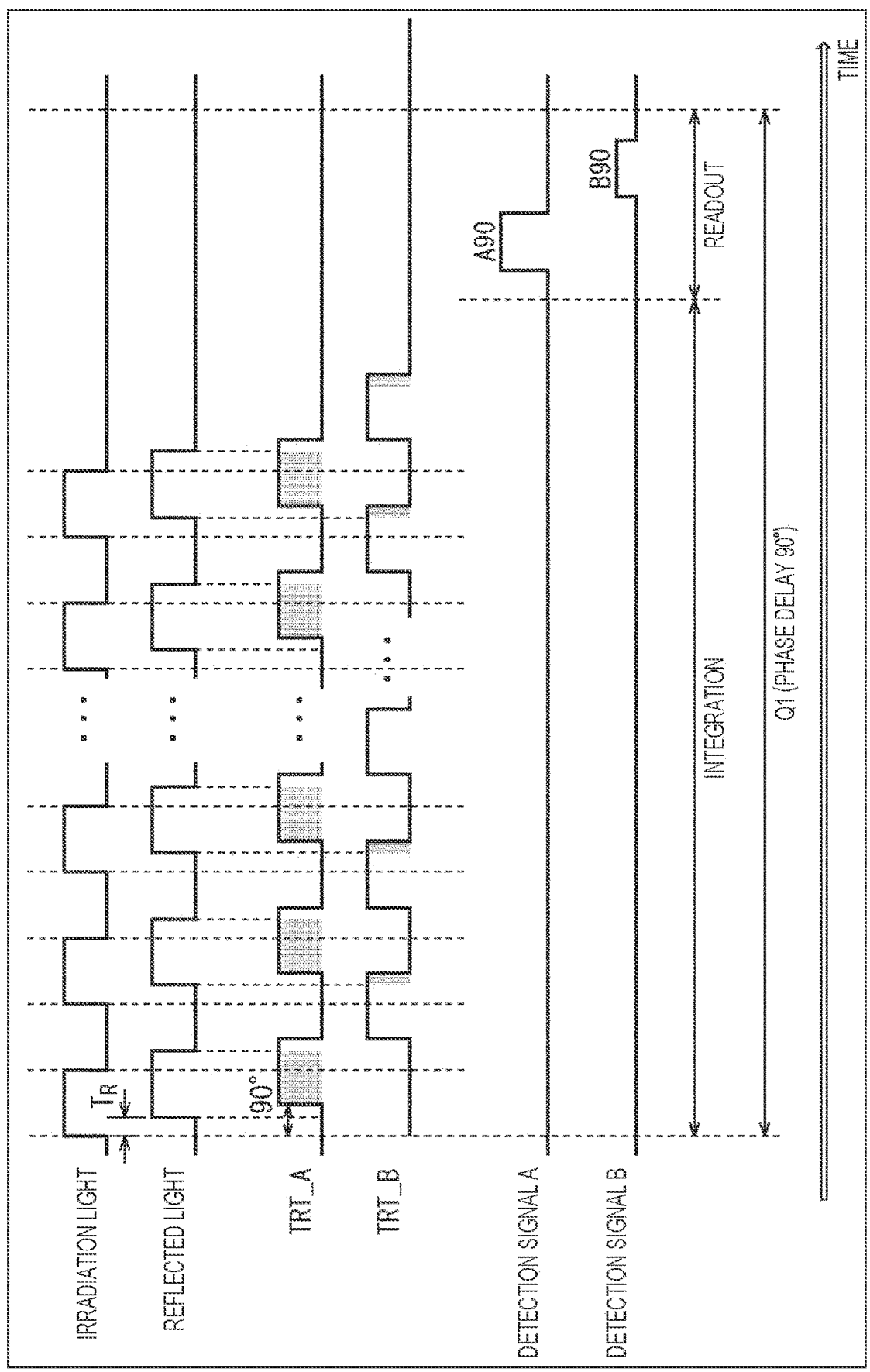
FIG. 7 is a chart showing an example of detection signals during a detection period of received light with a phase delay of 90 degrees.

FIG. 7 shows an example of the received light, the reflected light, the transfer control signal TRT_A and the transfer control signal TRT_B, and the detection signal A and the detection signal B during the detection period Q1. As shown in FIG. 7, the transfer control signal TRT_A of the tap 51-1 is turned on at timing with a phase delay of 90 degrees from the start of emission of irradiation light, and light reception (transfer) is started at the tap 51-1. Also, at the timing to turn off the transfer control signal TRT_A, the transfer control signal TRT_B is turned on, and the tap 51-2 starts receiving (transferring) light.

As light reception with a phase delay of 90 degrees is performed in this manner, electric charges are distributed to the tap 51-1 and the tap 51-2 with the charge amount depending on the delay time TR, and the respective electric charges are accumulated during the integration period. After that, during the readout period, the electric charges of the charge amount accumulated during the integration period are read out, and a detection signal A90 and a detection signal B90 during the detection period Q1 are output.

Figure 8:
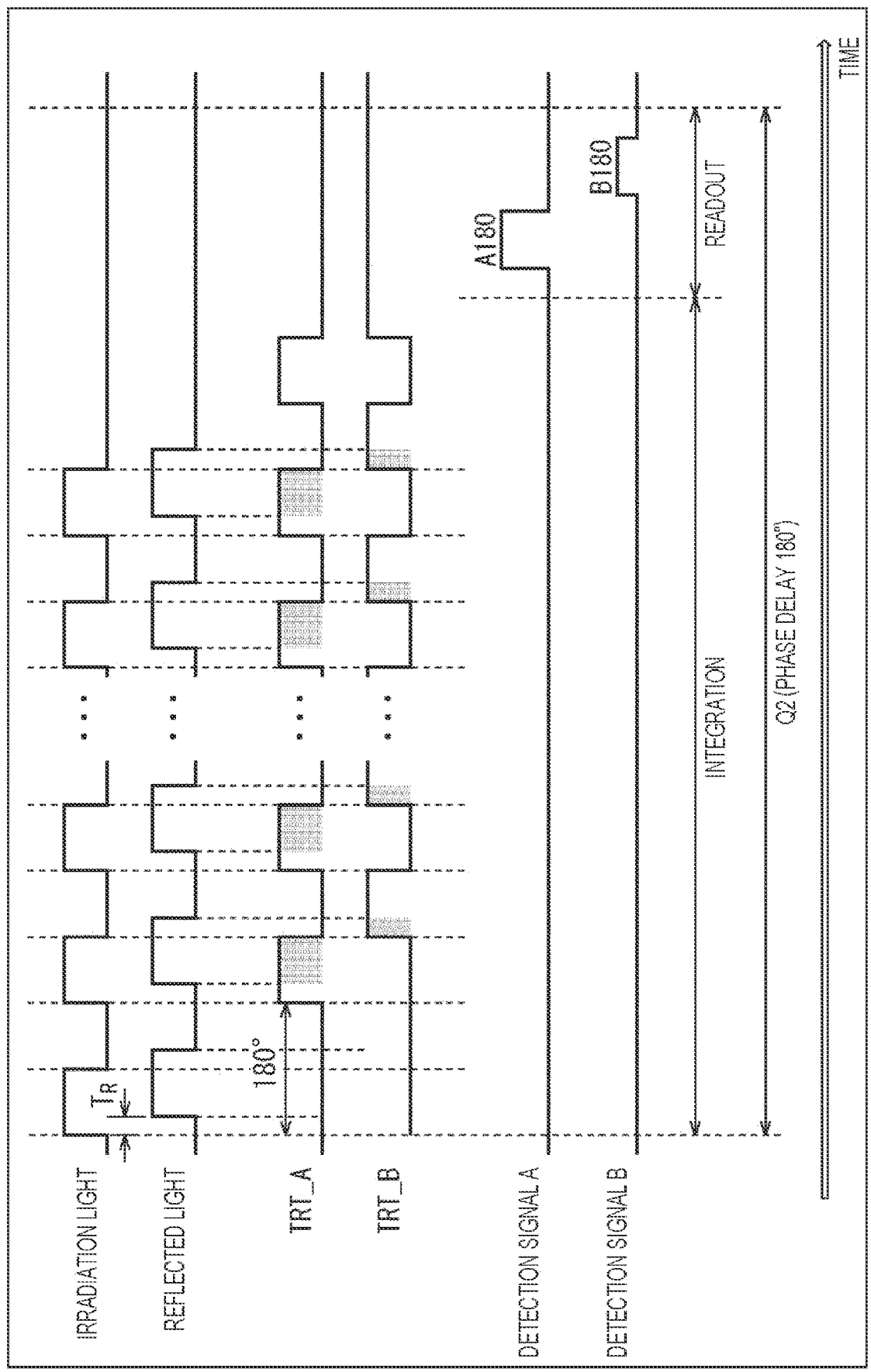
FIG. 8 is a chart showing an example of detection signals during a detection period of received light with a phase delay of 180 degrees.

FIG. 8 shows an example of the received light, the reflected light, the transfer control signal TRT_A and the transfer control signal TRT_B, and the detection signal A and the detection signal B during the detection period Q2. As shown in FIG. 8, the transfer control signal TRT_A of the tap 51-1 is turned on at timing with a phase delay of 180 degrees from the start of emission of irradiation light, and light reception (transfer) is started at the tap 51-1. Also, at the timing to turn off the transfer control signal TRT_A, the transfer control signal TRT_B is turned on, and the tap 51-2 starts receiving (transferring) light.

As light reception with a phase delay of 180 degrees is performed in this manner, electric charges are distributed to the tap 51-1 and the tap 51-2 with the charge amount depending on the delay time TR, and the respective electric charges are accumulated during the integration period. After that, during a readout period, the electric charges of the charge amount accumulated during the integration period are read out, and a detection signal A180 and a detection signal B180 during the detection period Q2 are output.

Figure 9:
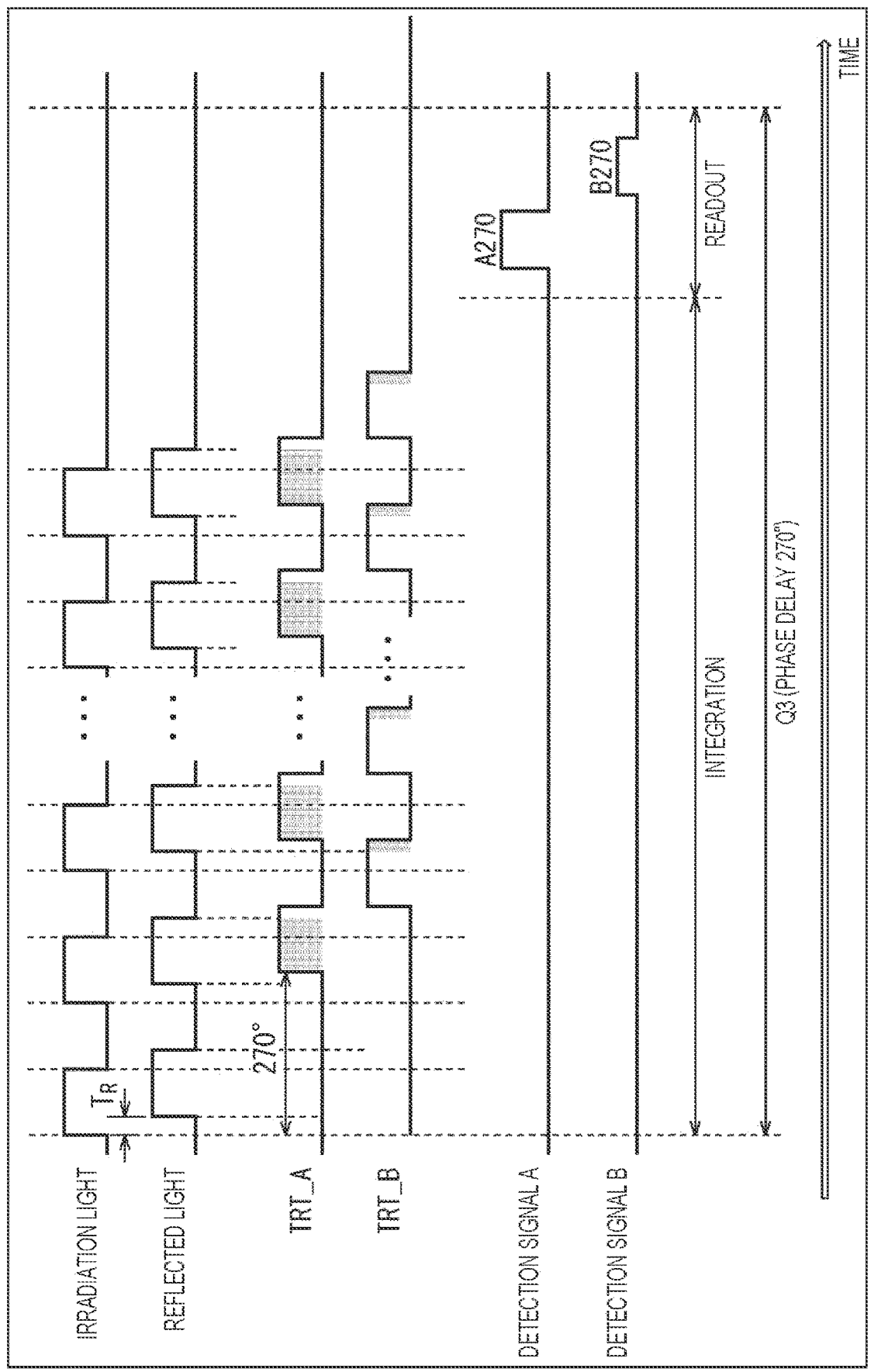
FIG. 9 is a chart showing an example of detection signals during a detection period of received light with a phase delay of 270 degrees.

FIG. 9 shows an example of the received light, the reflected light, the transfer control signal TRT_A and the transfer control signal TRT_B, and the detection signal A and the detection signal B during the detection period Q3. As shown in FIG. 9, the transfer control signal TRT_A of the tap 51-1 is turned on at timing with a phase delay of 270 degrees from the start of emission of irradiation light, and light reception (transfer) is started at the tap 51-1. Also, at the timing to turn off the transfer control signal TRT_A, the transfer control signal TRT_B is turned on, and the tap 51-2 starts receiving (transferring) light.

As light reception with a phase delay of 270 degrees is performed in this manner, electric charges are distributed to the tap 51-1 and the tap 51-2 with the charge amount depending on the delay time TR, and the respective electric charges are accumulated during the integration period. After that, during the readout period, the electric charges of the charge amount accumulated during the integration period are read out, and a detection signal A270 and a detection signal B270 during the detection period Q3 are output.

As described above, the detection signal A0 and the detection signal B0 are detected through light reception with a phase delay of 0 degrees during the detection period Q0, and the detection signal A90 and the detection signal B90 are detected through light reception with a phase delay of 90 degrees during the detection period Q1. Likewise, the detection signal A180 and the detection signal B180 are detected through light reception with a phase delay of 180 degrees during the detection period Q2, and the detection signal A270 and the detection signal B270 are detected through light reception with a phase delay of 270 degrees during the detection period Q3.

On the light emitting side, there are no phase delays despite a phase delay at the start of light reception. In other words, emission of irradiation light is always started at the same timing.

In a case where light reception with four phase delays is performed by the two taps 51 as described above, and the distance to a predetermined object is measured, a process is performed by the signal processing unit 13 (FIG. 1), on the basis of the signals obtained during the four detection periods.

<Distance Measurement, with the Phase Shifted on the Light Emitting Side>

Referring now to FIGS. 10 to 15, a case where the light emitting side emits light with a shifted phase and acquires detection signals is described.

Figure 10:
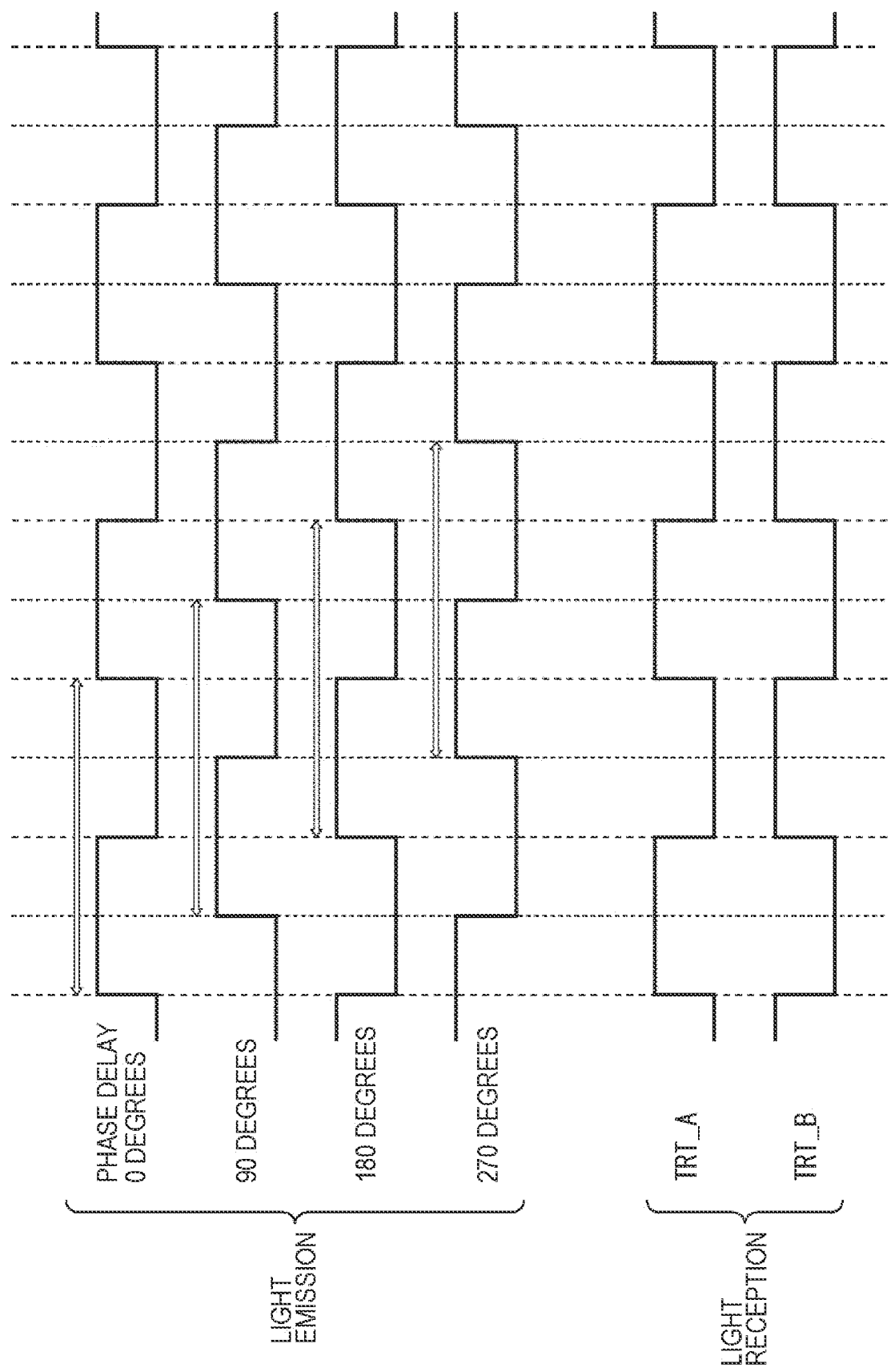
FIG. 10 is a chart showing an example of four kinds of irradiation light, with the phase being delayed by 90 degrees each time.

For example, as shown in FIG. 10, four kinds of irradiation light with the phase being delayed by 90 degrees each time are used. That is, on the basis of irradiation light with a phase delay of 0 degrees, irradiation light with a phase delay of 90 degrees, irradiation light with a phase delay of 180 degrees, and irradiation light with a phase delay of 270 degrees are used, and a period (quad) for detecting the detection signal A and the detection signal B is provided four times.

Figure 11:
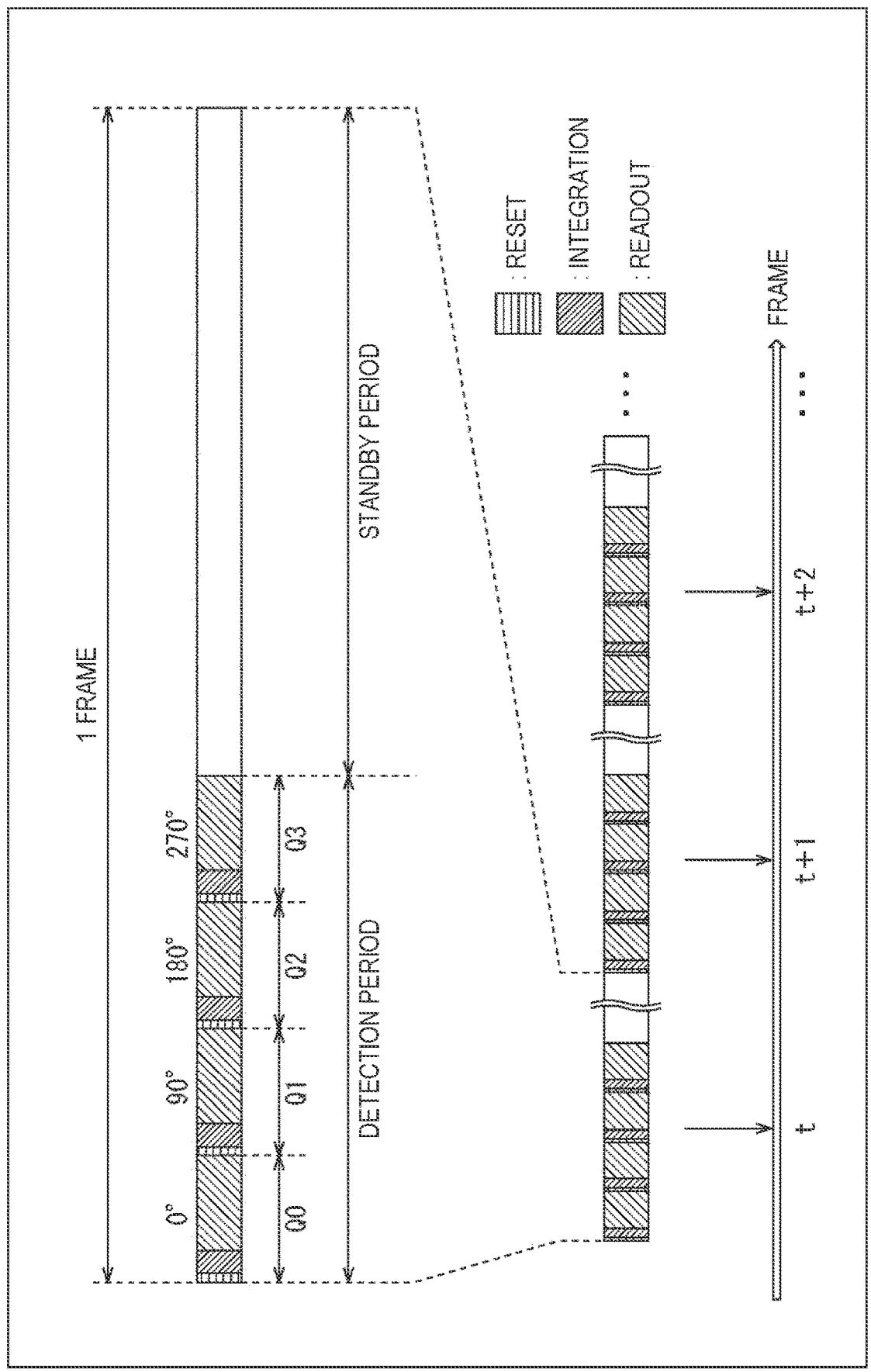
FIG. 11 is a chart for explaining distance measurement using four detection periods with four kinds of irradiation light having a phase delay of 90 degrees each time.

That is, as shown in FIG. 11, a detection period Q0 for detecting reflected light through irradiation light with a phase delay of 0 degrees, a detection period Q1 for detecting reflected light through irradiation light with a phase delay of 90 degrees, a detection period Q2 for detecting reflected light through irradiation light with a phase delay of 180 degrees, and a detection period Q3 for detecting reflected light through irradiation light with a phase delay of 270 degrees are provided in a continuous manner, for example. Further, in the detection period Q0, the detection period Q1, the detection period Q2, and the detection period Q3, a reset period for resetting electric charges, an integration period for accumulating electric charges, and a readout period for reading out electric charges are provided.

Furthermore, a detection period formed with the detection period Q0, the detection period Q1, the detection period Q2, and the detection period Q3, and a standby period (a dead/idle time) that follow constitute one frame for outputting one distance image. Such one frame is repeated, and frames are continuously output at a predetermined frame rate, such as a frame with a frame number t, a frame with a frame number t+1, and a frame with a frame number t+2. Note that, in the above distance measurement in which the phase is shifted on the light receiving side, a reset period, an integration period, and a readout period are also provided, as shown in FIG. 11.

Figure 12:
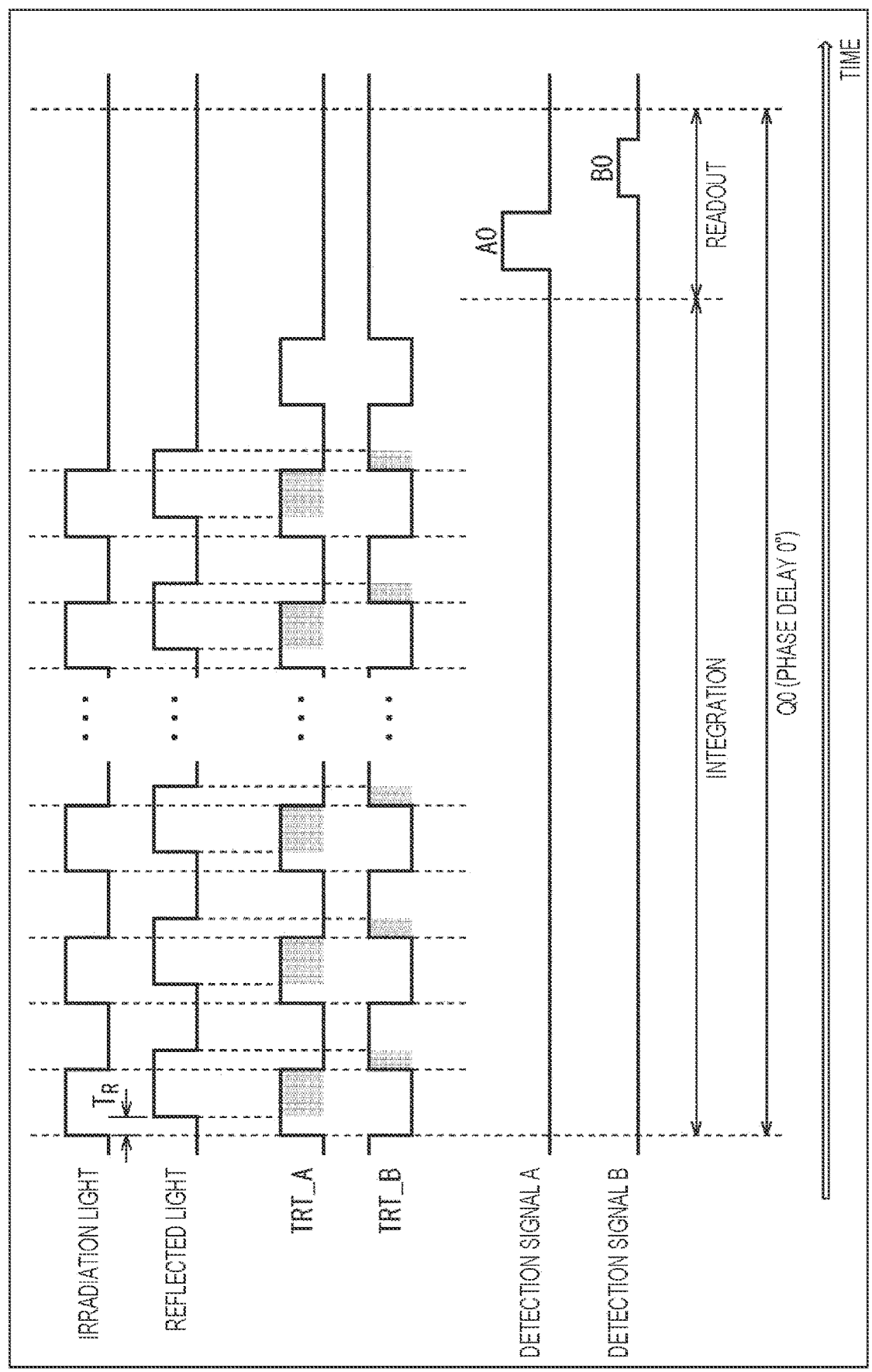
FIG. 12 is a chart showing an example of detection signals during a detection period of irradiation light with a phase delay of 0 degrees.

FIG. 12 shows an example of the irradiation light, the reflected light, the transfer control signal TRT_A and the transfer control signal TRT_B, and the detection signal A and the detection signal B during the detection period Q0. As shown in FIG. 12, irradiation light is emitted with a phase delay of 0 degrees. On the reception side, the transfer control signal TRT_A is turned on at the timing when emission of irradiation light is turned on, and light reception (transfer) is started.

Electric charges are distributed to the tap 51-1 and the tap 51-2 with the charge amount depending on the delay time TR, and the respective electric charges are accumulated during the integration period. After that, during a readout period, the electric charges of the charge amount accumulated during the integration period are read out, and a detection signal A0 and a detection signal B0 during the detection period Q0 are output.

Figure 13:
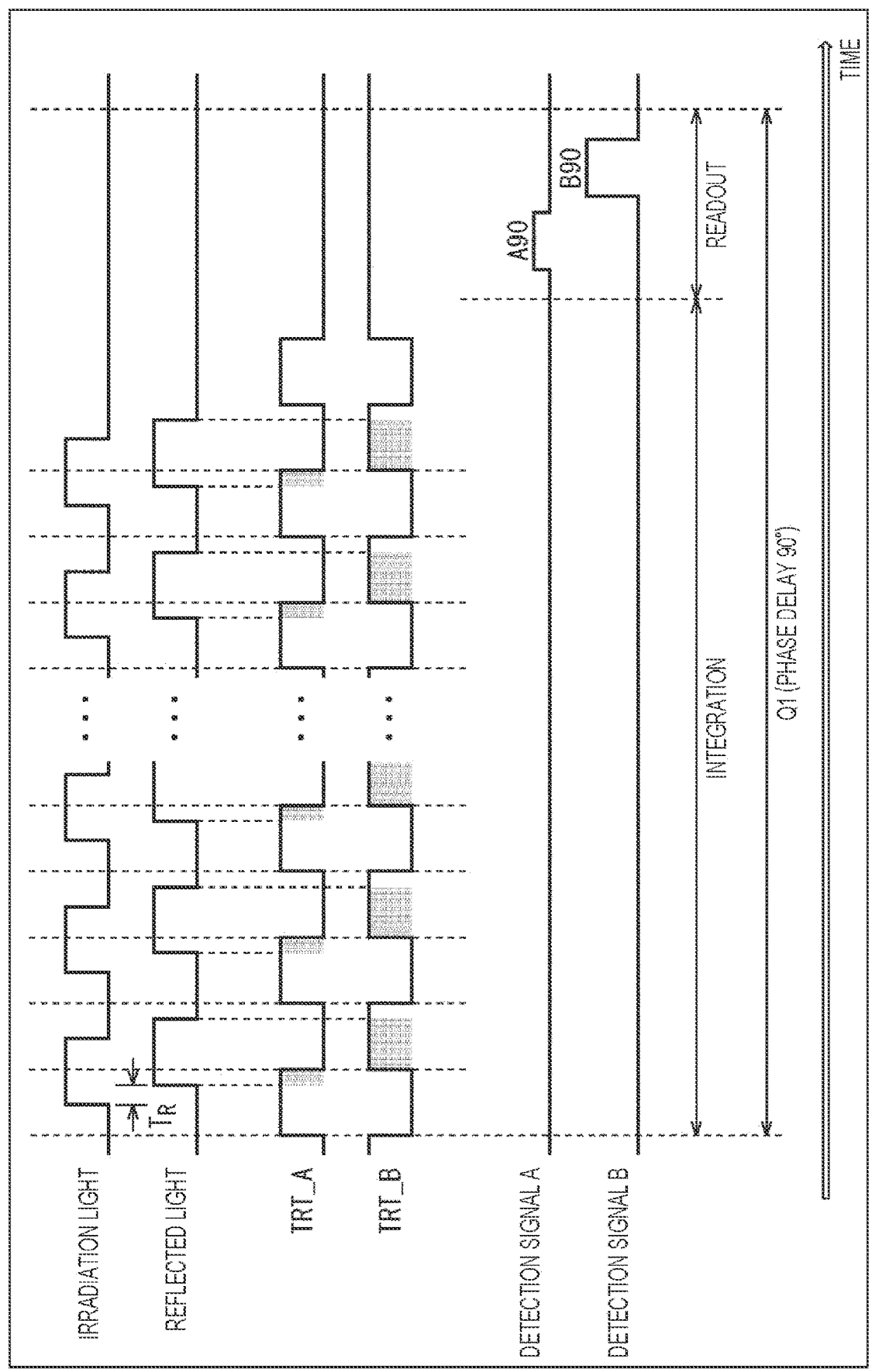
FIG. 13 is a chart showing an example of detection signals during a detection period of irradiation light with a phase delay of 90 degrees.

FIG. 13 shows an example of the irradiation light, the reflected light, the transfer control signal TRT_A and the transfer control signal TRT_B, and the detection signal A and the detection signal B during the detection period Q1. As shown in FIG. 13, irradiation light is emitted with a phase delay of 90 degrees. On the reception side, the transfer control signal TRT_A is turned on at the timing of a phase delay of 0 degrees, and light reception (transfer) is started.

Electric charges are distributed to the tap 51-1 and the tap 51-2 with the charge amount depending on the delay time TR, and the respective electric charges are accumulated during the integration period. After that, during the readout period, the electric charges of the charge amount accumulated during the integration period are read out, and a detection signal A90 and a detection signal B90 during the detection period Q1 are output.

Figure 14:
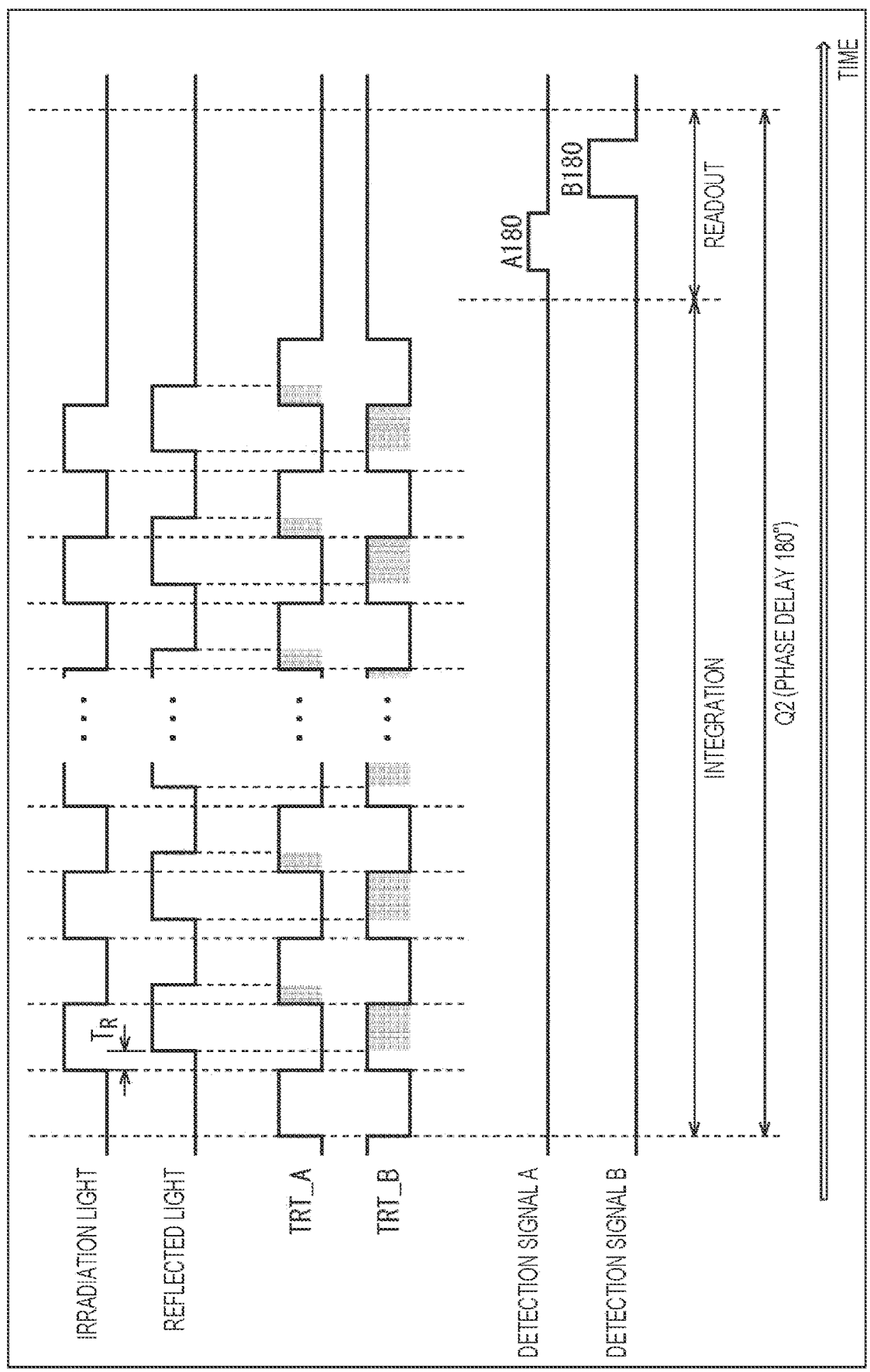
FIG. 14 is a chart showing an example of detection signals during a detection period of irradiation light with a phase delay of 180 degrees.

FIG. 14 shows an example of the irradiation light, the reflected light, the transfer control signal TRT_A and the transfer control signal TRT_B, and the detection signal A and the detection signal B during the detection period Q2. As shown in FIG. 14, irradiation light is emitted with a phase delay of 180 degrees. On the reception side, the transfer control signal TRT_A is turned on at the timing of a phase delay of 0 degrees, and light reception (transfer) is started.

Electric charges are distributed to the tap 51-1 and the tap 51-2 with the charge amount depending on the delay time TR, and the respective electric charges are accumulated during the integration period. After that, during a readout period, the electric charges of the charge amount accumulated during the integration period are read out, and a detection signal A180 and a detection signal B180 during the detection period Q2 are output.

Figure 15:
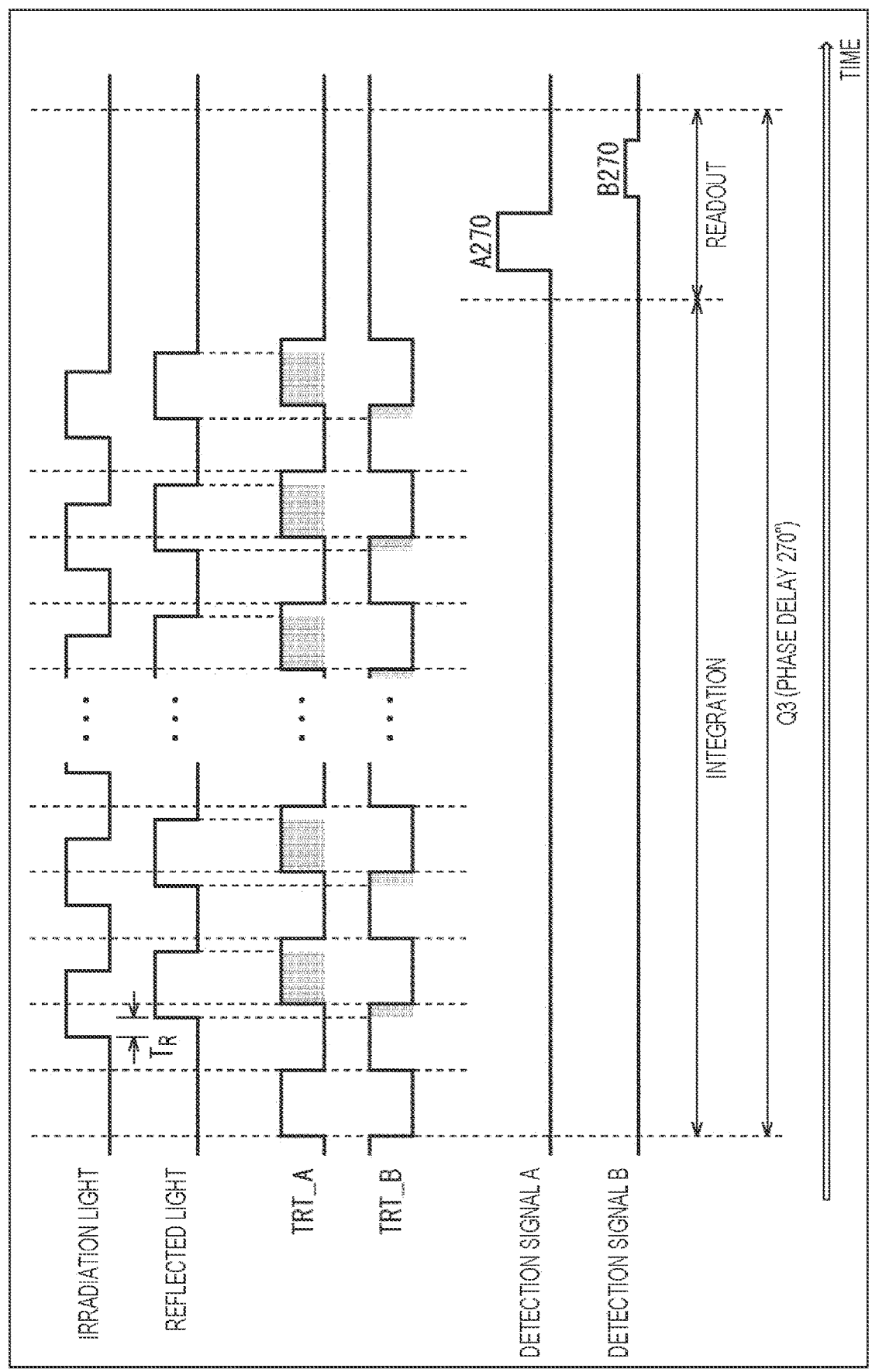
FIG. 15 is a chart showing an example of detection signals during a detection period of irradiation light with a phase delay of 270 degrees.

FIG. 15 shows an example of the irradiation light, the reflected light, the transfer control signal TRT_A and the transfer control signal TRT_B, and the detection signal A and the detection signal B during the detection period Q3. As shown in FIG. 15, irradiation light is emitted with a phase delay of 270 degrees. On the reception side, the transfer control signal TRT_A is turned on at the timing of a phase delay of 0 degrees, and light reception (transfer) is started.

Electric charges are distributed to the tap 51-1 and the tap 51-2 with the charge amount depending on the delay time TR, and the respective electric charges are accumulated during the integration period. After that, during the readout period, the electric charges of the charge amount accumulated during the integration period are read out, and a detection signal A270 and a detection signal B270 during the detection period Q3 are output.

As described above, the detection signal A0 and the detection signal B0 are detected with the use of irradiation light with a phase delay of 0 degrees during the detection period Q0, and the detection signal A90 and the detection signal B90 are detected with the use of irradiation light with a phase delay of 90 degrees during the detection period Q1. Likewise, the detection signal A180 and the detection signal B180 are detected with the use of irradiation light with a phase delay of 180 degrees during the detection period Q2, and the detection signal A270 and the detection signal B270 are detected with the use of irradiation light with a phase delay of 270 degrees during the detection period Q3.

On the reception side, there are no phase delays despite a phase delay of emitted irradiation light. In other words, reception is always started at the same timing.

In a case where the distance to a predetermined object is measured with the use of irradiation light with four phase differences at the two taps 51 as described above, a process is performed by the signal processing unit 13 (FIG. 1), on the basis of the signals obtained during the four detection periods.

The present technology described below can be applied in a case where irradiation light is emitted with a shifted phase so as to perform distance measurement, and a case where the phase of received light is shifted so as to perform distance measurement. As the present technology can be applied in both cases, the present technology is illustrated as shown in FIG. 16, and explanation thereof is continued in the description below.

<Calculation of Distance>

Figure 16:
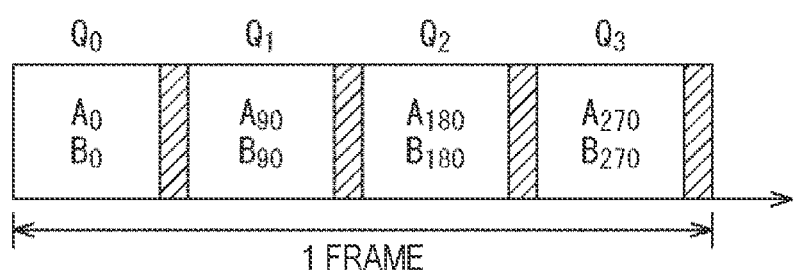
FIG. 16 is a chart for explaining detection signals in one frame.

As shown in FIG. 16, the detection period of one frame includes a detection period Q0, a detection period Q1, a detection period Q2, and a detection period Q3. A detection signal A0 and a detection signal B0 are acquired during the detection period Q0, and a detection signal A90 and a detection signal B90 are acquired during the detection period Q1. Also, a detection signal A180 and a detection signal B180 are acquired during the detection period Q2, and a detection signal A270 and a detection signal B270 are acquired during the detection period Q3.

Using these detection signals, the signal processing unit 13 (FIG. 1) calculates a phase difference θ according to Expression (1) shown below, calculates a distance D according to Expression (2) shown below, and calculates a reliability c according to Expression (3) shown below.

[Mathematical Formula 1]

$$I = c_0 - c_{180} = (A_0 - B_0) - (A_{180} - B_{180}) \quad (1)$$
$$Q = c_{90} - c_{270} = (A_{90} - B_{90}) - (A_{270} - B_{270})$$
$$\theta = \tan^{-1}\left(\frac{Q}{I}\right)(0 \le \theta < 2\pi)$$

[Mathematical Formula 2]

$$D = \frac{\theta}{2\pi}\left(\frac{T_{PC}}{2}\right) \quad (2)$$

[Mathematical Formula 3]

$$\text{confidence} = \sqrt{I^2 + Q^2} \quad (3)$$

In Expression (1), I represents the value obtained by subtracting the value C180 obtained by subtracting the detection signal B180 from the detection signal A180, from the value C0 obtained by subtracting the detection signal B0 from the detection signal A0. Q represents the value obtained by subtracting the value C270 obtained by subtracting the detection signal B270 from the detection signal A270, from the value C90 obtained by subtracting the detection signal B90 from the detection signal A90. The phase difference θ is calculated by determining the arctangent of (I/Q).

In Expression (2), C represents the speed of light, and Tp represents the pulse width. The delay time Td can be obtained on the basis of the phase difference θ, and the distance D to the object can be obtained on the basis of the delay time Td.

Expression (3) is an equation for calculating the value representing the reliability of the calculated distance. The reliability c is obtained by calculating the square root of the value obtained by adding the square of I to the square of Q. Note that the calculation of the reliability c is not an essential element in the calculation of the distance D, and can be omitted.

In the description below, a case where the distance to a predetermined object is measured with the two taps 51 using irradiation light having four phase differences (hereinafter referred to as "2-tap 4-phase") will be described as an example. However, the present technology can also be applied in a case where the distance to a predetermined object is measured with the two taps 51 using irradiation light having two phase differences, or a case where the distance to a predetermined object is measured with one tap 51 using irradiation light having four phase differences.

<2-Tap 2-Phase>

A case where the distance to a predetermined object is measured with the two taps 51 using irradiation light having two phase differences or through reception of light having two phase differences (hereinafter referred to as "2-tap 2-phase", as appropriate) is now briefly described. Here, explanation is continued, taking as an example a case where light reception is performed with two phase differences so as to measure the distance to a predetermined object.

Figure 17:
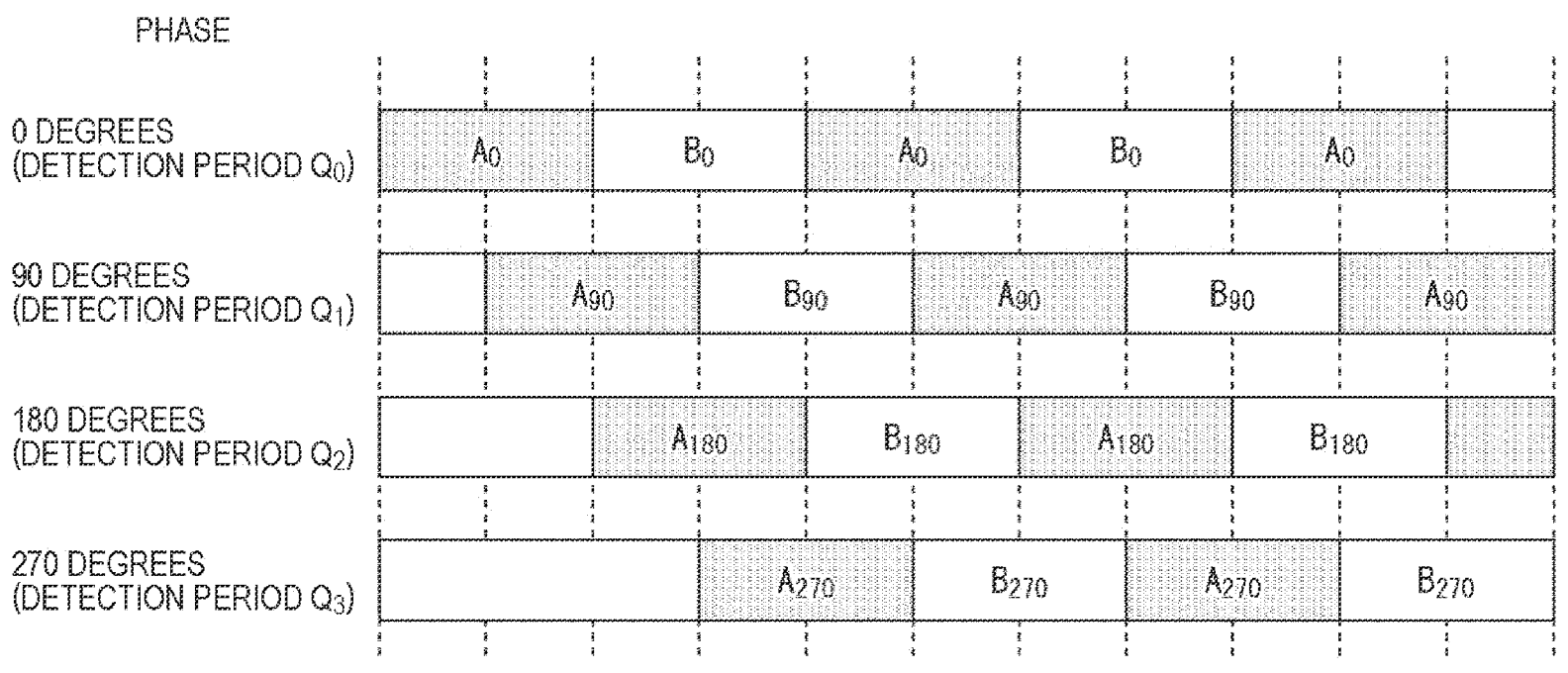

FIG. 17 is a diagram showing exposure timings of four phases of 0 degrees, 90 degrees, 180 degrees, and 270 degrees, with the beginnings being aligned for easy understanding of the phase differences.

In practice, as shown in FIG. 16, imaging for acquiring a detection signal A0 and a detection signal B0 is performed during a detection period Q0, imaging for acquiring a detection signal A90 and a detection signal B90 is performed during a detection period Q1, imaging for acquiring a detection signal A180 and a detection signal B180 is performed during a detection period Q2, and imaging for acquiring a detection signal A270 and a detection signal B270 is performed during a detection period Q3.

FIG. 17 shows this imaging that is sequentially performed in the temporal direction while the beginnings of the detection periods are aligned in the vertical direction. From the beginning of the detection period Q0, exposure for imaging the detection signal A0 is performed, followed by exposure for imaging the detection signal B0.

From the point of time at which the phase is shifted by 90 degrees from the beginning of the detection period Q1, exposure for imaging the detection signal A90 is performed, followed by exposure for imaging the detection signal B90.

From the point of time at which the phase is shifted by 180 degrees from the beginning of the detection period Q2, exposure for imaging the detection signal A180 is performed, followed by exposure for imaging the detection signal B180.

From the point of time at which the phase is shifted by 270 degrees from the beginning of the detection period Q3, exposure for imaging the detection signal A270 is performed, followed by exposure for imaging the detection signal B270.

Here, the exposure time of the detection signal B0 of the detection period Q0 is compared with the exposure time of the detection signal A180 of the detection period Q2, and the result shows that exposure is performed at the same timing. Accordingly, the detection signal A180 of the detection period Q2 can be substituted with the detection signal B0 of the detection period Q0. Likewise, the detection signal B180 of the detection period Q2 can be substituted with the detection signal A0 of the detection period Q0.

Likewise, the exposure time of the detection signal B90 of the detection period Q1 is compared with the exposure time of the detection signal A270 of the detection period Q3, and the result shows that exposure is performed at the same timing. Accordingly, the detection signal A270 of the detection period Q3 can be substituted with the detection signal B90 of the detection period Q1. Likewise, the detection signal B270 of the detection period Q3 can be substituted with the detection signal A90 of the detection period Q1.

Figure 18:
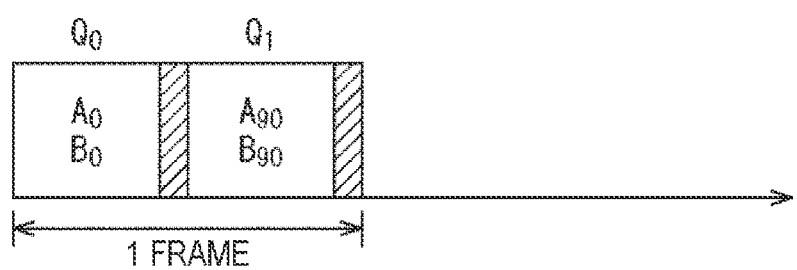
FIG. 18 is a chart for explaining detection signals in one frame.

In view of this, the detection period Q0 and the detection period Q1 are set as the detection period of one frame, and the detection signal A0 and the detection signal B0 are acquired during the detection period Q0, as shown in FIG. 18.

The detection signal A0 acquired during the detection period Q0 can be used as the detection signal B180. Also, the detection signal B0 acquired during the detection period Q0 can be used as the detection signal A180. Accordingly, in this case, during the detection period Q0, the detection signal A0, the detection signal B0, the detection signal A180, and the detection signal B180 can be regarded as if they had actually been acquired.

Likewise, the detection signal A90 acquired during the detection period Q1 can be used as the detection signal B270. Further, the detection signal B90 acquired during the detection period Q1 can be used as the detection signal A270. Accordingly, in this case, during the detection period Q1, the detection signal A90, the detection signal B90, the detection signal A270, and the detection signal B270 can be regarded as if they had actually been acquired.

Thus, the case of 2-tap 2 phase described with reference to FIG. 18 can also be handled like the case of 2-tap 4 phase described with reference to FIG. 16.

The value I and the value Q in Expression (1) in the 2-tap 4 phase described with reference to FIG. 16 are expressed as in Expression (4) shown below.

[Mathematical Formula 4]

$$I = c_0 - c_{180} = A_0 - B_0$$

$$Q = c_{90} - c_{270} = A_{90} - B_{90} \quad (4)$$

The value I is obtained by subtracting the detection signal B0 from the detection signal A0, and the value Q is obtained by subtracting the detection signal B90 from the detection signal A90. As the value I and the value Q are acquired, the phase difference $\theta$ can be calculated according to Expression (1), and the distance D can be calculated according to Expression (2), as in the case of the 2-tap system described above.

<1-Tap 4-Phase>

A case where the distance to a predetermined object is measured with one tap 51 (the configuration of a pixel 50 having one tap 51 is not shown) using irradiation light having four phase differences or through reception of light having four phase differences (hereinafter referred to as "1-tap 4-phase", as appropriate) is now briefly described.

Figure 19:
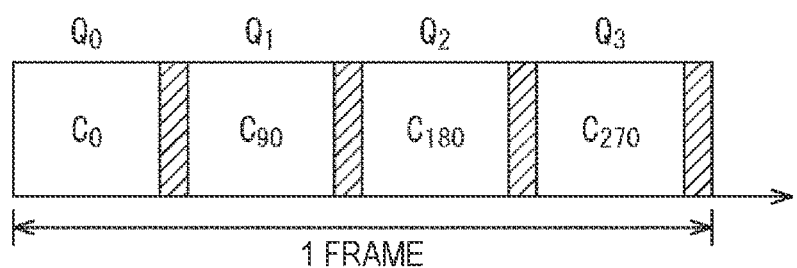
FIG. 19 is a chart for explaining detection signals in one frame.

When the imaging order in the temporal direction in the 1-tap 4-phase is illustrated in the same manner as in FIG. 16, the order shown in FIG. 19 is obtained. During a detection period Q0, the value C0 in Expression (1) shown above is acquired. During a detection period Q1, the value C90 in Expression (1) shown above is acquired. During a detection period Q2, the value C180 in Expression (1) shown above is acquired. During a detection period Q3, the value C270 in Expression (1) shown above is acquired.

In the case of the 1-tap system, the value I and the value Q in Expression (1) shown above are expressed as in Expression (5) shown below.

[Mathematical Formula 5]

$$I = c_0 - c_{180}$$

$$Q = c_{90} - c_{270} \quad (5)$$

As the value I and the value Q are acquired, the phase difference $\theta$ can be calculated according to Expression (1), and the distance D can be calculated according to Expression (2), as in the case of the 2-tap system described above.

The present technology can be applied to the 2-tap 4-phase, the 2-tap 2-phase, and the 1-tap 4-phase described above. In the description below, explanation is continued, taking as an example a case where the present technology is applied to the 2-tap 4-phase.

First Embodiment

<Distance Measurement Using Two Frequencies>

In a case where the distance to an object is measured by irradiating the object with light emitted by the light emitting unit 14 (FIG. 1), receiving the reflected light of the irradiation light reflected by the object, and measuring the time from the emission of the irradiation light till the reception of the reflected light by the method described above, such as the method referred to as the 2-tap 4-phase, for example, the measurable distance depends on the frequency of the irradiation light emitted by the light emitting unit 14.

FIG. 20A is a graph showing the relationship between the phase difference and the distance in a case where the irradiation light has a high frequency. FIG. 20B is a graph showing the relationship between the phase difference and the distance in a case where the irradiation light has a low frequency. In the graph in FIGS. 20A and 20B, the ordinate axis indicates the phase difference, and the abscissa axis indicates the distance. The phase difference is the phase difference $\theta$ calculated according to Expression (1) shown above, and the distance is the distance D calculated according to Expression (2) shown above.

Note that a high frequency and a low frequency indicate a case where one of the frequencies is set as the reference frequency, and the other frequency is higher or lower than the reference frequency. For example, when a high frequency is set as the reference frequency, a frequency lower than the high frequency is referred to as a low frequency. Further, the high frequency and the low frequency may be variable or fixed. As will be described later, the measurable distance range is determined by frequencies, and accordingly, the present technology can also be applied in a case where the frequencies are variable, and the measurable distance range can be changed.

Referring to FIG. 20A, a case where irradiation light has a high frequency (here, a frequency fh), and the measurable distance range is from 0 to 1.5 (m) in the one cycle is described. In such a case, the distance D corresponding to the phase difference $\theta = 0$ to $2\pi$ is 0 to 1.5 (m).

In a case where a phase difference $\theta h$ is calculated as the phase difference $\theta$, the distances D calculated from the phase difference $\theta h$ include a distance Dh1, a distance Dh2, a distance Dh3, a distance Dh4, and a distance Dh5. In this case, when the phase difference $\theta h$ is calculated, it is unknown whether the distance is the distance Dh1 between 0 and 1.5 (m), the distance Dh2 between 1.5 and 3.0 (m), the distance Dh3 between 3.0 and 4.5 (m), the distance Dh4 between 4.5 and 6.0 (m), or the distance Dh5 between 6.0 and 7.5 (m), and therefore, the distance cannot be determined.

In a case where the frequency of the irradiation light is the frequency fh, the distance can be uniquely obtained in the range of 0 to 1.5 (m). However, for distances equal to or longer than 1.5 (m), there is a possibility of incorrect results.

Referring to FIG. 20B, a case where irradiation light has a low frequency (here, a frequency fl), and the measurable distance range is from 0 to 2.5 (m) in the one cycle is described. In such a case, the distance D corresponding to the phase difference $\theta=0$ to $2\pi$ is 0 to 2.5 (m).

In a case where a phase difference $\theta 1$ is calculated as the phase difference $\theta$, the distances D calculated from the phase difference $\theta 1$ include a distance Dl1, a distance Dl2, and a distance Dl3. In this case, when the phase difference $\theta 1$ is calculated, it is unknown whether the distance is the distance Dl1 between 0 and 2.5 (m), the distance Dl2 between 2.5 and 5.0 (m), or the distance Dl3 between 5.0 and 7.5 (m), and therefore, the distance cannot be determined.

In a case where the frequency of the irradiation light is the frequency fl, the distance can be uniquely obtained in the range of 0 to 2.5 (m). However, for distances equal to or longer than 2.5 (m), there is a possibility of incorrect results.

Thus, the measurable distance range depends on the frequency of the irradiation light. In a case where the frequency of the irradiation light is a high frequency, or where the pulse width is small, the measurable distance range is short, but the resolution can be increased. On the other hand, in a case where the frequency of the irradiation light is a low frequency, or where the pulse width is great, the measurable distance range is wide, but there is a possibility that the resolution will be low.

To extend the measurable distance range, and to maintain or increase the resolution, high frequency and low frequency are used as the frequencies of the irradiation light. This aspect is now described, with reference to FIG. 21.

Figure 21:
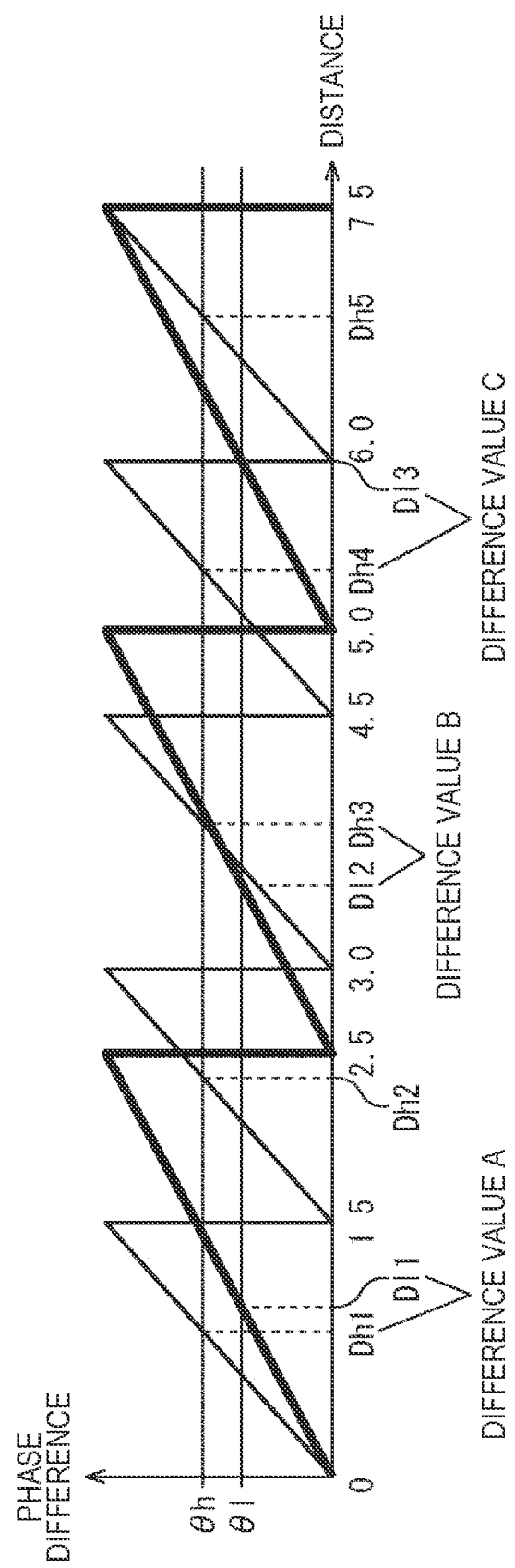
FIG. 21 is a chart for explaining a measurable distance range.

FIG. 21 is a graph in which the graph in the case of the high frequency shown in FIG. 20A and the graph of the low frequency shown in FIG. 20B are overlapped on each other. In FIG. 21, when distance measurement is performed at the high frequency of the frequency fh, the phase difference $\theta h$ is detected as the phase difference, and the distance Dh1, the distance Dh2, the distance Dh3, the distance Dh4, and the distance Dh5 are calculated as candidates for the distance to be specified by the phase difference $\theta h$, as in the case described above with reference to FIG. 20A.

Also, in FIG. 21, when distance measurement is performed at the low frequency of the frequency fl, the phase difference $\theta l$ is detected as the phase difference, and the distance Dl1, the distance Dl2, and the distance Dl3 are calculated as candidates for the distance to be specified by the phase difference $\theta l$, as in the case described above with reference to FIG. 20B.

As described above, when there is a plurality of candidates for a distance measurement result, it is possible to uniquely determine one result from the plurality of candidates by comparing the candidate obtained as a result of distance measurement performed at the high frequency of the frequency fh with the candidate obtained as a result of distance measurement performed at the low frequency of the frequency fl. An example of the process is now described.

When the distance Dl1 is compared with the distance Dh1, the distance Dh2, the distance Dh3, the distance Dh4, and the distance Dh5, the distance closest to the distance Dl1 is determined to be the distance Dh1. The comparison is performed by calculating differences, for example. The distance Dh having the smallest difference is determined. In this case, the difference value (referred to as the difference value A) between the distance Dl1 and the distance Dh1 is the smallest, and thus, the distance Dh1 is determined to be a candidate for the distance measurement result.

When the distance Dl2 is compared with the distance Dh1, the distance Dh2, the distance Dh3, the distance Dh4, and the distance Dh5, the distance closest to the distance Dl2 is determined to be the distance Dh3. In this case, the difference value (referred to as the difference value B) between the distance Dl2 and the distance Dh3 is the smallest, and thus, the distance Dh3 is determined to be a candidate for the distance measurement result.

When the distance Dl3 is compared with the distance Dh1, the distance Dh2, the distance Dh3, the distance Dh4, and the distance Dh5, the distance closest to the distance Dl3 is determined to be the distance Dh4. In this case, the difference value (referred to as the difference value C) between the distance Dl3 and the distance Dh4 is the smallest, and thus, the distance Dh4 is determined to be a candidate for the distance measurement result.

The difference value A, the difference value B, and the difference value C are compared with one another, and the smallest value is detected. As shown in FIG. 21, the difference value A is the smallest, and thus, the difference value A is detected. The difference value A is the difference value between the distance Dl1 and the distance Dh1. Accordingly, in such a case, the distance Dh1 is uniquely determined to be the distance measurement result.

In this manner, distance measurement is performed with irradiation light at two different frequencies, and distance measurement results obtained at the respective frequencies are compared with one another, so that a distance measurement result can be uniquely determined from a plurality of candidates.

As distance measurement is performed with irradiation light at two different frequencies as described above, the measurable distance range can be extended. For example, in the description with reference to FIGS. 20A, 20B and 21, 0 to 1.5 (m) is the measurable distance range in a case where only the high frequency is used, and 0 to 2.5 (m) is the measurable distance range in a case where only the low frequency is used. However, 0 to 7.5 (m) is the measurable distance range in a case where the high frequency and the low frequency are used.

That is, the measurable distance range is the least common multiple of one cycle of the low frequency and one cycle of the high frequency. Accordingly, it is possible to extend the measurable distance range, depending on the frequencies to be combined.

Furthermore, as two different frequencies are used, the resolution is not lowered. Thus, it is possible to extend the measurable distance range while maintaining the resolution.

Figure 22:
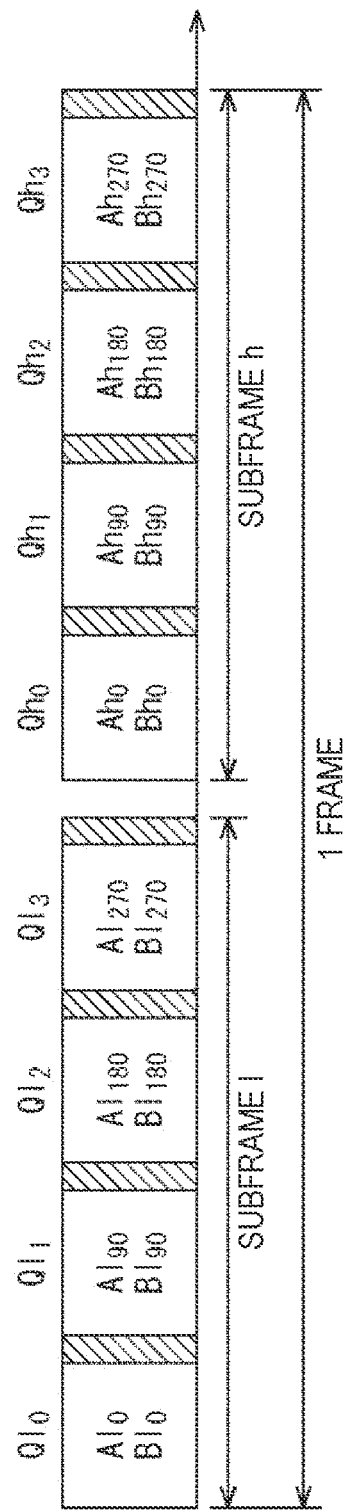
FIG. 22 is a chart for explaining distance measurement using two frequencies.

In a case where distance measurement is performed by emitting both low-frequency irradiation light and high-frequency irradiation light in the above manner, or in a case where distance measurement is performed by the 2-tap 4-phase method described above, distance measurement is performed as shown in FIG. 22.

Note that, in the description below, explanation is continued, taking as an example a case where distance measurement is performed with the two kinds of frequencies of low-frequency irradiation light and high-frequency irradiation light. However, distance measurement using two or more kinds of frequencies may be performed.

One frame includes a frame for performing distance measurement using low-frequency irradiation light (this frame will be hereinafter referred to as the subframe l), and a frame for performing distance measurement using high-frequency irradiation light (this frame will be hereinafter referred to as the subframe h).

As in the case of the 2-tap 4-phase method described above with reference to FIG. 16, the subframe l and the subframe h each include four detection periods, and a detection signal A and a detection signal B are acquired during each detection period.

The subframe l includes a detection period Ql0, a detection period Ql1, a detection period Ql2, and a detection period Ql3. During the detection period Ql0, a detection signal Al0 and a detection signal Bl0 are acquired. During the detection period Ql1, a detection signal Al90 and a detection signal Bl90 are acquired. During the detection period Ql2, a detection signal Al180 and a detection signal Bl180 are acquired. During the detection period Ql3, a detection signal Al270 and a detection signal Bl270 are acquired.

The subframe h includes a detection period Qh0, a detection period Qh1, a detection period Qh2, and a detection period Qh3. During the detection period Qh0, a detection signal Ah0 and a detection signal Bh0 are acquired. During the detection period Qh1, a detection signal Ah90 and a detection signal Bh90 are acquired. During the detection period Qh2, a detection signal Ah180 and a detection signal Bh180 are acquired. During the detection period Qh3, a detection signal Ah270 and a detection signal Bh270 are acquired.

Figure 23:
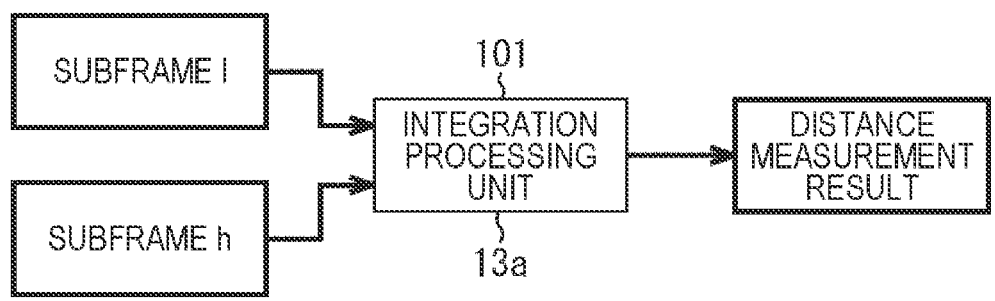
FIG. 23 is a diagram showing an example configuration of a signal processing unit.

In a case where distance measurement is performed by emitting both low-frequency irradiation light and high-frequency irradiation light in this manner, a signal processing unit 13a includes an integration processing unit 101 shown in FIG. 23, and the subframe l and the subframe h are processed by the integration processing unit 101, so that distance measurement is performed.

The subframe l and the subframe h are sequentially supplied from the light receiving unit 12 (FIG. 1) to the integration processing unit 101. Note that, although the subframe h is supplied after the subframe l in the explanation continued below, the subframe l may be supplied after the subframe h. In other words, distance measurement with high-frequency irradiation light may be performed after distance measurement with low-frequency irradiation light, or distance measurement with low-frequency irradiation light may be performed after distance measurement with high-frequency irradiation light.

As described above with reference to FIG. 21, the integration processing unit 101 specifies one distance using a distance candidate obtained through distance measurement with low-frequency irradiation light and a distance candidate obtained through distance measurement with high-frequency irradiation light, and outputs the specified one distance as a distance measurement result.

Figure 24:
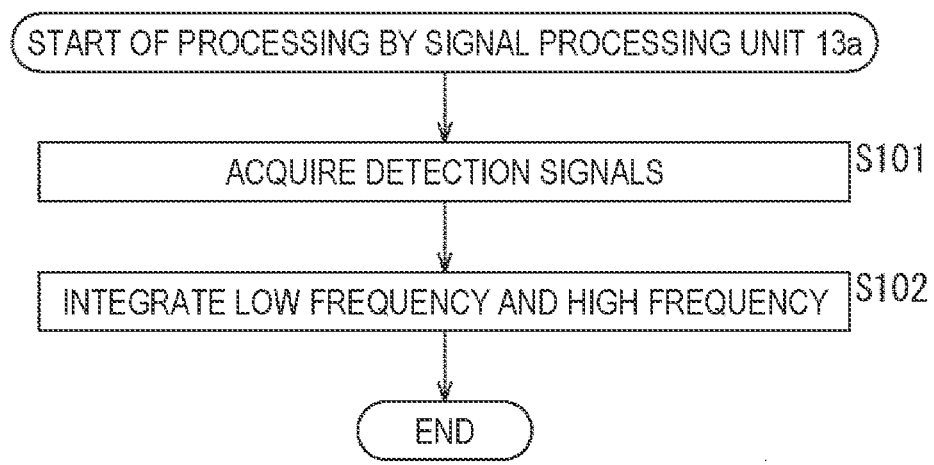
FIG. 24 is a chart for explaining operation of the signal processing unit.

Referring now to a flowchart shown in FIG. 24, a process to be performed by the integration processing unit 101 included in the signal processing unit 13a shown in FIG. 23 is additionally described.

In step S101, the integration processing unit 101 acquires detection signals. As described above with reference to FIG. 22, in a case where distance measurement is performed with low-frequency irradiation light, followed by distance measurement using high-frequency irradiation light, the integration processing unit 101 sequentially acquires the detection signal Al0 and the detection signal Bl0, the detection signal Al90 and the detection signal Bl90, the detection signal Al180 and the detection signal Bl180, and the detection signal Al270 and the detection signal Bl270.

After the detection signals included in the subframe l are acquired, the detection signals included in the subframe h are sequentially acquired. That is, the integration processing unit 101 sequentially acquires the detection signal Ah0 and the detection signal Bh0, the detection signal Ah90 and the detection signal Bh90, the detection signal Ah180 and the detection signal Bh180, and the detection signal Ah270 and the detection signal Bh270.

In step S102, the integration processing unit 101 measures the distance to the object, by integrating the detection signals obtained at the time of emission of the low-frequency irradiation light and the detection signals obtained at the time of emission of the high-frequency irradiation light.

Using the detection signal Al0 and the detection signal Bl0, the detection signal Al90 and the detection signal Bl90, the detection signal Al180 and the detection signal Bl180, and the detection signal Al270 and the detection signal Bl270 obtained at the time of emission of the low-frequency irradiation light, the integration processing unit 101 calculates a phase difference on the basis of Expression (1), and calculates a distance on the basis of Expression (2), as described above with reference to FIG. 16. A plurality of candidates can be considered as the distance calculated at this stage, as described above with reference to FIG. 20A.

Using the detection signal Ah0 and the detection signal Bh0, the detection signal Ah90 and the detection signal Bh90, the detection signal Ah180 and the detection signal Bh180, and the detection signal Ah270 and the detection signal Bh270 obtained at the time of emission of the high-frequency irradiation light, the integration processing unit 101 calculates a phase difference on the basis of Expression (1), and calculates a distance on the basis of Expression (2), as described above with reference to FIG. 16. A plurality of candidates can be considered as the distance calculated at this stage, as described above with reference to FIG. 20B.

As described with reference to FIG. 21, a distance can be uniquely detected from the distance Dl calculated from the detection signals obtained at the time of emission of the low-frequency irradiation light, and the distance Dh calculated from the detection signal obtained at the time of emission of the high-frequency irradiation light. The integration processing unit 101 calculates a distance measurement result by integrating the result obtained from the low-frequency irradiation light and the result obtained from the high-frequency irradiation light.

As distance measurement is performed by emitting both the low-frequency irradiation light and the high-frequency irradiation light, and the obtained results are integrated as described above, the measurable distance range can be extended while a resolution of a predetermined accuracy is maintained.

Second Embodiment

<Distance Measurement Using Two Exposure Times>

Figure 3:
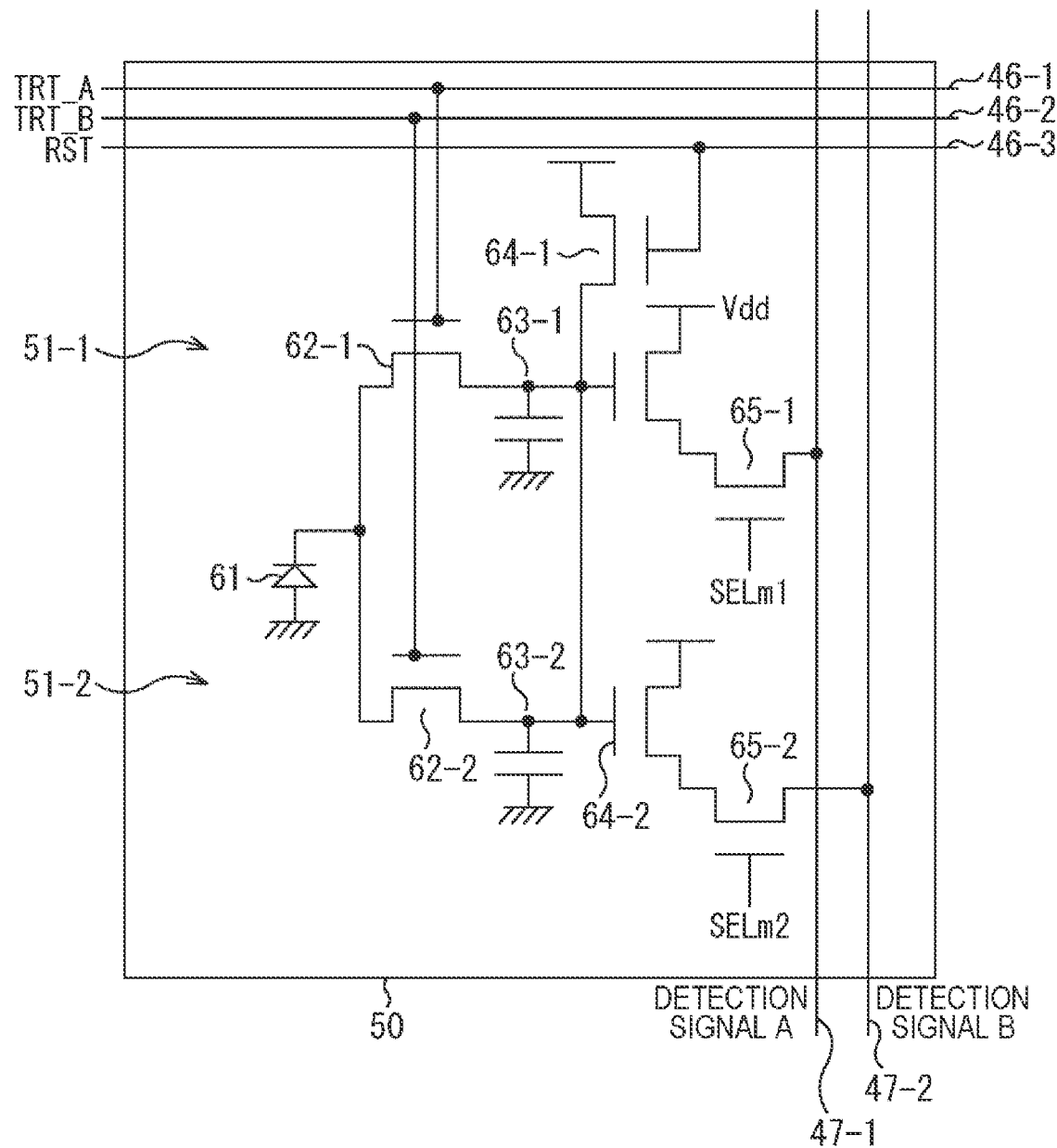
FIG. 3 is a diagram showing an example configuration of a pixel.

As described above with reference to FIG. 2, the light receiving unit 12 (FIG. 1) includes the pixel array unit 41 and includes the photodiodes 61 (FIG. 3). An image sensor including such photodiodes is assumed to be used in various environments such as indoors, outdoors, daytime, and nighttime. An electronic shutter operation or the like is performed to adjust the exposure time by controlling the charge accumulation period in the photodiodes and optimize sensitivity, in accordance with a change in external light or the like.

Further, for image sensors, a technique for successively capturing a plurality of images with different exposure times and combining the images is known as a method for expanding the dynamic range. That is, this is a technique for generating one image by performing a combining process in which a long-time exposure image and a short-time exposure image are successively and individually captured, the long-time exposure image is used for a dark image region, and the short-time exposure image is used for a bright image region that is likely to be overexposed in a long-time exposure image. By combining a plurality of different exposure images in this manner, it is possible to obtain an image with a wide dynamic range without overexposure, or a high dynamic range image (HDR image).

The same applies to the distance measuring device 10 that performs distance measurement by TOF. In a case where saturation has occurred, there is a possibility that accurate detection signals cannot be obtained, and distance measurement cannot be performed. In the distance measuring device 10, it is also preferable to perform control so that saturation does not occur. In the distance measuring device 10 that performs distance measurement by TOF, imaging capable of obtaining a high dynamic range is also performed, and a situation in which distance measurement cannot be performed is avoided.

Distance measurement to be performed by the distance measuring device 10 to obtain a high dynamic range by successively and individually capturing a long-time exposure image and a short-time exposure image is now described.

Figure 25:
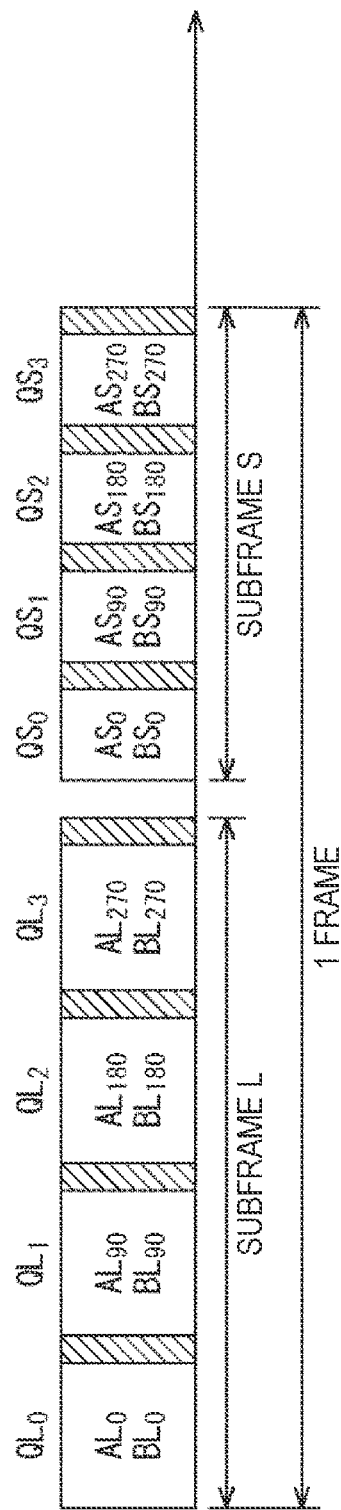
FIG. 25 is a chart for explaining distance measurement using two exposure times.

As described above, in a case where distance measurement is performed by capturing images through both long-time exposure and short-time exposure, or where distance measurement is performed by the 2-tap 4-phase method described above, distance measurement is performed as shown in FIG. 25.

Note that the long-time exposure and the short-time exposure refer to a case where one exposure time is set as the reference, and the other exposure time is longer or shorter than the reference. For example, when the long-time exposure is set as the reference, an exposure time shorter than the exposure time of the long-time exposure is described as the short-time exposure. The long-time exposure and the short-time exposure may be variable, or may be fixed. In a case where the exposure times are variable, each exposure time can be set by so-called automatic exposure (AE).

Alternatively, one of the long-time exposure and the short-time exposure may be variable, while the other is fixed. Further, both the long-time exposure and the short-time exposure may be fixed. The long-time exposure and the short-time exposure may be set at a predetermined ratio. One of the long-time exposure and the short-time exposure may be variable, and the other exposure time may be set at a predetermined ratio with respect to the variable exposure time.

Note that, although distance measurement using two kinds of exposure times is described as an example herein, the present technology can also be applied in a case where distance measurement is performed with two or more kinds of exposure times.

One frame includes a frame for performing distance measurement by capturing an image through long-time exposure (this frame will be hereinafter referred to as the subframe L), and a frame for performing distance measurement by capturing an image through short-time exposure (this frame will be hereinafter referred to as the subframe S).

As in the case of the 2-tap 4-phase method described above with reference to FIG. 16, the subframe L and the subframe S each include four detection periods, and a detection signal A and a detection signal B are acquired during each detection period.

The subframe L includes a detection period QL0, a detection period QL1, a detection period QL2, and a detection period QL3. During the detection period QL0, a detection signal AL0 and a detection signal BL0 are acquired. During the detection period QL1, a detection signal AL90 and a detection signal BL90 are acquired. During the detection period QL2, a detection signal AL180 and a detection signal BL180 are acquired. During the detection period QL3, a detection signal AL270 and a detection signal BL270 are acquired.

The subframe S includes a detection period QS0, a detection period QS1, a detection period QS2, and a detection period QS3. During the detection period QS0, a detection signal AS0 and a detection signal BS0 are acquired. During the detection period QS1, a detection signal AS90 and a detection signal BS90 are acquired. During the detection period QS2, a detection signal AS180 and a detection signal BS180 are acquired. During the detection period QS3, a detection signal AS270 and a detection signal BS270 are acquired.

Figure 26:
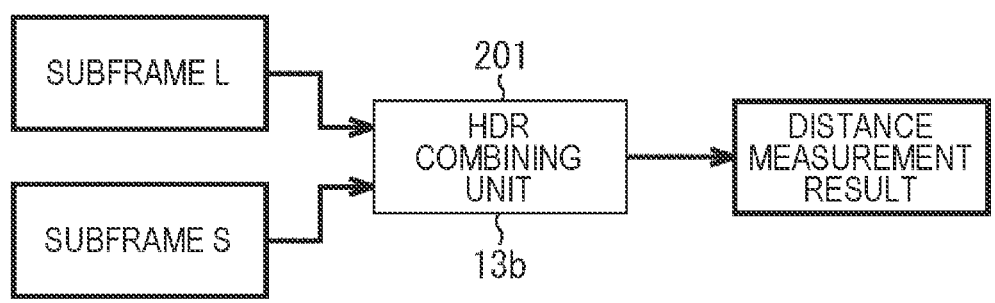
FIG. 26 is a diagram showing an example configuration of a signal processing unit.

In a case where the distance measurement is performed with the detection signals obtained by imaging with long-time exposure and the detection signals obtained by imaging with short-time exposure as described above, a signal processing unit 13b includes a HDR combining unit 201 shown in FIG. 26, and the subframe L and the subframe S are processed by the HDR combining unit 201, so that distance measurement is performed.

The subframe L and the subframe S are sequentially supplied from the light receiving unit 12 (FIG. 1) to the HDR combining unit 201. Note that, although the subframe S is supplied after the subframe L in the explanation continued below, the subframe L may be supplied after the subframe S. In other words, distance measurement by short-time exposure may be performed after distance measurement by long-time exposure, or distance measurement by long-time exposure may be performed after distance measurement by short-time exposure.

Figure 27:
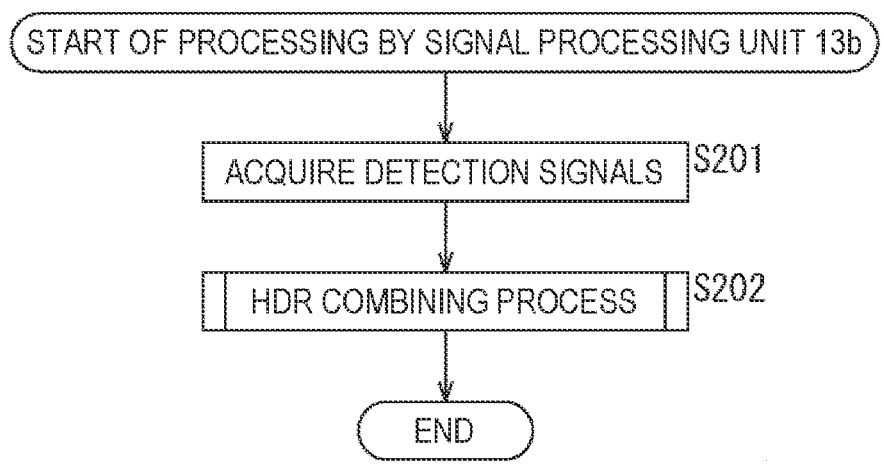
FIG. 27 is a chart for explaining operation of the signal processing unit.

Referring now to a flowchart shown in FIG. 27, a process to be performed by the HDR combining unit 201 included in the signal processing unit 13b shown in FIG. 26 is additionally described.

In step S201, the HDR combining unit 201 acquires detection signals. As described above with reference to FIG. 25, in a case where distance measurement is performed through long-time exposure, followed by distance measurement through short-time exposure, the HDR combining unit 201 sequentially acquires the detection signal AL0 and the detection signal BL0, the detection signal AL90 and the detection signal BL90, the detection signal AL180 and the detection signal BL180, and the detection signal AL270 and the detection signal BL270.

After the detection signals included in the subframe L are acquired, the detection signals included in the subframe S are sequentially acquired. That is, the HDR combining unit 201 sequentially acquires the detection signal AS0 and the detection signal BS0, the detection signal AS90 and the detection signal BS90, the detection signal AS180 and the detection signal BS180, and the detection signal AS270 and the detection signal BS270.

In step S202, the HDR combining unit 201 generates a HDR image by combining the detection signals obtained during the long-time exposure and the detection signals obtained during the short-time exposure.

Figure 28:
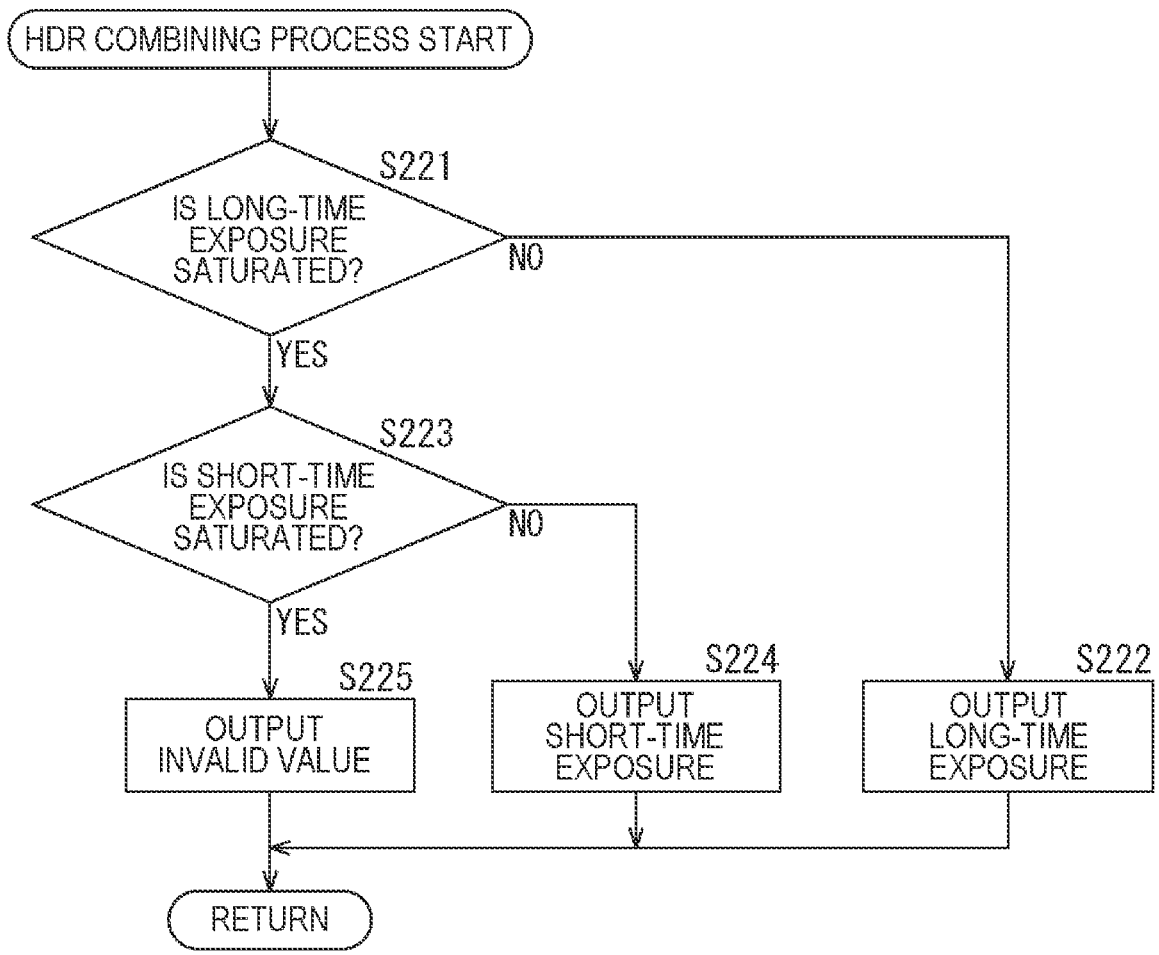
FIG. 28 is a chart for explaining a HDR combining process.

Referring now to a flowchart in FIG. 28, the HDR combining process in step S202 is described. The HDR combining process to be described with reference to the flowchart of FIG. 28 is performed for each pixel.

In step S221, a check is made to determine whether or not the imaging by long-time exposure at the process target pixel is saturated. If it is determined in step S221 that the imaging by long-time exposure is not saturated, the process moves on to step S222.

In step S222, since the imaging by long-time exposure is not saturated, the HDR combining unit 201 outputs the distance measurement result obtained during the imaging by long-time exposure. In a case where the imaging by long-time exposure is not saturated, the HDR combining unit 201 calculates the distance D using the detection results AL0 to AL270 and the detection results BL0 to BL270 obtained in the subframe L, and outputs the calculation result as a distance measurement result. What is calculated at this time is the distance to the object imaged by the process target pixel.

Note that, in a case where the imaging by long-time exposure is not saturated, there is a high possibility that the imaging by short-time exposure is not saturated either. Therefore, the detection signals obtained by the long-time exposure imaging and the detection signals obtained by the short-time exposure imaging may be combined by a predetermined method, such as multiplying each of the detection signals by a weighting coefficient and adding up the resultant detection signals, for example. The distance D may then be calculated from the combined signal.

If it is determined in step S221 that the imaging by long-time exposure at the process target pixel is saturated, on the other hand, the process moves on to step S223. In step S223, a check is made to determine whether or not the imaging by short-time exposure is saturated. If it is determined in step S223 that the imaging by short-time exposure is not saturated, the process moves on to step S224.

In step S224, since the imaging by short-time exposure is not saturated, the HDR combining unit 201 outputs the distance measurement result obtained during the imaging by short-time exposure. In a case where the imaging by short-time exposure is not saturated, the HDR combining unit 201 calculates the distance D using the detection results AS0 to AS270 and the detection results BS0 to BS270 obtained in the subframe S, and outputs the calculation result as a distance measurement result. What is calculated at this time is the distance to the object imaged by the process target pixel.

If it is determined in step S223 that the imaging by short-time exposure is saturated, on the other hand, the process moves on to step S225. A case where the process moves on to step S225 is a case where the imaging by long-time exposure is saturated, and the imaging by short-time exposure is also saturated. Therefore, an invalid value is output.

As such a process is performed for each of the pixels included in one frame, a distance is calculated with the use of the detection signals obtained by the long-time exposure imaging in the pixels not saturated by the long-time exposure imaging, and a distance is calculated with the use of the detection signals obtained by the short-time exposure imaging in the pixels saturated by the long-time exposure imaging. Thus, distance measurement with a high dynamic range can be performed in one frame (one image).

Both the imaging by long-time exposure and the imaging by short-time exposure are performed, and the obtained results are combined as described above. Thus, distance measurement with a high dynamic range can be performed.

Third Embodiment

<Distance Measurement Using Two Frequencies and Two Exposure Times>

By distance measurement using irradiation light at the two frequencies of a high frequency and a low frequency as in the first embodiment, the measurable distance range can be extended. However, there is a possibility that saturation occurs at a time of imaging, and a situation in which distance measurement cannot be performed might occur.

By distance measurement using the two exposure times of long-time exposure and short-time exposure as in the second embodiment, it is possible to lower the possibility of saturation during imaging, and perform distance measurement with a high dynamic range. However, the measurable distance range depends on the frequency of the irradiation light, and there is a possibility that distance measurement in a predetermined distance range cannot be performed.

Therefore, in a third embodiment described below, the first embodiment and the second embodiment are combined, and distance measurement using irradiation light at the two frequencies of a high frequency and a low frequency is combined with distance measurement using the two exposure times of long-time exposure and short-time exposure, so that distance measurement with a high dynamic range can be performed, and the measurable distance range can be extended. The third embodiment is further explained below.

Figure 29:
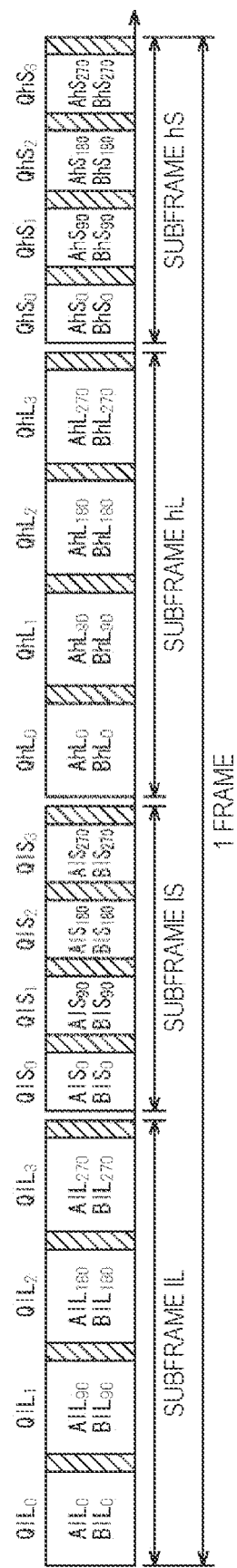
FIG. 29 is a chart for explaining distance measurement using two frequencies and two exposure times.

In a case where distance measurement is performed by combining distance measurement using irradiation light at the two frequencies of a high frequency and a low frequency with distance measurement using the two exposure times of long-time exposure and short-time exposure as described above, or where distance measurement is performed by the 2-tap 4-phase method described above, distance measurement is performed as shown in FIG. 29.

One frame includes a frame for performing distance measurement by emitting low-frequency irradiation light and performing imaging through long-time exposure (this frame will be hereinafter referred to as the subframe lL), a frame for performing distance measurement by emitting low-frequency irradiation light and performing imaging through short-time exposure (this frame will be hereinafter referred to as the subframe lS), a frame for performing distance measurement by emitting high-frequency irradiation light and performing imaging through long-time exposure (this frame will be hereinafter referred to as the subframe hL), and a frame for performing distance measurement by emitting high-frequency irradiation light and performing imaging through short-time exposure (this frame will be hereinafter referred to as the subframe hS).

Note that, although explanation is continued by taking as an example a case where distance measurement with high-frequency irradiation light is performed after distance measurement with low-frequency irradiation light, distance measurement with low-frequency irradiation light may be performed after distance measurement with high-frequency irradiation light. Also, although explanation is continued by taking as an example a case where distance measurement through short-time exposure is performed after distance measurement through long-time exposure, distance measurement through long-time exposure may be performed after distance measurement through short-time exposure.

As in the case of the 2-tap 4-phase method described above with reference to FIG. 16, the subframe lL, the subframe lS, the subframe hL, and the subframe hS each include four detection periods, and a detection signal A and a detection signal B are acquired during each detection period.

The subframe lL includes a detection period QlL0, a detection period QlL1, a detection period QlL2, and a detection period QlL3. During the detection period QlL0, a detection signal AlL0 and a detection signal BlL0 are acquired. During the detection period QlL1, a detection signal AlL90 and a detection signal BlL90 are acquired. During the detection period QlL2, a detection signal AlL180 and a detection signal BlL180 are acquired. During the detection period QlL3, a detection signal AlL270 and a detection signal BlL270 are acquired.

The subframe lS includes a detection period QlS0, a detection period QlS1, a detection period QlS2, and a detection period QlS3. During the detection period QlS0, a detection signal AlS0 and a detection signal BlS0 are acquired. During the detection period QlS1, a detection signal AlS90 and a detection signal BlS90 are acquired. During the detection period QlS2, a detection signal AlS180 and a detection signal BlS180 are acquired. During the detection period QlS3, a detection signal AlS270 and a detection signal BlS270 are acquired.

The subframe hL includes a detection period QhL0, a detection period QhL1, a detection period QhL2, and a detection period QhL3. During the detection period QhL0, a detection signal AhL0 and a detection signal BhL0 are acquired. During the detection period QhL1, a detection signal AhL90 and a detection signal BhL90 are acquired. During the detection period QhL2, a detection signal AhL180 and a detection signal BhL180 are acquired. During the detection period QhL3, a detection signal AhL270 and a detection signal BhL270 are acquired.

The subframe hS includes a detection period QhS0, a detection period QhS1, a detection period QhS2, and a detection period QhS3. During the detection period QhS0, a detection signal AhS0 and a detection signal BhS0 are acquired. During the detection period QhS1, a detection signal AhS90 and a detection signal BhS90 are acquired. During the detection period QhS2, a detection signal AhS180 and a detection signal BhS180 are acquired. During the detection period QhS3, a detection signal AhS270 and a detection signal BhS270 are acquired.

Figure 30:
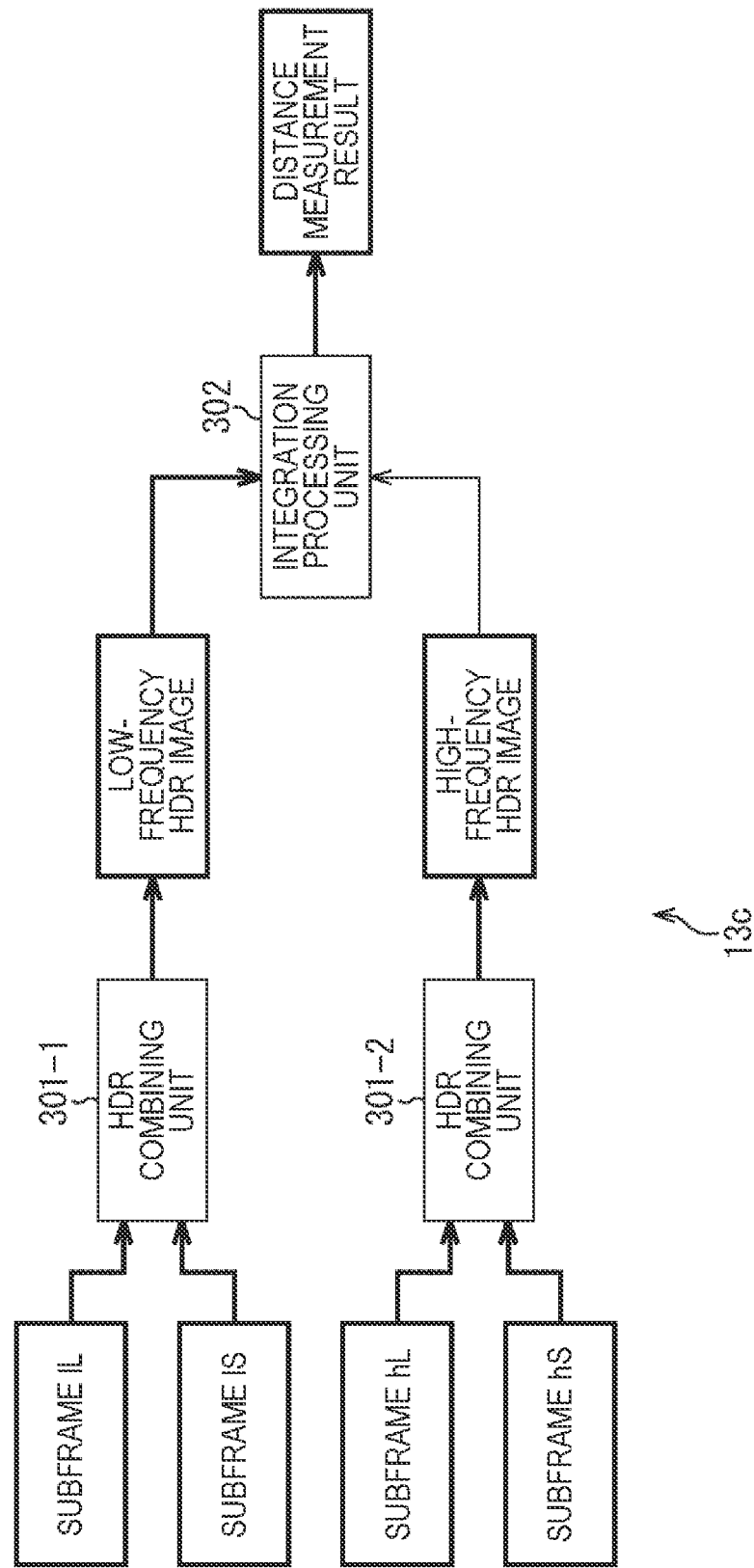
FIG. 30 is a diagram showing an example configuration of a signal processing unit.

In a case where distance measurement is performed with the use of the detection signals obtained by emitting the low-frequency irradiation light and performing imaging through long-time exposure, the detection signals obtained by emitting the low-frequency irradiation light and performing imaging through short-time exposure, the detection signals obtained by emitting the high-frequency irradiation light and performing imaging through long-time exposure, and the detection signals obtained by emitting the high-frequency irradiation light and performing imaging through short-time exposure, a signal processing unit 13c has a configuration shown in FIG. 30.

The signal processing unit 13c includes a HDR combining unit 301-1, a HDR combining unit 301-2, and an integration processing unit 302. The HDR combining unit 301-1 and the HDR combining unit 301-2 combine an imaging result of long-time exposure and an imaging result of short-time exposure.

The subframe lL and the subframe lS are sequentially supplied from the light receiving unit 12 (FIG. 1) to the HDR combining unit 301-1. The HDR combining unit 301-1 generates a low-frequency HDR image from the supplied subframe lL and subframe lS, and supplies the image to the integration processing unit 302.

The subframe hL and the subframe hS are sequentially supplied from the light receiving unit 12 (FIG. 1) to the HDR combining unit 301-2. The HDR combining unit 301-2 generates a high-frequency HDR image from the supplied subframe hL and subframe hS, and supplies the image to the integration processing unit 302.

Like the integration processing unit 101 shown in FIG. 23, the integration processing unit 302 calculates the distance to a predetermined object by integrating the detection signals obtained during the imaging with the low-frequency irradiation light, which are a low-frequency HDR image in this case, and the detection signals obtained during the imaging with the high-frequency irradiation light, which are a high-frequency HDR image in this case, and outputs the calculated distance as a distance measurement result.

Figure 31:
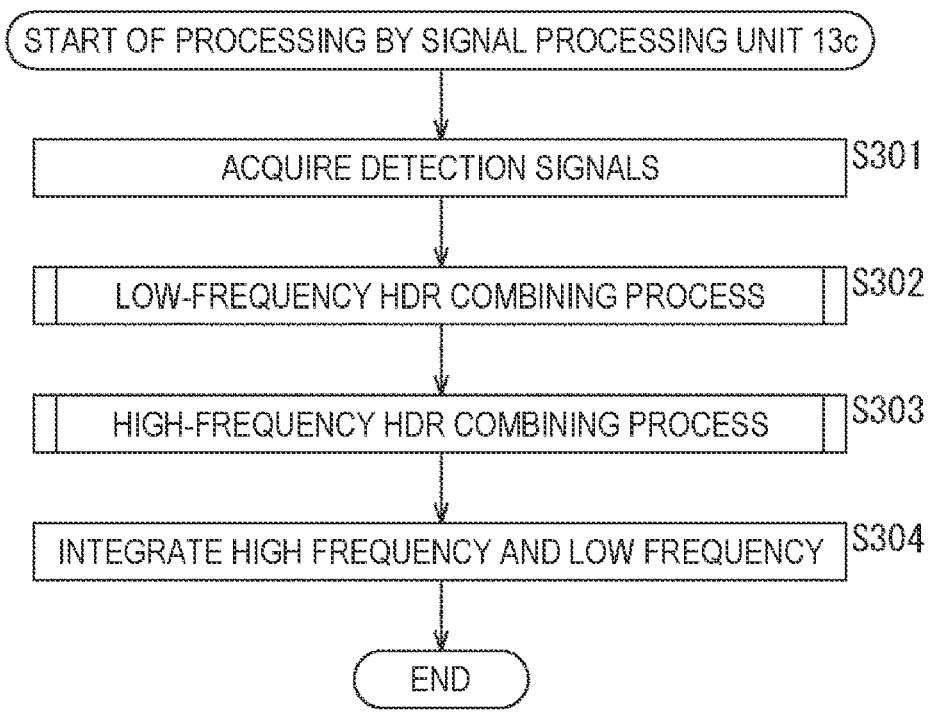
FIG. 31 is a chart for explaining operation of the signal processing unit.

Referring now to a flowchart shown in FIG. 31, a process to be performed by the HDR combining units 301 and the integration processing unit 302 included in the signal processing unit 13 shown in FIG. 30 is additionally described.

In step S301, the signal processing unit 13 acquires detection signals.

The HDR combining unit 301-1 sequentially acquires the detection signal AlL0 and the detection signal BlL0, the detection signal AlL90 and the detection signal BlL90, the detection signal AlL180 and the detection signal BlL180, and the detection signal AlL270 and the detection signal BlL270, which are included in the subframe lL.

The HDR combining unit 301-1 also sequentially acquires the detection signal AlS0 and the detection signal BlS0, the detection signal AlS90 and the detection signal BlS90, the detection signal AlS180 and the detection signal BlS180, and the detection signal AlS270 and the detection signal BlS270, which are included in the subframe lS.

The HDR combining unit 301-2 sequentially acquires the detection signal AhL0 and the detection signal BhL0, the detection signal AhL90 and the detection signal BhL90, the detection signal AhL180 and the detection signal BhL180, and the detection signal AhL270 and the detection signal BhL270, which are included in the subframe hL.

The HDR combining unit 301-2 also sequentially acquires the detection signal AhS0 and the detection signal BhS0, the detection signal AhS90 and the detection signal BhS90, the detection signal AhS180 and the detection signal BhS180, and the detection signal AhS270 and the detection signal BhS270, which are included in the subframe hS.

In step S302, the HDR combining unit 301-1 generates a HDR image to be obtained during emission of low-frequency irradiation light (this HDR image is referred to as the low-frequency HDR image), by combining the detection signals obtained during long-time exposure and the detection signals obtained during short-time exposure after emission of low-frequency irradiation light.

Figure 32:
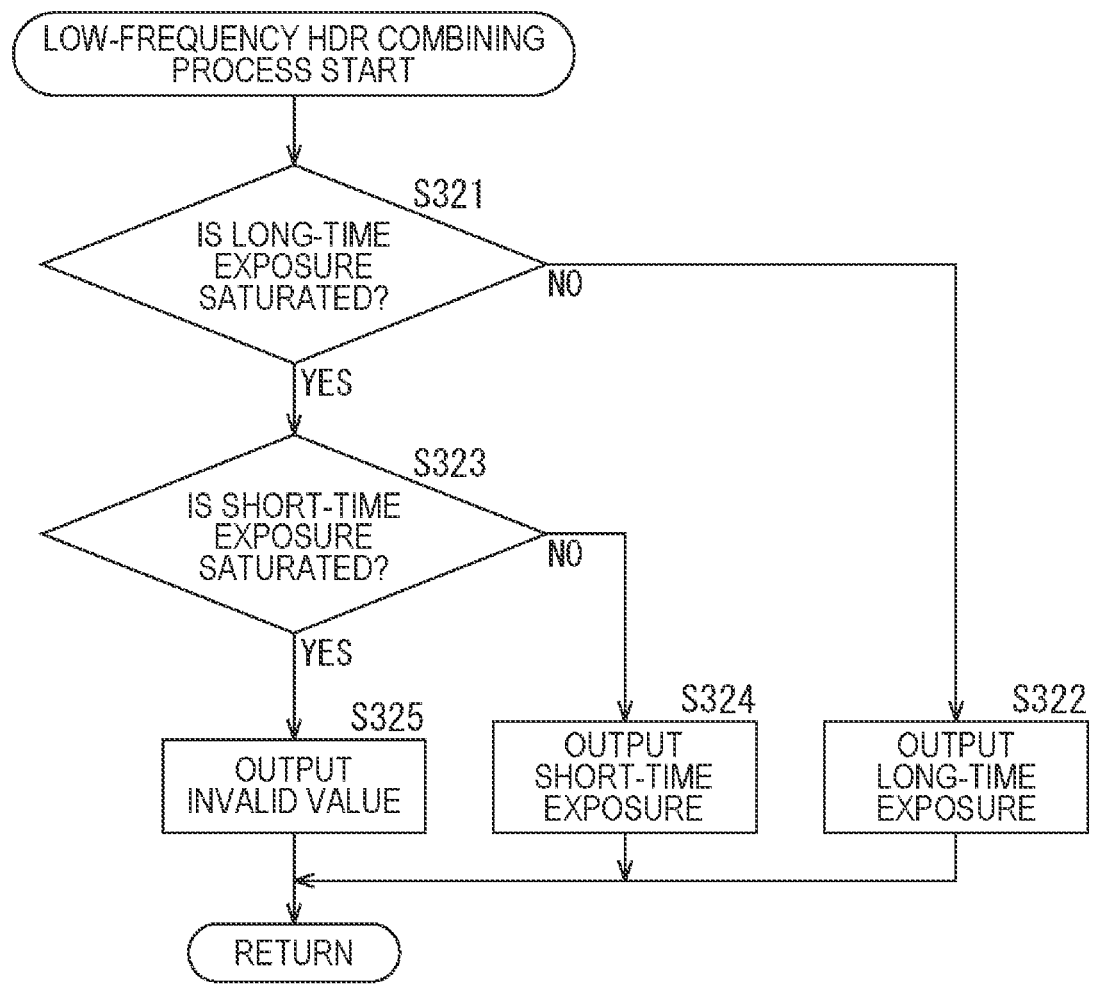
FIG. 32 is a chart for explaining a low-frequency HDR combining process.

Referring now to a flowchart in FIG. 32, the low-frequency HDR combining process in step S302 is described. The low-frequency HDR combining process to be described with reference to the flowchart in FIG. 32 is performed for each pixel.

In step S321, a check is made to determine whether or not the imaging by long-time exposure at the process target pixel is saturated. If it is determined in step S321 that the imaging by long-time exposure is not saturated, the process moves on to step S322.

In step S322, since the imaging by long-time exposure is not saturated, the HDR combining unit 301-1 outputs the result obtained during the imaging by long-time exposure. In a case where the imaging by long-time exposure is not saturated, the HDR combining unit 301-1 outputs the detection results AlL0 to AlL270 and the detection results BlL0 to BlL270 obtained from the process target pixel included in the subframe lL, as part of the low-frequency HDR image.

Although the detection signals are output as the low-frequency HDR image herein, a phase difference θ may be calculated on the basis of Expression (1) using the detection results AlL0 to AlL270 and the detection results BlL0 to BlL270 obtained in the subframe lL, and the calculation result may be output as the low-frequency HDR image. Further, a distance D (a plurality of candidates) may be calculated on the basis of Expression (2) using the phase difference θ, and the distance D may be output.

Note that, in a case where the imaging by long-time exposure is not saturated, there is a high possibility that the imaging by short-time exposure is not saturated either. Therefore, the detection signals obtained by the long-time exposure imaging and the detection signals obtained by the short-time exposure imaging may be combined by a predetermined method, such as multiplying each of the detection signals by a weighting coefficient and adding up the resultant detection signals, for example. The phase difference θ and the distance D may then be calculated from the combined signal.

If it is determined in step S321 that the imaging by long-time exposure at the process target pixel is saturated, on the other hand, the process moves on to step S323. In step S323, a check is made to determine whether or not the imaging by short-time exposure is saturated. If it is determined in step S323 that the imaging by short-time exposure is not saturated, the process moves on to step S324.

In step S324, since the imaging by short-time exposure is not saturated, the HDR combining unit 301-1 outputs the result obtained during the imaging by short-time exposure. In a case where the imaging by short-time exposure is not saturated, the HDR combining unit 301-1 outputs the detection results AlS0 to AlS270 and the detection results BlS0 to BlS270 obtained from the process target pixel included in the subframe lS, as part of the low-frequency HDR image.

Although the detection signals are output as the low-frequency HDR image herein, a phase difference θ may be calculated on the basis of Expression (1) using the detection results AlS0 to AlS270 and the detection results BlS0 to BlS270 obtained in the subframe lS, and the calculation result may be output as the low-frequency HDR image. Further, a distance D (a plurality of candidates) may be calculated on the basis of Expression (2) using the phase difference θ, and the distance D may be output.

If it is determined in step S323 that the imaging by short-time exposure is saturated, on the other hand, the process moves on to step S325. A case where the process moves on to step S325 is a case where the imaging by long-time exposure is saturated, and the imaging by short-time exposure is also saturated. Therefore, an invalid value is output for the process target pixel.

As such a process is performed for each of the pixels included in one frame, the detection signals obtained by the long-time exposure imaging are output at the pixels not saturated by the long-time exposure imaging, and the detection signals obtained by the short-time exposure imaging are output at the pixels saturated by the long-time exposure imaging.

That is, the HDR combining unit 301-1 generates the low-frequency HDR image by combining the subframe lL obtained by emitting low-frequency irradiation light and performing imaging through long-time exposure, with the subframe lS obtained by performing imaging through short-time exposure. This generated low-frequency HDR image corresponds to the subframe 1 in the distance measurement using two frequencies described above with reference to FIGS. 22 to 24.

In step S303 (FIG. 31), the HDR combining unit 301-2 generates a HDR image to be obtained during emission of high-frequency irradiation light (this HDR image is referred to as the high-frequency HDR image), by combining the detection signals obtained during long-time exposure and the detection signals obtained during short-time exposure after emission of high-frequency irradiation light.

Figure 33:
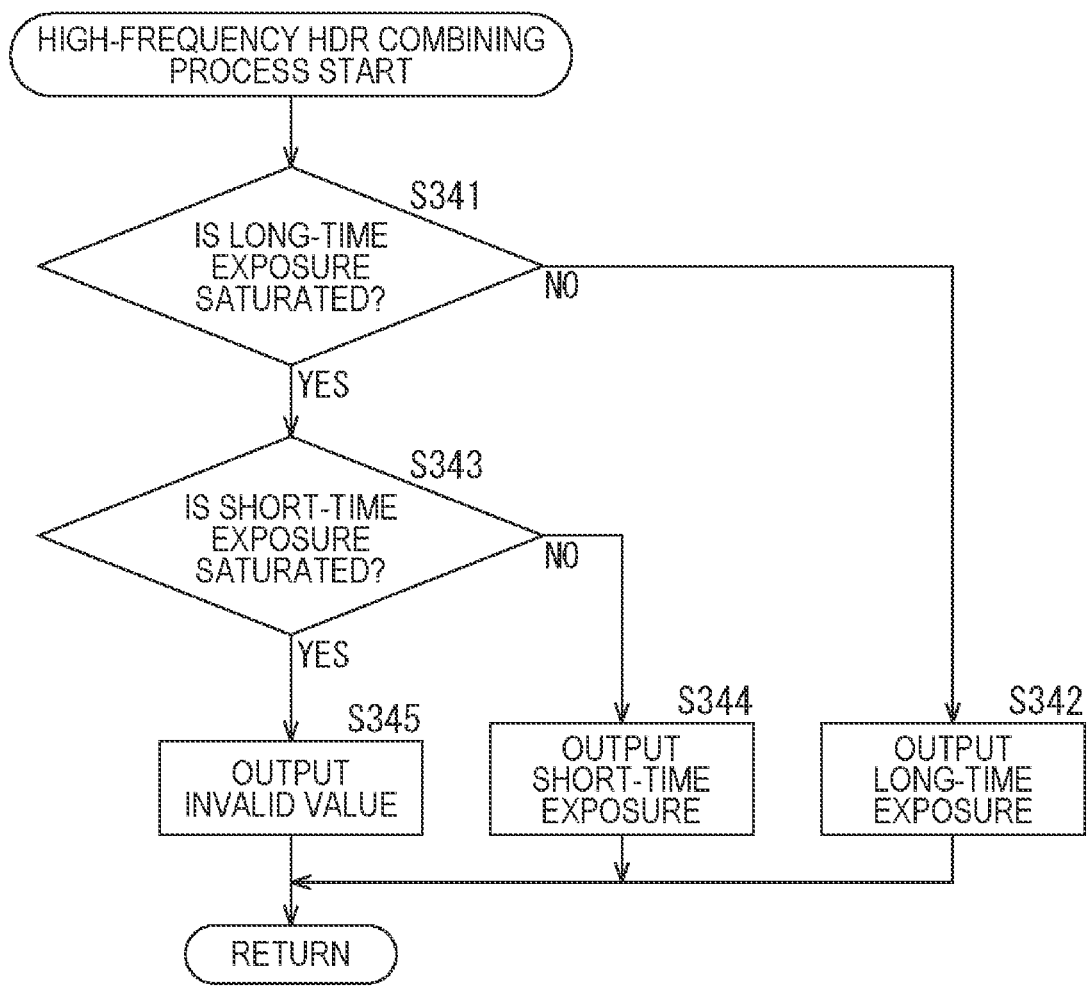
FIG. 33 is a chart for explaining a high-frequency HDR combining process.

Referring now to a flowchart in FIG. 33, the high-frequency HDR combining process in step S303 is described. The high-frequency HDR combining process to be described with reference to the flowchart in FIG. 33 is performed for each pixel.

In step S341, a check is made to determine whether or not the imaging by long-time exposure at the process target pixel is saturated. If it is determined in step S341 that the imaging by long-time exposure is not saturated, the process moves on to step S342.

In step S342, since the imaging by long-time exposure is not saturated, the HDR combining unit 301-2 outputs the result obtained during the imaging by long-time exposure. In a case where the imaging by long-time exposure is not saturated, the HDR combining unit 301-2 outputs the detection results AhL0 to AhL270 and the detection results BhL0 to BhL270 obtained from the process target pixel included in the subframe hL, as part of the high-frequency HDR image.

Although the detection signals are output as the high-frequency HDR image herein, a phase difference θ may be calculated on the basis of Expression (1) using the detection results AhL0 to AhL270 and the detection results BhL0 to BhL270 obtained in the subframe hL, and the calculation result may be output as the high-frequency HDR image. Further, a distance D (a plurality of candidates) may be calculated on the basis of Expression (2) using the phase difference θ, and the distance D may be output.

Note that, in a case where the imaging by long-time exposure is not saturated, there is a high possibility that the imaging by short-time exposure is not saturated either. Therefore, the detection signals obtained by the long-time exposure imaging and the detection signals obtained by the short-time exposure imaging may be combined by a predetermined method, such as multiplying each of the detection signals by a weighting coefficient and adding up the resultant detection signals, for example. The phase difference θ and the distance D may then be calculated from the combined signal.

If it is determined in step S341 that the imaging by long-time exposure at the process target pixel is saturated, on the other hand, the process moves on to step S343. In step S343, a check is made to determine whether or not the imaging by short-time exposure is saturated. If it is determined in step S343 that the imaging by short-time exposure is not saturated, the process moves on to step S344.

In step S344, since the imaging by short-time exposure is not saturated, the HDR combining unit 301-2 outputs the result obtained during the imaging by short-time exposure. In a case where the imaging by short-time exposure is not saturated, the HDR combining unit 301-2 outputs the detection results AhS0 to AhS270 and the detection results BhS0 to BhS270 obtained from the process target pixel included in the subframe hS, as part of the high-frequency HDR image.

Although the detection signals are output as the high-frequency HDR image herein, a phase difference θ may be calculated on the basis of Expression (1) using the detection results AhS0 to AhS270 and the detection results BhS0 to BhS270 obtained in the subframe hS, and the calculation result may be output as the high-frequency HDR image. Further, a distance D (a plurality of candidates) may be calculated on the basis of Expression (2) using the phase difference θ, and the distance D may be output.

If it is determined in step S343 that the imaging by short-time exposure is saturated, on the other hand, the process moves on to step S345. A case where the process moves on to step S345 is a case where the imaging by long-time exposure is saturated, and the imaging by short-time exposure is also saturated. Therefore, an invalid value is output for the process target pixel.

As such a process is performed for each of the pixels included in one frame, the detection signals obtained by the long-time exposure imaging are output at the pixels not saturated by the long-time exposure imaging, and the detection signals obtained by the short-time exposure imaging are output at the pixels saturated by the long-time exposure imaging.

That is, the HDR combining unit 301-2 generates the high-frequency HDR image by combining the subframe hL obtained by emitting high-frequency irradiation light and performing imaging through long-time exposure, with the subframe hS obtained by performing imaging through short-time exposure. This generated high-frequency HDR image corresponds to the subframe h in the distance measurement using two frequencies described above with reference to FIGS. 22 to 24.

In step S304 (FIG. 31), the integration processing unit 302 integrates the low-frequency HDR image and the high-frequency HDR image. The low-frequency HDR image is supplied from the HDR combining unit 301-1 to the integration processing unit 302. This low-frequency HDR image is a high dynamic range image generated by the process described above, and is an image corresponding to the subframe l (FIG. 23).

Meanwhile, the high-frequency HDR image is supplied from the HDR combining unit 301-2 to the integration processing unit 302. This high-frequency HDR image is a high dynamic range image generated by the process described above, and is an image corresponding to the subframe h (FIG. 23).

To acquire the low-frequency HDR image and the high-frequency HDR image corresponding to the subframe l and the subframe h, the integration processing unit 302 can calculate the distance by performing a process similar to that to be performed by the integration processing unit 101 (FIG. 23) that acquires and processes the subframe l and the subframe h. The process to be performed by the integration processing unit 101 (FIG. 23) has already been described, and therefore, explanation of the process to be performed by the integration processing unit 302 is not made herein.

As the imaging by long-time exposure and the imaging by short-time exposure are performed as described above, a high dynamic range image is acquired, and distance measurement is performed with the use of the high dynamic range image. Thus, distance measurement with an improved dynamic range can be performed. Further, as the imaging with low-frequency irradiation light and the imaging with high-frequency irradiation light are performed, the measurable distance range can be extended.

Fourth Embodiment

<Other Distance Measurement Using Two Frequencies and Two Exposure Times>

As described as the third embodiment with reference to FIGS. 29 to 33, distance measurement using two frequencies and two exposure times can improve the dynamic range and extend the measurable distance range.

Referring back to FIG. 29, explanation is now continued. As shown in FIG. 29, according to the third embodiment, it is necessary to acquire and process four subframes. In this case, it is necessary to sequentially image four subframes in the temporal direction, and therefore, there is a possibility that the time required for imaging will increase. Also, there is a possibility that the time and the processing load for processing the four subframes will increase.

Distance measurement that shortens the time required for imaging and reduces the time and the processing load for processing the acquired subframes by reducing the number of subframes to be acquired is now additionally explained.

Figure 34:
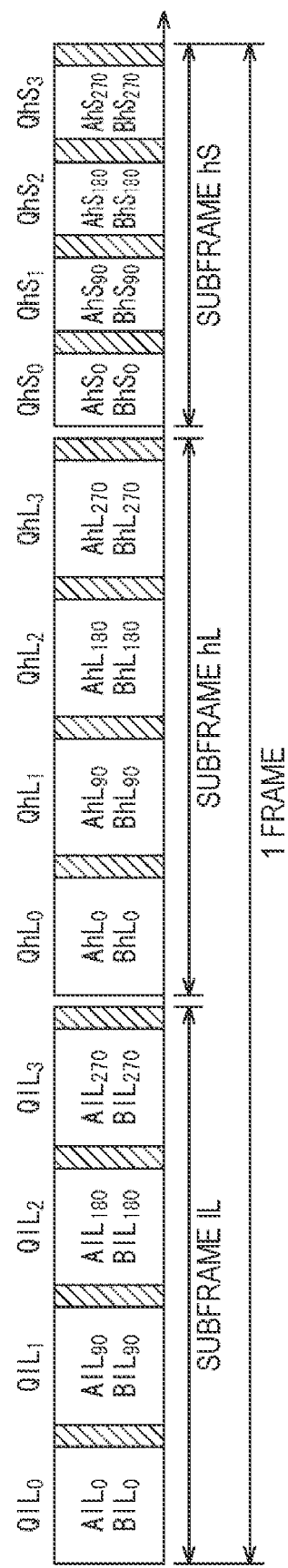
FIG. 34 is a chart for explaining distance measurement using two frequencies and two exposure times.

As a fourth embodiment, a case where the subframes to be acquired are the three subframes of a subframe lL, a subframe hL, and a subframe hS as shown in FIG. 34 is now described.

The subframe lL is a frame for performing distance measurement by emitting low-frequency irradiation light and performing imaging through long-time exposure, and is a subframe corresponding to the subframe lL described above with reference to FIG. 29. The subframe lL is also a subframe corresponding to the subframe l described above with reference to FIG. 22.

The subframe hL is a subframe for performing distance measurement by emitting high-frequency irradiation light and performing imaging through long-time exposure, and is a subframe corresponding to the subframe hL described above with reference to FIG. 29.

The subframe hS is a subframe for performing distance measurement by emitting high-frequency irradiation light and performing imaging through short-time exposure, and is a subframe corresponding to the subframe hS described above with reference to FIG. 29.

Unlike the embodiment illustrated in FIG. 29, the embodiment illustrated in FIG. 34 is in a mode in which the process of acquiring and processing the subframe lS for performing distance measurement by emitting low-frequency irradiation light and performing imaging through short-time exposure is skipped.

When distance measurement is performed, saturation tends to be more likely to occur at a shorter distance than at a longer distance. As described above with reference to FIGS. 20A and 20B, in distance measurement using high-frequency irradiation light, the measurable distance range is shorter than that in distance measurement using low-frequency irradiation light. In a case where a shorter distance (a short distance) is to be measured, it is possible to perform distance measurement using high-frequency irradiation light. In a case where a longer distance (a long distance) is to be measured, it is possible to perform distance measurement using low-frequency irradiation light.

Since saturation tends to be more likely to occur at a short distance than at a long distance, it is considered that imaging using high-frequency irradiation light for measuring a short distance is more likely to be saturated than imaging using low-frequency irradiation light for measuring a long distance. Therefore, in imaging using high-frequency irradiation light, long-time exposure and short-time exposure are performed, so that the possibility of saturation is lowered, and imaging in a high dynamic range is performed.

On the other hand, in imaging using low-frequency irradiation light with a low possibility of saturation, imaging is performed through long-time exposure, so that imaging is performed without a decrease in S/N ratio. Also, imaging using low-frequency irradiation light is unlikely to be saturated, and thus, imaging by short-time exposure is skipped.

As described above, even if the process of acquiring the subframe lS for performing distance measurement by emitting low-frequency light and performing imaging through short-time exposure is skipped, it is possible to extend the measurable distance range, and perform distance measurement with a lower possibility of saturation.

Further, compared with the above described case where four subframes are acquired for distance measurement, a case where three subframes are acquired for distance measurement can shorten the time required for acquiring subframes, which is the time required for imaging. If the time required for imaging becomes longer, blurring normally occurs when a moving object is being imaged, and therefore, there is a possibility that the moving object characteristics will be degraded. The time required for imaging is shortened, so that degradation of the moving object characteristics can be reduced.

Further, the number of subframes to be processed is reduced, so that the time for processing can be shortened, and the load on processing capability can be reduced. As a result, power consumption can also be lowered.

Figure 35:
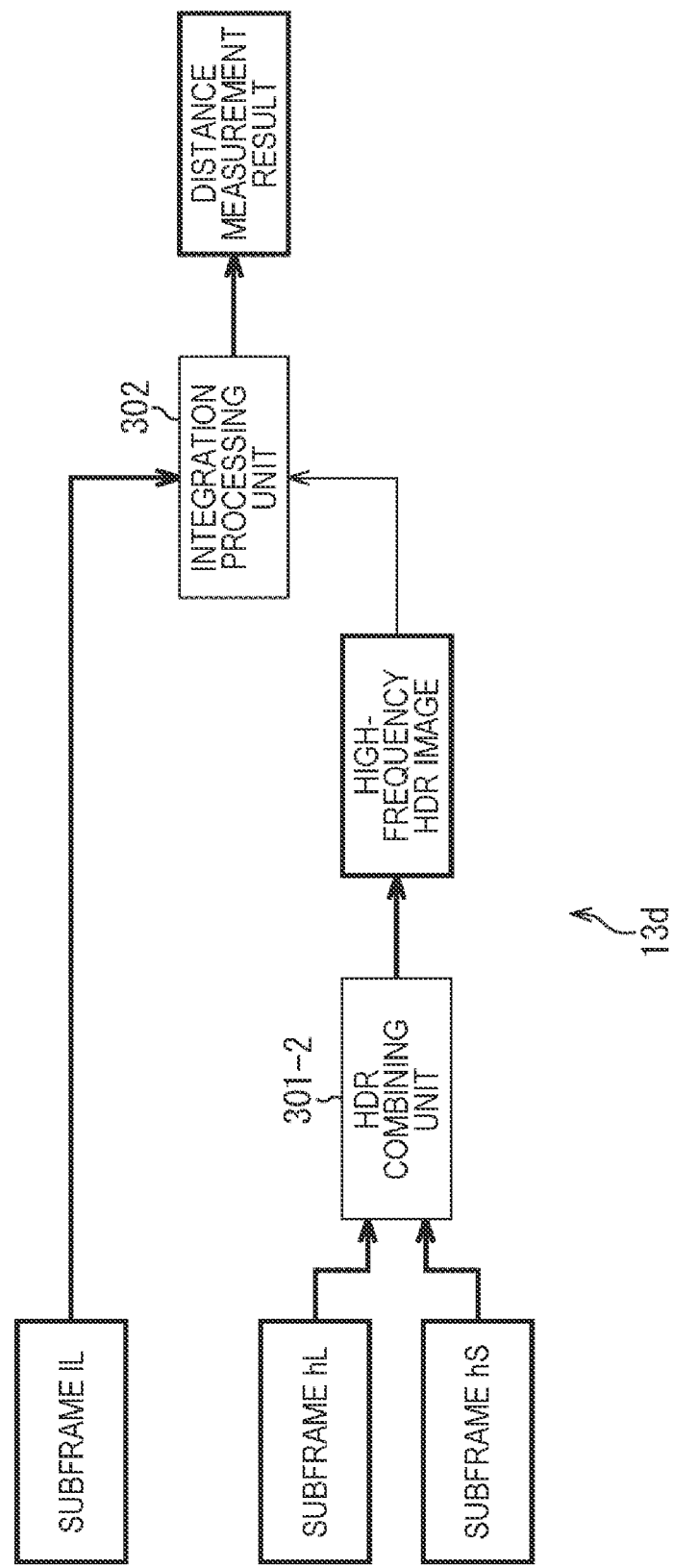
FIG. 35 is a diagram showing an example configuration of a signal processing unit.

In a case where such distance measurement is performed, a signal processing unit 13d has a configuration as shown in FIG. 35. The signal processing unit 13d includes a HDR combining unit 301-2 and an integration processing unit 302. The signal processing unit 13 shown in FIG. 35 has a configuration without the HDR combining unit 301-1 of the signal processing unit 13 shown in FIG. 30. Therefore, the same components as those of the signal processing unit 13 shown in FIG. 30 are denoted by the same reference numerals as those in FIG. 30, and explanation of them is not made herein.

The subframe hL and the subframe hS are sequentially supplied from the light receiving unit 12 (FIG. 1) to the HDR combining unit 301-2. The HDR combining unit 301-2 generates a high-frequency HDR image from the supplied subframe hL and subframe hS, and supplies the image to the integration processing unit 302.

The high-frequency HDR image in which the subframe lL, the subframe hL, and the subframe hS are combined is supplied to the integration processing unit 302. The integration processing unit 302 integrates the subframe lL and the high-frequency HDR image, to calculate the distance to a predetermined object, and output the calculated distance as a distance measurement result.

Figure 36:
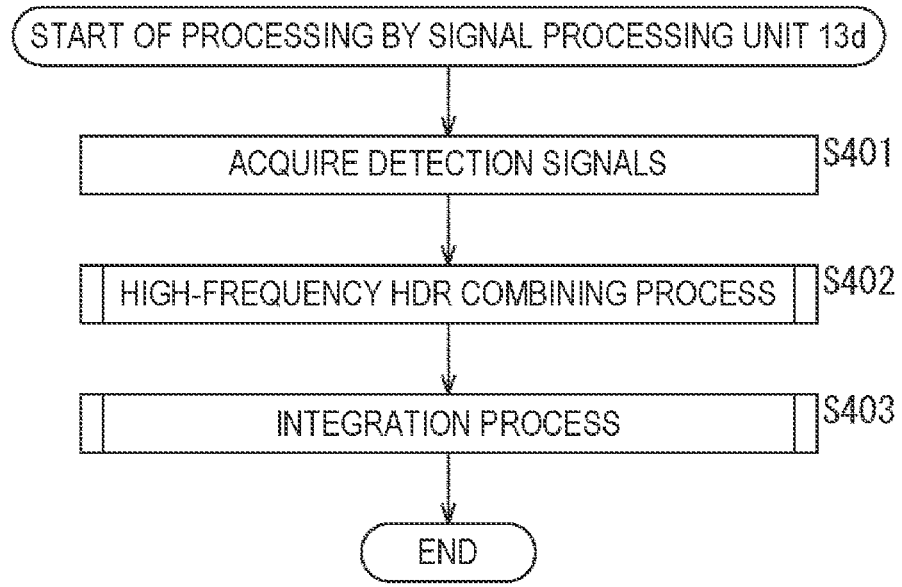
FIG. 36 is a chart for explaining operation of the signal processing unit.

Referring now to a flowchart shown in FIG. 36, a process to be performed by the signal processing unit 13d shown in FIG. 35 is additionally described.

In step S401, the signal processing unit 13d acquires detection signals.

In step S402, the HDR combining unit 301-2 generates a high-frequency HDR image to be obtained during emission of high-frequency irradiation light, by combining the detection signals obtained during long-time exposure and the detection signals obtained during short-time exposure after emission of high-frequency irradiation light.

The high-frequency HDR combining process in step S402 is performed on the basis of the flowchart shown in FIG. 33. Since the process based on the flowchart shown in FIG. 33 has already been described, explanation thereof is not made herein.

Figure 37:
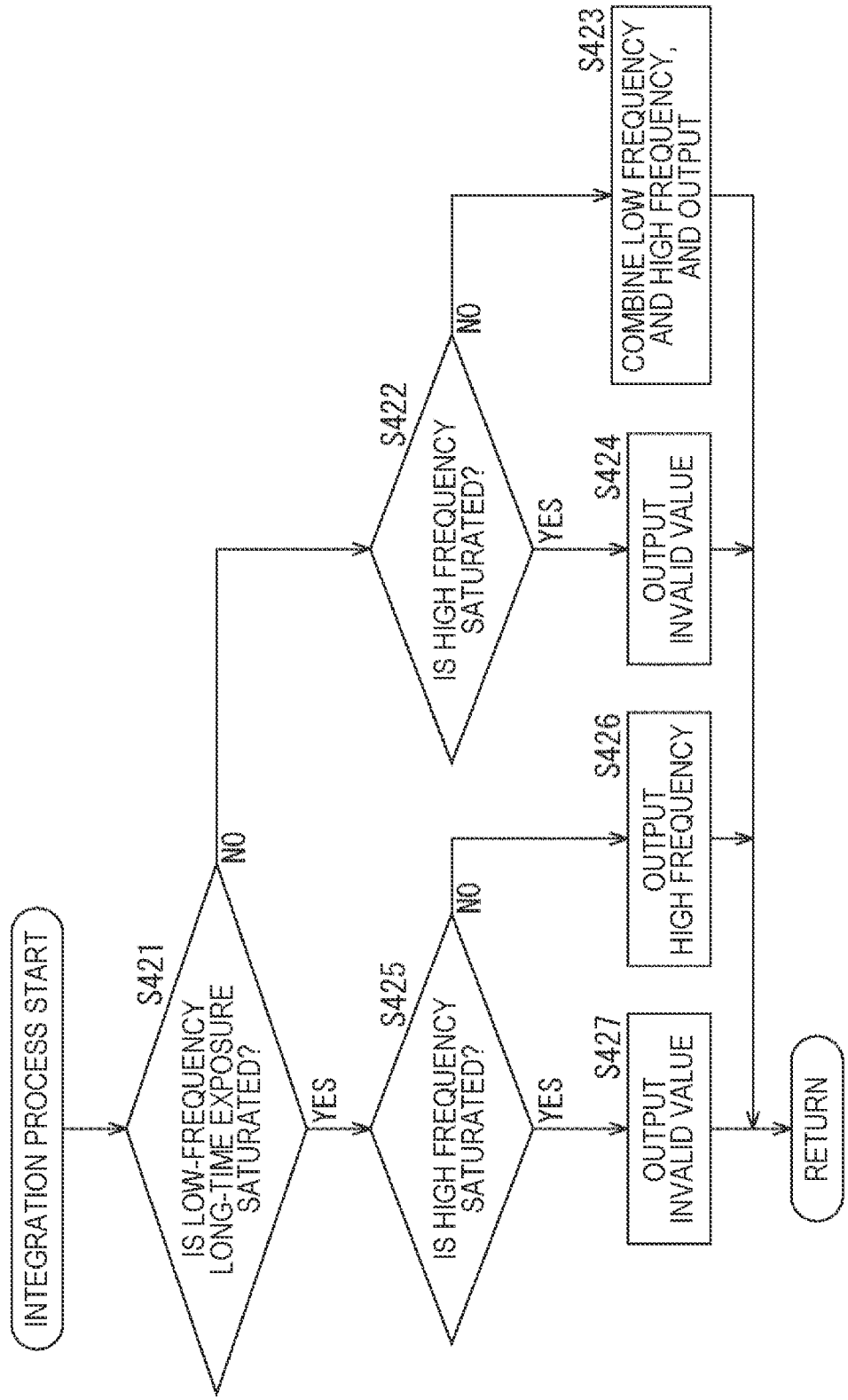
FIG. 37 is a chart for explaining an integration process.

In step S403, the integration processing unit 302 performs an integration process. Referring now to a flowchart shown in FIG. 37, the integration process to be performed in step S403 is described.

In step S421, a check is made to determine whether or not the imaging by emission of low-frequency irradiation light and long-time exposure is saturated. In this case, a check is made to determine whether or not the process target pixel included in the subframe lL is saturated. If it is determined in step S421 that the imaging by emission of low-frequency irradiation light and long-time exposure is not saturated, the process moves on to step S422.

In step S422, a check is made to determine whether or not the imaging at the time of emission of high-frequency irradiation light is saturated. In this case, a check is made to determine whether or not the process target pixel in the high-frequency HDR image generated by the HDR combining unit 301-2 is saturated.

There is a high possibility that any saturated pixel is not included in the high-frequency HDR image generated by performing the process in step S402 (the process based on the flowchart shown in FIG. 33), but there is a possibility that an invalid value is output in step S345 (FIG. 33). Therefore, in step S402, a check is made to determine whether or not the pixel value of the process target pixel in the high-frequency HDR image is an invalid value.

If it is determined in step S402 that the pixel value of the process target pixel in the high-frequency HDR image is not an invalid value, the process moves on to step S423. In step S423, the image obtained at the time of emission of low-frequency irradiation light and the image obtained at the time of emission of high-frequency irradiation light are combined, and are then output. In this case, the image obtained in the subframe lL and the high-frequency HDR image are combined.

This combining is performed in a manner similar to the process to be performed in step S304 in FIG. 31, and therefore, explanation thereof is not made herein. However, a process is performed to uniquely determine a distance from the distance calculated from the detection signals included in the subframe lL and the distance calculated from the detection signals included in the high-frequency HDR image.

If it is determined in step S422 that the pixel value of the process target pixel in the high-frequency HDR image is an invalid value, on the other hand, the process moves on to step S424.

In step S424, the invalid value is output. A case where the process has moved on to step S424 is a case where any distance cannot be calculated from the high-frequency HDR image because the process target pixel in the high-frequency HDR image is saturated. Further, this is a case where it is determined that the subframe lL obtained at the time of emission of low-frequency irradiation light is not saturated.

Because the subframe lL is not saturated, a distance may be calculated from the subframe lL, and the calculated distance may be output as a distance measurement result. In this case, a plurality of distance measurement results is calculated as described above with reference to FIG. 20B, there is a possibility that an erroneous distance measurement result is output. Therefore, explanation is continued herein, on the assumption that an invalid value is output so that an erroneous result will not be output.

Alternatively, in a case where one distance measurement result can be specified from a plurality of calculated distance measurement results, the specified distance measurement result may be output.

For example, for a pixel in the vicinity of the process target pixel, the process moves on to step S423, and the pixel from which a distance measurement result has been output is detected. A distance measurement result having a value close to the distance measurement result from the detected pixel is detected from a plurality of distance measurement results calculated from the process target pixel. Such a detection process may also be performed in step S424, and a distance measurement result may be output.

If it is determined in step S421 that the imaging by emission of low-frequency irradiation light and long-time exposure is saturated, on the other hand, the process moves on to step S425. In the process in step S425, a check is made to determine whether or not the imaging at the time of emission of high-frequency irradiation light is saturated, as in the process in step S422. In other words, in step S425, a check is made to determine whether or not the pixel value of the process target pixel in the high-frequency HDR image is an invalid value.

If it is determined in step S425 that the pixel value of the process target pixel in the high-frequency HDR image is not an invalid value, the process moves on to step S426. In a case where the process has moved on to step S426, the detection signals detected from the process target pixel in the high-frequency HDR image are used, a distance is calculated, and the calculated value is output as a distance measurement result.

In this case, either the imaging at the time of emission of high-frequency irradiation light or the imaging at the time of emission of low-frequency irradiation light is saturated. Therefore, a plurality of distance measurement results is calculated, and there is a possibility that any distance cannot be uniquely specified, as in the case where the process has moved on to step S424. Therefore, in step S426, a process of uniquely specifying a distance measurement result from a plurality of distance measurement results may be performed, as in step S424. Alternatively, an invalid value may be output.

If it is determined in step S425 that the pixel value of the process target pixel in the high-frequency HDR image is an invalid value, on the other hand, the process moves on to step S427. In step S427, an invalid value indicating that the distance measurement result from the process target pixel is invalid is output.

As the imaging by long-time exposure and the imaging by short-time exposure are performed as described above, a high dynamic range image is acquired, and distance measurement is performed with the use of the high dynamic range image. Thus, distance measurement with an improved dynamic range can be performed. Further, as the imaging with low-frequency irradiation light and the imaging with high-frequency irradiation light are performed, the measurable distance range can be extended.

Furthermore, as the number of subframes to be processed is reduced, it is possible to shorten the time required for imaging and processing, lower the processing load, and reduce degradation of moving object characteristics.

Fifth Embodiment

The first to fourth embodiments can be used in combination. As a fifth embodiment, a case where the first embodiment for performing distance measurement using two frequencies, and the third embodiment for performing distance measurement using two frequencies and two exposure times are combined is now described, with reference to FIG. 38. Also, a case where the first embodiment for performing distance measurement using two frequencies and the fourth embodiment for performing distance measurement using two frequencies and two exposure times are combined is described, with reference to FIG. 39.

Figure 38:
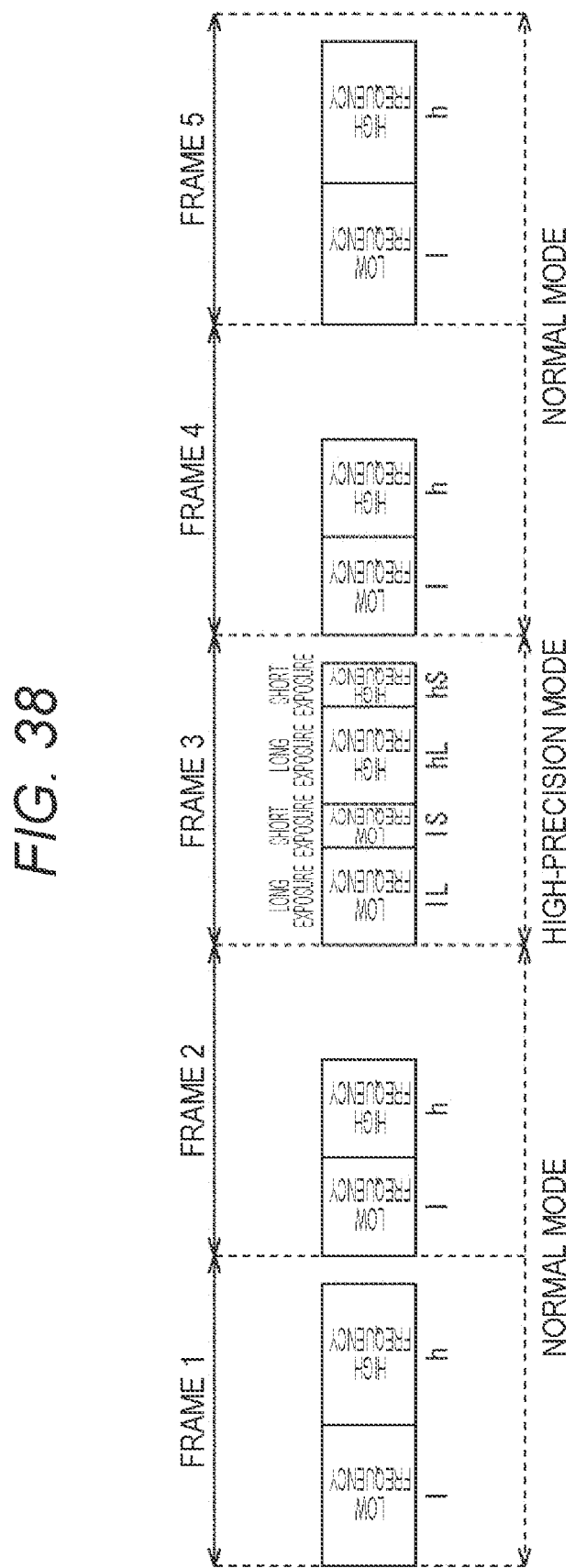
FIG. 38 is a chart for explaining distance measurement that switches between a normal mode and a high-precision mode.

Referring to FIG. 38, there are a normal mode and a high-precision mode as distance measurement modes. The normal mode is a mode to which the first embodiment is applied, and is a mode for performing distance measurement using low-frequency irradiation light and high-frequency irradiation light. In this normal mode, exposure is controlled by automatic exposure (AE).

In the normal mode, a subframe l captured when low-frequency irradiation light is emitted and a subframe h captured when high-frequency irradiation light is emitted are acquired, as in the case described with reference to FIG. 22. Further, the subframe l and the subframe h constitute one frame.

The high-precision mode is a mode to which the third embodiment is applied, and is a mode for performing distance measurement using low-frequency irradiation light and high-frequency irradiation light, and distance measurement through long-time exposure and short-time exposure.

In the high-precision mode, a subframe lL obtained by emitting low-frequency irradiation light and performing imaging through long-time exposure, a subframe lS obtained by emitting low-frequency irradiation light and performing imaging through short-time exposure, a subframe hL obtained by emitting high-frequency irradiation light and performing imaging through long-time exposure, and a subframe hS obtained by emitting high-frequency irradiation light and performing imaging through short-time exposure are acquired, as in the case described with reference to FIG. 29. Further, the subframe lL, the subframe lS, the subframe hL, and the subframe hS constitute one frame.

In the example illustrated in FIG. 38, a frame 1 and a frame 2 are captured in the normal mode, the mode is switched to the high-precision mode in a frame 3, the mode is returned to the normal mode in a frame 4, and a frame 5 is captured while the normal mode is maintained.

The timing to switch from the normal mode to the high-precision mode will be described later. When the mode is switched from the normal mode to the high-precision mode, the exposure lengths are maintained. In the example illustrated in FIG. 38, the exposure time of the subframe l of the frame 2 is maintained in the subframe lL of the frame 3, and the exposure time of the subframe h of the frame 2 is maintained in the subframe hL of the frame 3.

That is, the exposure time at the time of imaging with low-frequency irradiation light in the normal mode is set to the exposure time of long-time exposure at the time of imaging with low-frequency irradiation light in the high-precision mode. Also, the exposure time at the time of imaging with high-frequency irradiation light in the normal mode is set to the exposure time of long-time exposure at the time of imaging with high-frequency irradiation light in the high-precision mode.

The exposure length of long-time exposure in the high-precision mode is variable, because the exposure length in the previous frame in the normal mode is maintained, and the exposure length in the normal mode is set by AE.

The exposure length of short-time exposure in the high-precision mode may also be variable to match the exposure length of long-time exposure in the high-precision mode. In a case where the exposure length of short-time exposure in the high-precision mode is variable, the exposure length may be set at a ratio to the exposure length of long-time exposure in the high-precision mode.

For example, it is possible to set the exposure length of short-time exposure at a ratio to the exposure length of long-time exposure in the high-precision mode, such as setting the exposure length of short-time exposure in the high-precision mode to half (0.5) the exposure length of long-time exposure.

The exposure length of short-time exposure in the high-precision mode may be a fixed value, regardless of the exposure length of long-time exposure in the high-precision mode.

When the mode is switched from the high-precision mode to the normal mode, the exposure lengths are also maintained. In the example illustrated in FIG. 38, the exposure time of the subframe lL of the frame 3 is maintained in the subframe l of the frame 4, and the exposure time of the subframe hL of the frame 3 is maintained in the subframe h of the frame 3.

As the exposure times are maintained at the time of switching between the normal mode and the high-precision mode as described above, it is possible to prevent the exposure times from rapidly changing between frames, and prevent the user from feeling uncomfortable.

Although the case where there is only one frame in the high-precision mode has been described with reference to the example illustrated in FIG. 38, a plurality of frames may be captured successively in the high-precision mode. In a case where a plurality of frames is captured in the high-precision mode, the exposure lengths may be changed in the high-precision mode.

In a case where the exposure lengths are changed during the high-precision mode, when the mode is switched from the high-precision mode to the normal mode, the exposure lengths of the last frame in the high-precision mode are maintained as the exposure lengths in the normal mode.

In the example illustrated in FIG. 38, the subframe lL and the subframe hL acquired in the high-precision mode have the same exposure times as those of the subframe l and the subframe h of the previous frame in the normal mode. Therefore, it can be said that the high-precision mode is a mode in which imaging by short-time exposure is added to imaging in the normal mode.

Since the exposure lengths in the normal mode are maintained even in the high-precision mode, and, in the high-precision mode, imaging by short-time exposure is added to imaging in the normal mode, the exposure lengths in the normal mode are limited to such times that fall within one frame even if imaging by short-time exposure is added thereto in the high-precision mode.

The exposure length of the subframe l in the normal mode is represented by an exposure length l, and the exposure length of the subframe h is represented by an exposure length h. Also, the exposure length of the subframe lL in the high-precision mode is represented by an exposure length lL, the exposure length of the subframe lS is represented by an exposure length lS, the exposure length of the subframe hL is represented by an exposure length hL, and the exposure length of the subframe hS is represented by an exposure length hS. Further, in a case where the frame rate is 30 fps, one frame time is 1/30 second.

$$\text{exposure length } lL + \text{exposure length } lS + \text{exposure length } hL + \text{exposure length } hS < \text{one frame time (1/30 second)}$$

Since exposure length lL=exposure length l, and exposure length hL=exposure length h, this inequality can be rewritten as follows:

$$\text{exposure length } l + \text{exposure length } lS + \text{exposure length } h + \text{exposure length } hS < \text{one frame time}$$

Accordingly, the following relationship is established:

$$\text{exposure length } l + \text{exposure length } h < \text{one frame time} - (\text{exposure length } lS + \text{exposure length } hS)$$

The exposure lengths in the normal mode are set so as to satisfy this inequality. Note that the exposure amount l and the exposure amount h are such that exposure amount l=exposure amount h, and the exposure length lS and the exposure length hS are such that exposure length lS=exposure length hS.

Figure 39:
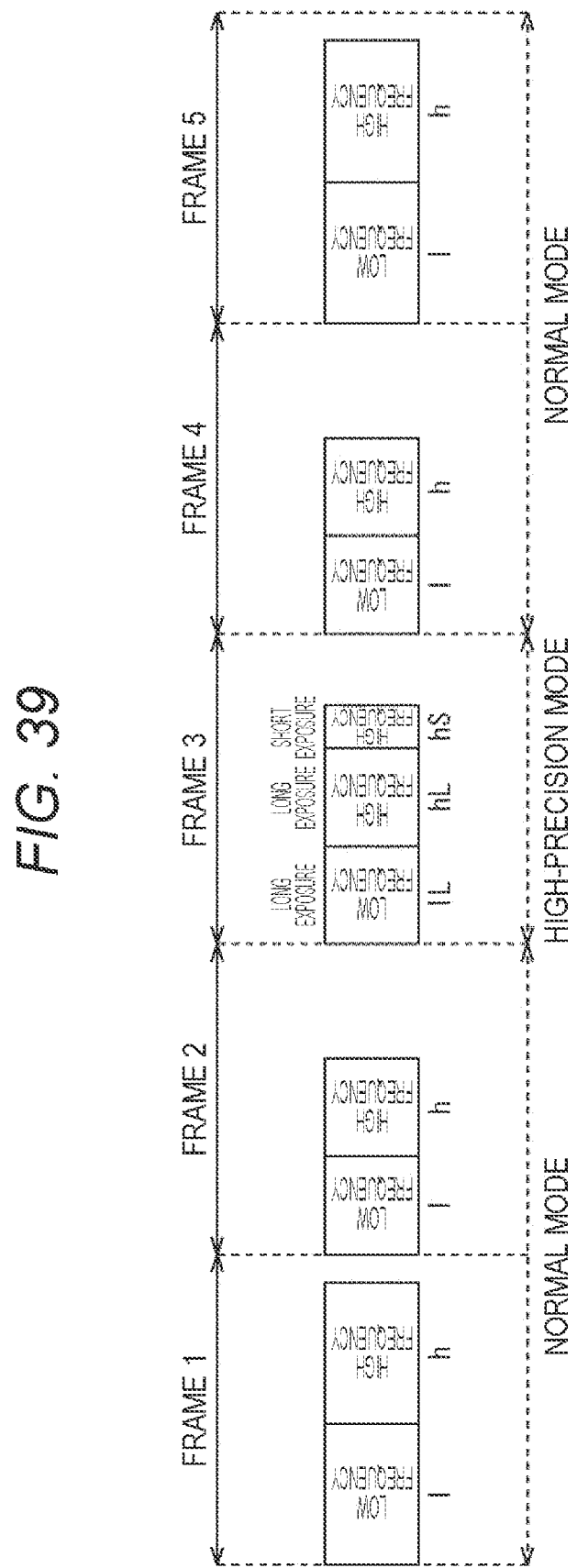
FIG. 39 is a chart for explaining distance measurement that switches between a normal mode and a high-precision mode.

Next, a case where the first embodiment and the fourth embodiment are combined is described. As shown in FIG. 39, in the high-precision mode, distance measurement may be performed in three subframes, as in the fourth embodiment. The case illustrated in FIG. 39 is basically similar to the case illustrated in FIG. 38, and therefore, similar explanation is not made herein.

In the high-precision mode, a subframe lL obtained by emitting low-frequency irradiation light and performing imaging through long-time exposure, a subframe hL obtained by emitting high-frequency irradiation light and performing imaging through long-time exposure, and a subframe hS obtained by emitting high-frequency irradiation light and performing imaging through short-time exposure are acquired, as in the case described with reference to FIG. 34. Further, the subframe lL, the subframe hL, and the subframe hS constitute one frame.

When the mode is switched from the normal mode to the high-precision mode, the exposure lengths are maintained. In the example illustrated in FIG. 39, the exposure time of the subframe l of the frame 2 is maintained in the subframe lL of the frame 3, and the exposure time of the subframe h of the frame 2 is maintained in the subframe hL of the frame 3.

Further, when the mode is switched from the high-precision mode to the normal mode, the exposure lengths are also maintained. In the example illustrated in FIG. 39, the exposure time of the subframe lL of the frame 3 is maintained in the subframe l of the frame 4, and the exposure time of the subframe hL of the frame 3 is maintained in the subframe h of the frame 3.

As the exposure times are maintained at the time of switching between the normal mode and the high-precision mode as described above, it is possible to prevent the exposure times from rapidly changing between frames, and prevent the user from feeling uncomfortable.

Although the case where there is only one frame in the high-precision mode has been described with reference to the example illustrated in FIG. 39, a plurality of frames may be captured successively in the high-precision mode. In a case where a plurality of frames is captured in the high-precision mode, the exposure lengths may be changed in the high-precision mode.

In a case where the exposure lengths are changed during the high-precision mode, when the mode is switched from the high-precision mode to the normal mode, the exposure lengths of the last frame in the high-precision mode are maintained as the exposure lengths in the normal mode.

In the example illustrated in FIG. 39, the subframe lL and the subframe hL acquired in the high-precision mode have the same exposure times as those of the subframe l and the subframe h of the previous frame in the normal mode. Therefore, it can be said that the high-precision mode is a mode in which emission of high-frequency irradiation light and imaging by short-time exposure are added to imaging in the normal mode.

In the example illustrated in FIG. 39, the following relationship is established:

exposure length lL+exposure length hL+exposure length hS<one frame time(1/30 seconds)

Since exposure length lL=exposure length l, and exposure length hL=exposure length h, this inequality can be rewritten as follows:

exposure length l+exposure length h+exposure length hS<one frame time

Accordingly, the following relationship is established:

exposure length l+exposure length h<one frame time−exposure length hS

The exposure lengths in the normal mode are set so as to satisfy this inequality. Note that the exposure amount l and the exposure amount h are such that exposure amount l=exposure amount h.

In the description below, the case illustrated in FIG. 39 is explained as an example.

<Switching by a Trigger>

Figure 40:
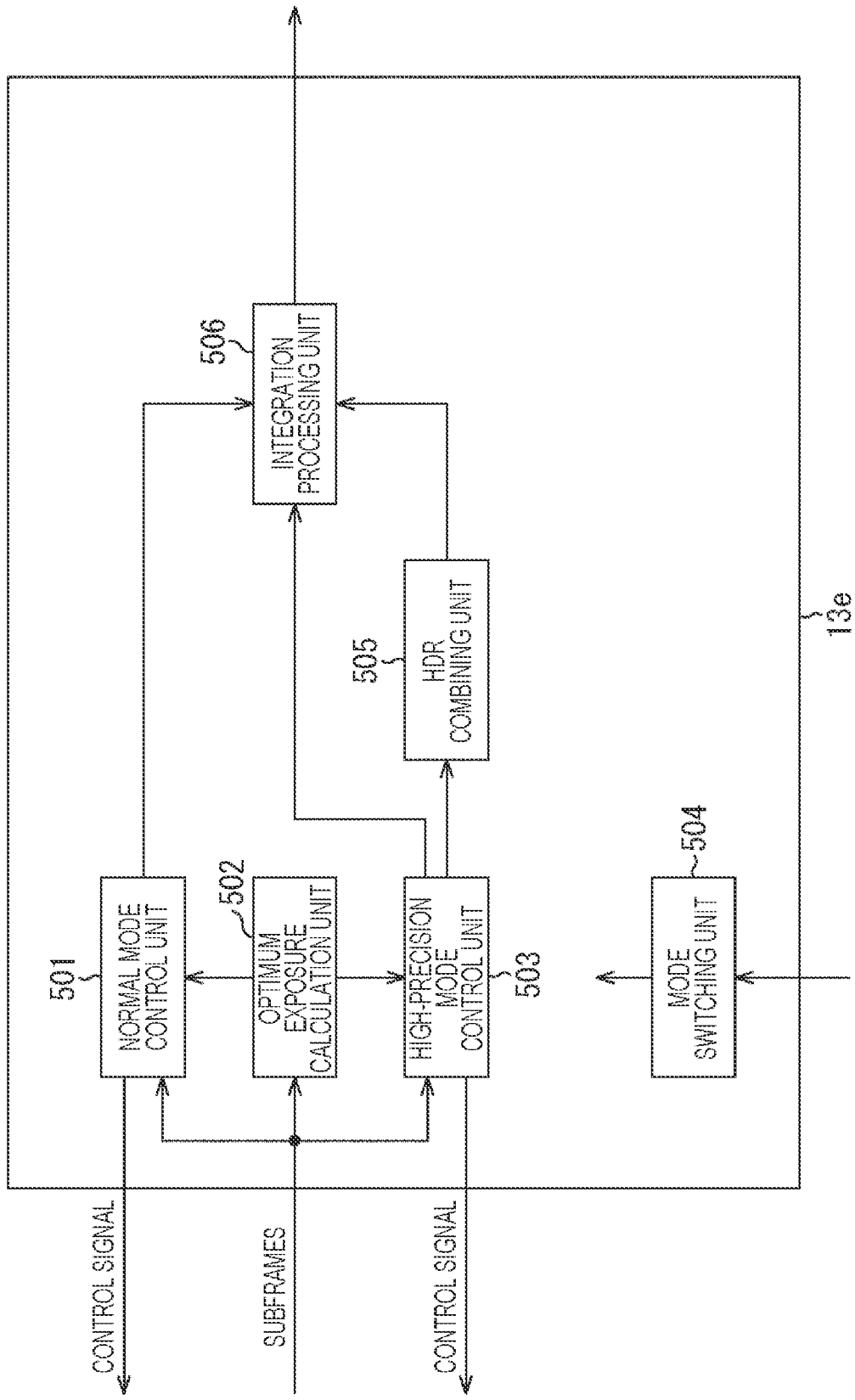
FIG. 40 is a diagram showing an example configuration of a signal processing unit.

FIG. 40 is a diagram showing the configuration of a signal processing unit 13e that switches between the normal mode and the high-precision mode described above with reference to FIG. 39 when a predetermined trigger is input. The signal processing unit 13e shown in FIG. 40 includes a normal mode control unit 501, an optimum exposure calculation unit 502, a high-precision mode control unit 503, a mode switching unit 504, an HDR combining unit 505, and an integration processing unit 506.

The normal mode control unit 501 transmits a control signal to the light receiving unit 12 (FIG. 1) in the normal mode. The normal mode control unit 501 also controls inputting of subframes from the light receiving unit 12 in the normal mode.

The normal mode control unit 501 performs control so that the light receiving unit 12 captures the subframe l and the subframe h. The normal mode control unit 501 also acquires the subframe l and the subframe h captured by the light receiving unit 12, and outputs the subframe l and the subframe h to the integration processing unit 506.

The high-precision mode control unit 503 transmits a control signal to the light receiving unit 12 in the high-precision mode. The high-precision mode control unit 503 also controls inputting of subframes from the light receiving unit 12 in the high-precision mode.

The high-precision mode control unit 503 performs control so that the light receiving unit 12 captures the subframe lL, the subframe hL, and the subframe hS. The high-precision mode control unit 503 also acquires the subframe lL, the subframe hL, and the subframe hS captured by the light receiving unit 12, outputs the subframe lL to the integration processing unit 506, and outputs the subframe hL and the subframe hS to the HDR combining unit 505.

The optimum exposure calculation unit 502 sets an exposure length suitable for imaging in the next frame, using the subframes from the light receiving unit 12. The set exposure length is supplied to the normal mode control unit 501 and the high-precision mode control unit 503, and the normal mode control unit 501 or the high-precision mode control unit 503 controls the exposure time of the light receiving unit 12, on the basis of the set exposure length.

When a predetermined trigger is input from the outside, the mode switching unit 504 switches between the normal mode and the high-precision mode. The predetermined trigger can be a time when the shutter button to be operated by the user at the time of imaging is operated, for example. Although the shutter button being operated is described as the trigger herein, the present technology can also be applied in a case where some other trigger is set.

In a case where the shutter button is operated, the operation information is supplied to the mode switching unit 504. In a case where the predetermined trigger is input, the mode switching unit 504 switches the mode from the normal mode to the high-precision mode. In a case where the mode is switched to the high-precision mode, the normal mode control unit 501 stops processing, and the high-precision mode control unit 503 starts processing.

Further, in a case where the operation of the shutter button is ended, the mode switching unit 504 switches the mode from the high-precision mode to the normal mode. In a case where the mode is switched to the normal mode, the normal mode control unit 501 starts processing, and the high-precision mode control unit 503 stops processing.

In a case where an operation is performed in the high-precision mode when the shutter button is operated as described above, imaging can be performed with high accuracy when the shutter button is operated, or when imaging is performed.

When the shutter button is not operated, on the other hand, an image being captured by the light receiving unit 12 can be provided to the user as an image to be shown on a display, the image being called a live view, for example, and being captured at that time.

The HDR combining unit 505 has functions similar to those of the HDR combining unit 301-2 of the signal processing unit 13d shown in FIG. 35, combines the subframe hL and the subframe hS supplied from the high-precision mode control unit 503, generates a high-frequency HDR image, and supplies the high-frequency HDR image to the integration processing unit 506.

The integration processing unit 506 has functions similar to those of the integration processing unit 101 of the signal processing unit 13a shown in FIG. 23, and calculates and outputs a distance, using the subframe l and the subframe h supplied from the normal mode control unit 501.

The integration processing unit 506 also has functions similar to those of the integration processing unit 302 of the signal processing unit 13d shown in FIG. 35, and calculates and outputs a distance, using the subframe lL supplied from the high-precision mode control unit 503 and the high-frequency HDR image supplied from the HDR combining unit 505.

Figure 41:
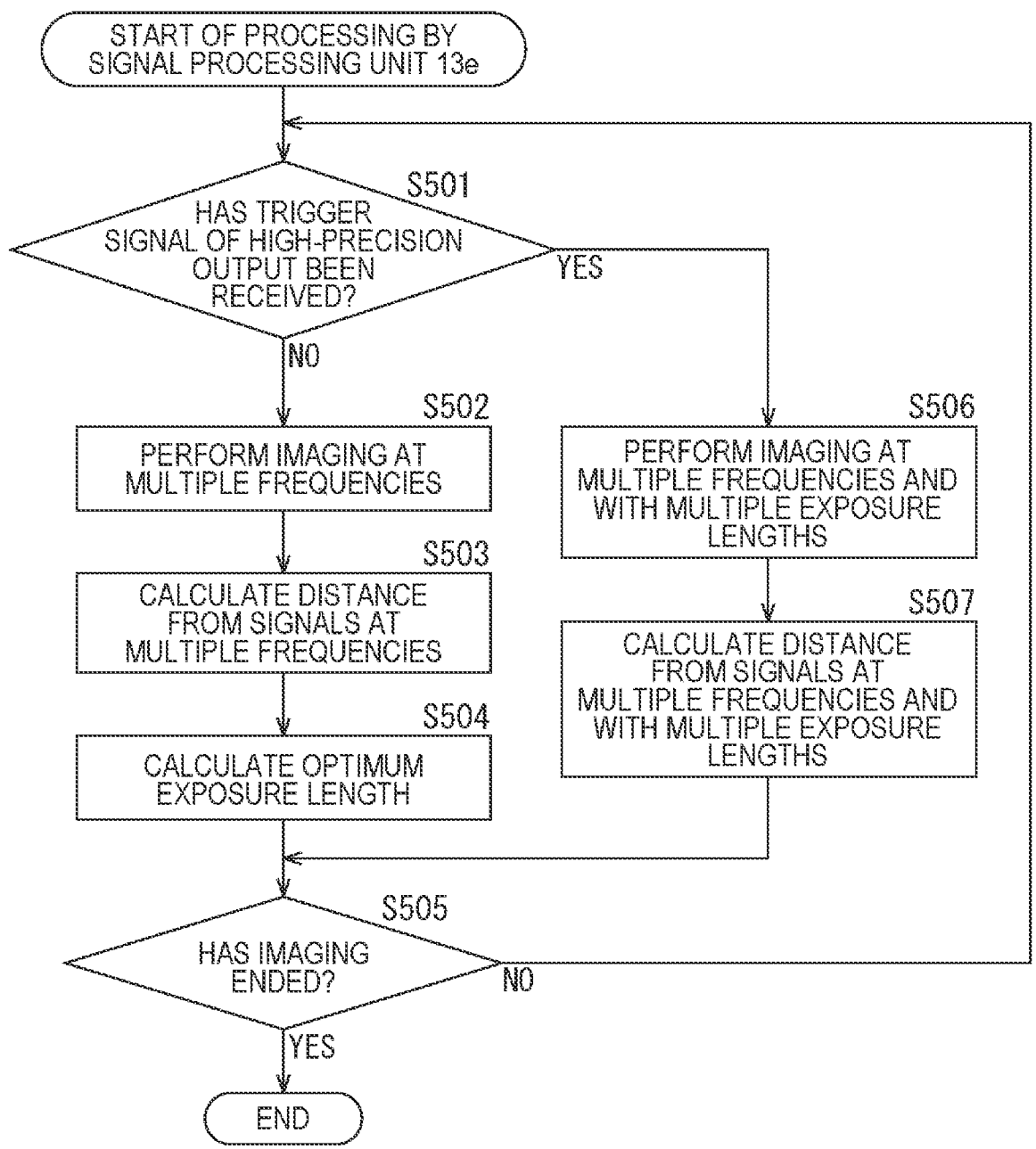
FIG. 41 is a chart for explaining operation of the signal processing unit.

Referring now to a flowchart in FIG. 41, an operation to be performed by the signal processing unit 13e shown in FIG. 40 is described.

In step S501, a check is made to determine whether or not a trigger signal of a high-precision output has been received. A trigger signal of a high-precision output is a signal indicating that the shutter button has been operated or that the shutter button continues to be operated, or an imaging instruction signal, for example.

If it is determined in step S501 that any trigger signal of a high-precision output has not been received, the process moves on to step S502. Since any trigger signal of a high-precision output has not been received, distance measurement in the normal mode is performed.

In step S502, imaging using irradiation light at a plurality of frequencies, which are a low frequency and a high frequency in this case, is performed. The normal mode control unit 501 outputs a control signal for causing the light emission control unit 15 (FIG. 1) to perform control so that low-frequency irradiation light is emitted for the time corresponding to an exposure time (long-time exposure in this case), and high-frequency irradiation light is then emitted for the time corresponding to the exposure time. The normal mode control unit 501 also outputs a control signal to the light receiving unit 12 (FIG. 1) so that the light receiving unit 12 performs exposure for the exposure time calculated by the optimum exposure calculation unit 502.

In this manner, the light emitting unit 14 emits irradiation light, and the light receiving unit 12 performs light reception, on the basis of the control signals from the normal mode control unit 501. Thus, the subframe l and the subframe h are captured.

In step S503, a distance is calculated from signals at a plurality of frequencies. The normal mode control unit 501 outputs the subframe l and the subframe h from the light receiving unit 12, to the integration processing unit 506. Using the detection signals A and the detection signals B included in the subframe l and the subframe h, the integration processing unit 506 calculates distances, and specifies a distance uniquely from a plurality of candidates.

In step S504, an optimum exposure length is calculated. From the subframes that have been input, the optimum exposure calculation unit 502 calculates an exposure length at the time of imaging of the next frame. The calculated exposure length is supplied to the normal mode control unit 501 and the high-precision mode control unit 503.

In step S505, a check is made to determine whether or not the imaging has ended. For example, in a case where the power supply to the distance measuring device 10 is turned off, it is determined that the imaging has ended, when the application or the like for causing the distance measuring device 10 to function is closed.

If it is determined in step S505 that the imaging has not ended, the process returns to step S501, and the processing thereafter is repeated. If it is determined that the imaging has ended, on the other hand, the process in the flowchart shown in FIG. 41 is ended.

If it is determined in step S501 that a trigger signal of a high-precision output has been received, on the other hand, the process moves on to step S506. Since a trigger signal of a high-precision output has been received, distance measurement in the high-precision mode is performed.

In step S506, imaging at a plurality of frequencies and a plurality of exposure lengths, which is imaging in which long-time exposure is performed with low-frequency irradiation light, imaging in which long-time exposure is performed with high-frequency irradiation light, and imaging in which short-time exposure is performed with high-frequency irradiation light are performed in this case.

The high-precision mode control unit 503 outputs a control signal for causing the light emission control unit 15 (FIG. 1) to perform control so that low-frequency irradiation light is emitted for the time corresponding to long-time exposure, high-frequency irradiation light is emitted for the time corresponding to long-time exposure, and high-frequency irradiation light is emitted for the time corresponding to short-time exposure.

The high-precision mode control unit 503 also outputs a control signal to the light receiving unit 12 (FIG. 1) so that the light receiving unit 12 performs exposure for the exposure time (long-time exposure) calculated by the optimum exposure calculation unit 502, and performs exposure for the exposure time set as the exposure time of short-time exposure.

The exposure time calculated by the optimum exposure calculation unit 502 is a value that has been set at the time of imaging of the previous frame, and is the value calculated in step S504. Therefore, the exposure time of a frame in the normal mode is maintained as the exposure time of a frame in the high-precision mode. Further, the exposure time of short-time exposure is calculated at a ratio to the long-time exposure as described above, and a value to be set or a value that has been set as a fixed value is used.

In this manner, the light emitting unit 14 emits irradiation light, and the light receiving unit 12 performs light reception, on the basis of the control signals from the normal mode control unit 501. Thus, the subframe lL, the subframe hL, and the subframe hS are captured.

In step S507, a distance is calculated from the signals obtained by imaging at a plurality of frequencies and with a plurality of exposure times. The high-precision mode control unit 503 outputs the subframe lL from the light receiving unit 12, to the integration processing unit 506. The high-precision mode control unit 503 also outputs the subframe hL and the subframe hS, to the HDR combining unit 505.

By performing a process similar to that in the case described with reference to the flowchart shown in FIG. 33, the HDR combining unit 505 generates a high-frequency HDR image, and output the high-frequency HDR image to the integration processing unit 506. Using the detection signals A and the detection signals B included in the subframe lL and the high-frequency HDR image, the integration processing unit 506 calculates distances, and specifies a distance uniquely from a plurality of candidates.

In step S505, a check is made to determine whether or not the imaging has ended. If it is determined in step S505 that the imaging has not ended, the process returns to step S501, and the processing thereafter is repeated. If it is determined in step S505 that the imaging has ended, the process in the flowchart shown in FIG. 41 is ended.

In a case where the exposure lengths are also changed in the high-precision mode, an optimum exposure length may be calculated when the process moves from step S507 on to step S505.

As the mode is switched from the normal mode to the high-precision mode when a predetermined trigger is input as described above, power consumption and the processing load can be reduced.

Figure 42:
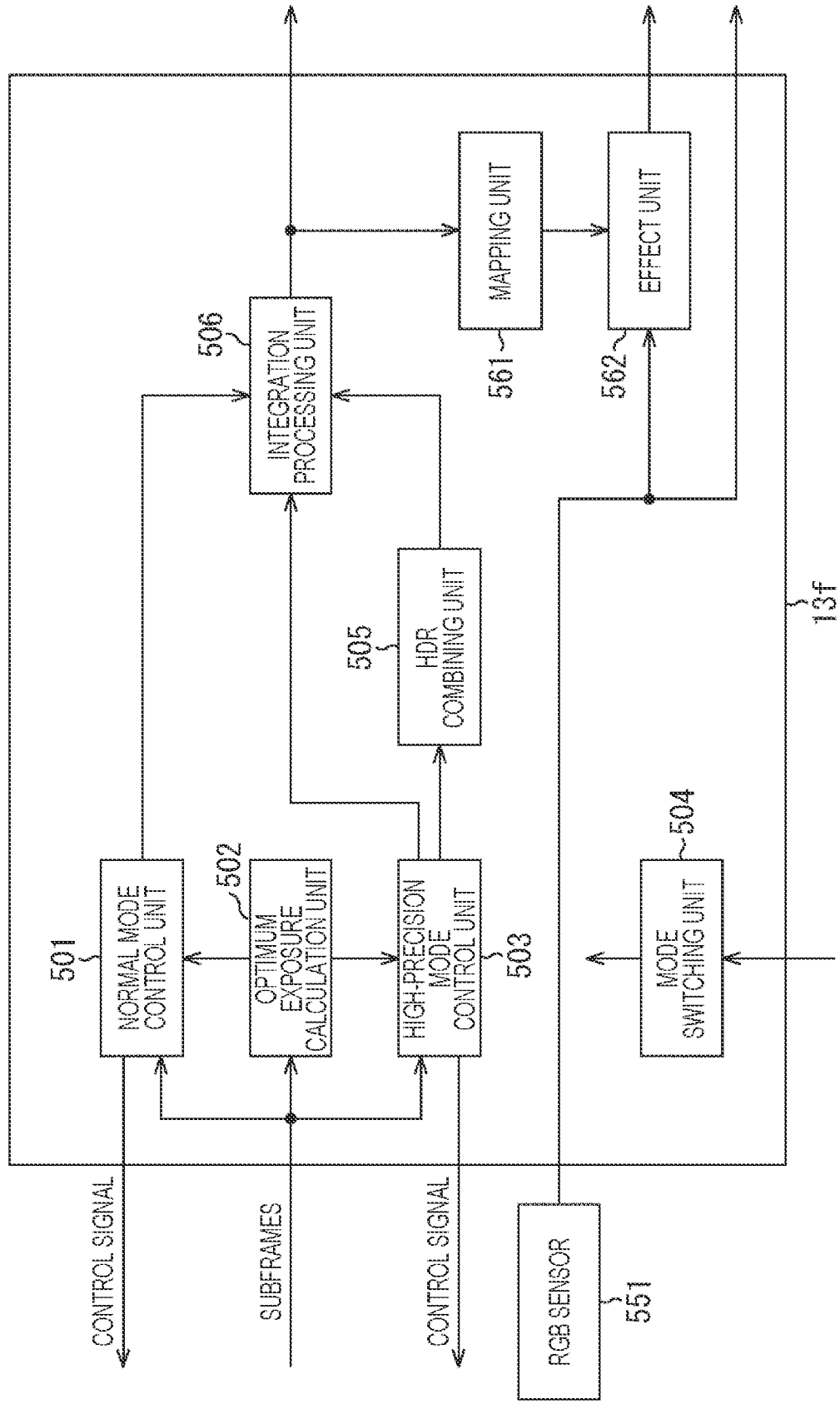
FIG. 42 is a diagram showing an example configuration of a signal processing unit.

FIG. 42 shows an example application of the signal processing unit 13 that switches between the normal mode and the high-precision mode in response to such a trigger input. A function of inputting and processing signals from an RGB sensor 551 is added to a signal processing unit 13*f* shown in FIG. 42. A normal color image can be acquired from the RGB sensor 551.

The signal processing unit 13*f* performs a process of deleting a background from a color image while leaving a person, for example. The signal processing unit 13 shown in FIG. 42 that performs such a process has a configuration in which a mapping unit 561 and an effect unit 562 are further added to the signal processing unit 13*d* shown in FIG. 40.

Figure 43:
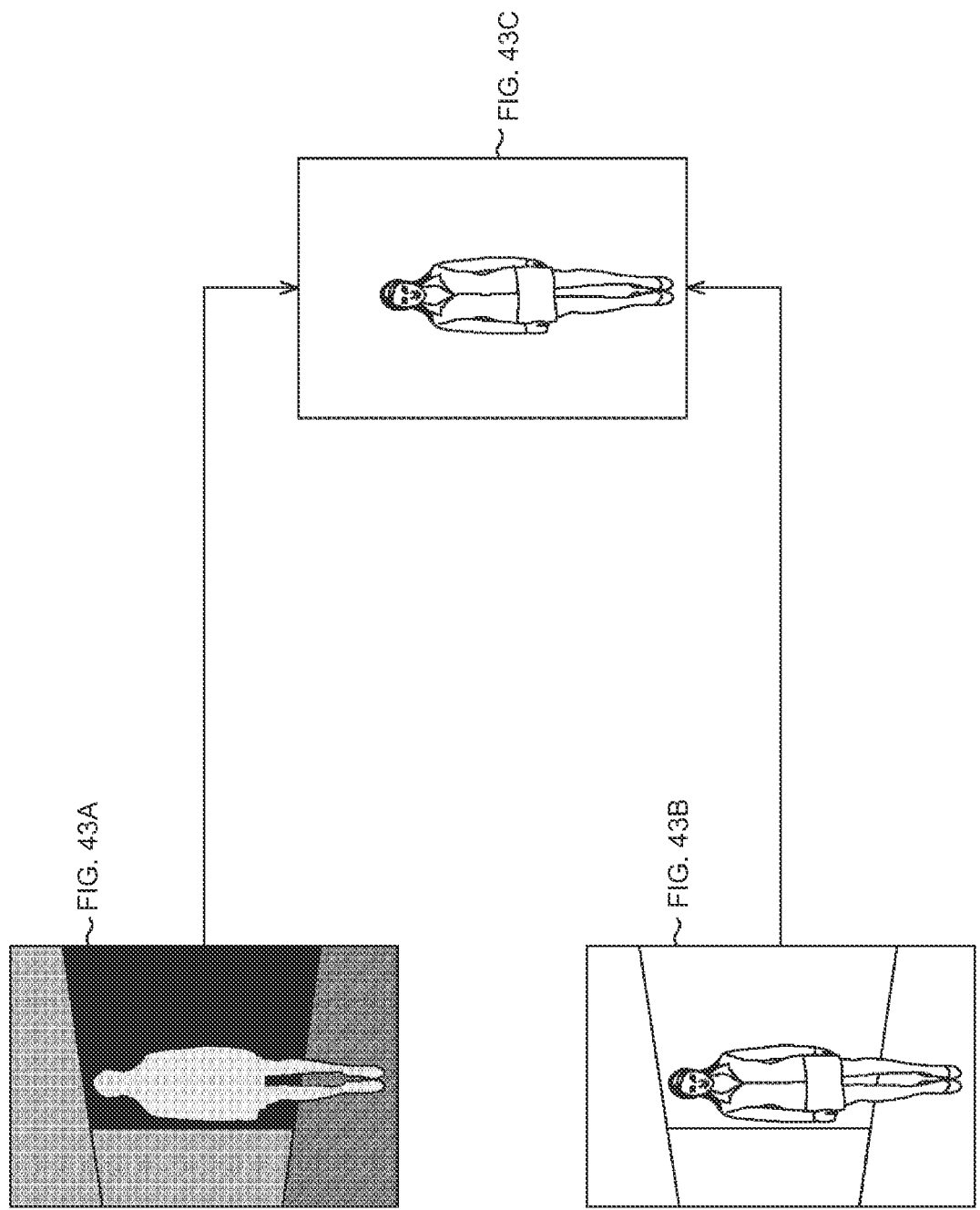
FIGS. 43A, 43B, and 43C are charts for explaining signal processing to be performed by the signal processing unit.

The mapping unit 561 maps a distance output from the integration processing unit 506 onto the corresponding pixel position in the color image. That is, a distance image corresponding to the obtained color image is generated. For example, a distance image A shown in FIG. 43 is generated.

The color image obtained by the RGB sensor 551 when the distance image A is obtained is a color image FIG. 43B, for example.

In the color image B, a person and a background are captured. The distance image corresponding to the color image B is the distance image A, the human portion is displayed in a color indicating substantially the same distance, and the background portion is displayed in a color indicating a different distance from that of the human portion.

The effect unit 562 performs a process of leaving the portion in the near view at substantially the same distance while deleting the other portions in the distance image A. In this case, the person in the near view remains while the background is deleted, and thus, an effect image C (FIG. 43C) is obtained.

In the device including the signal processing unit 13 shown in FIG. 42, in the normal mode, the distance image A from the integration processing unit 506 and/or the color image B obtained from the RGB sensor 551 can be output. In the high-precision mode, the distance image A is acquired by imaging performed with high accuracy, and an effect process is performed on the color image B on the basis of the distance image A. The effect image C after the effect process is then output. In the high-precision mode, one image or a plurality of images among the distance image A, the color image B, and the effect image C can be output.

Sixth Embodiment

<Switching by a Scene>

In the fifth embodiment, a case where the normal mode and the high-precision mode are switched by a predetermined trigger has been described as an example. In a sixth embodiment, a case where the normal mode and the high-precision mode are switched by a predetermined scene is described as an example.

Figure 44:
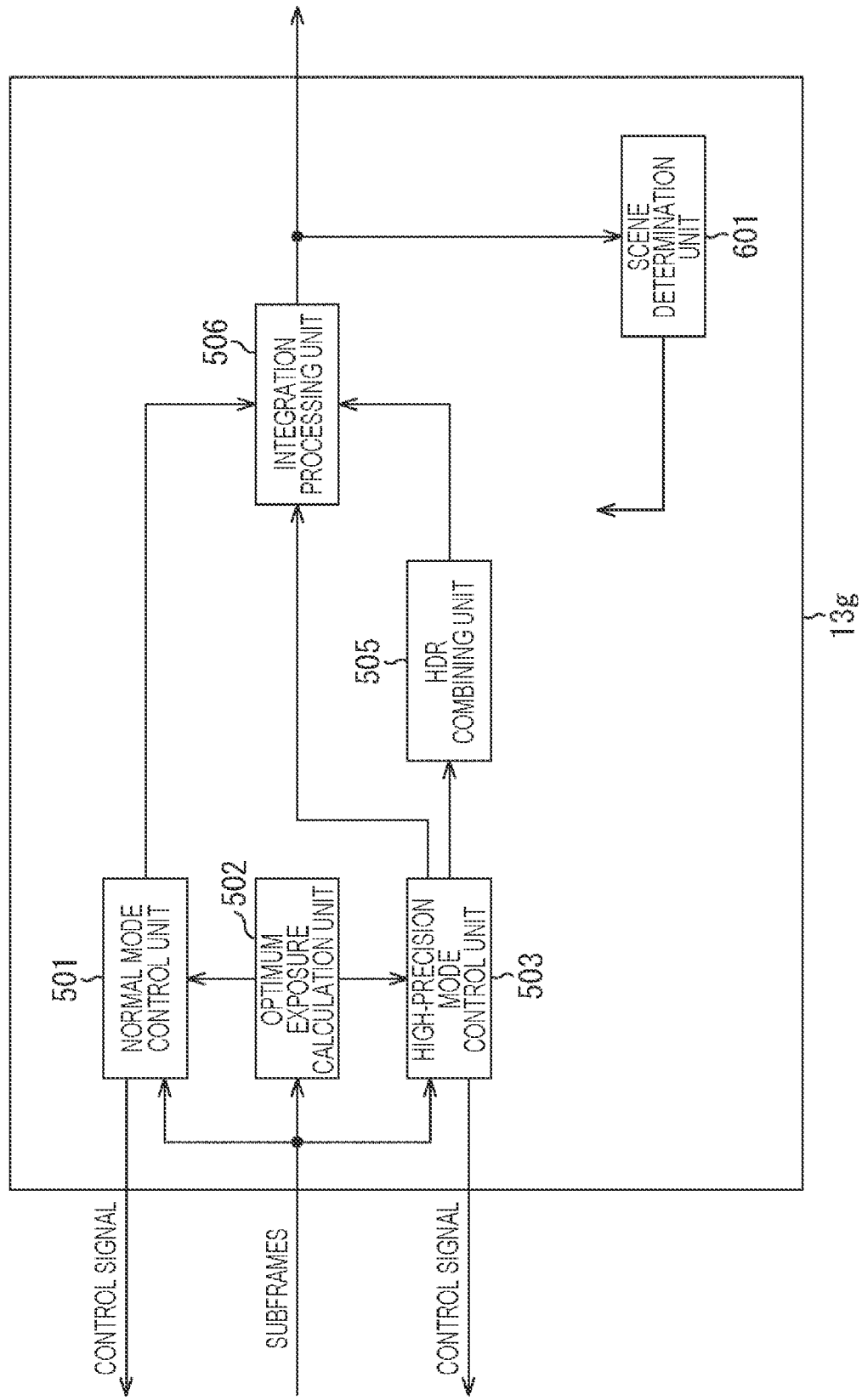
FIG. 44 is a diagram showing an example configuration of a signal processing unit.

FIG. 44 shows an example configuration of a signal processing unit 13g that switches between the normal mode and the high-precision mode in response to a predetermined scene. The signal processing unit 13g shown in FIG. 44 differs from the signal processing unit 13f shown in FIG. 40 in including a scene determination unit 601 in place of the mode switching unit 504, and the other aspects are similar to those of the signal processing unit 13f.

The scene determination unit 601 determines whether or not it is a predetermined scene from an image output from the integration processing unit 506, and, when determining that it is the predetermined scene, switches from the control by the normal mode control unit 501 to the control by the high-precision mode control unit 503.

The predetermined scene can be a scene in which a face is detected. For example, distance measurement can be performed in the high-precision mode at the time of face authentication.

Figure 45:
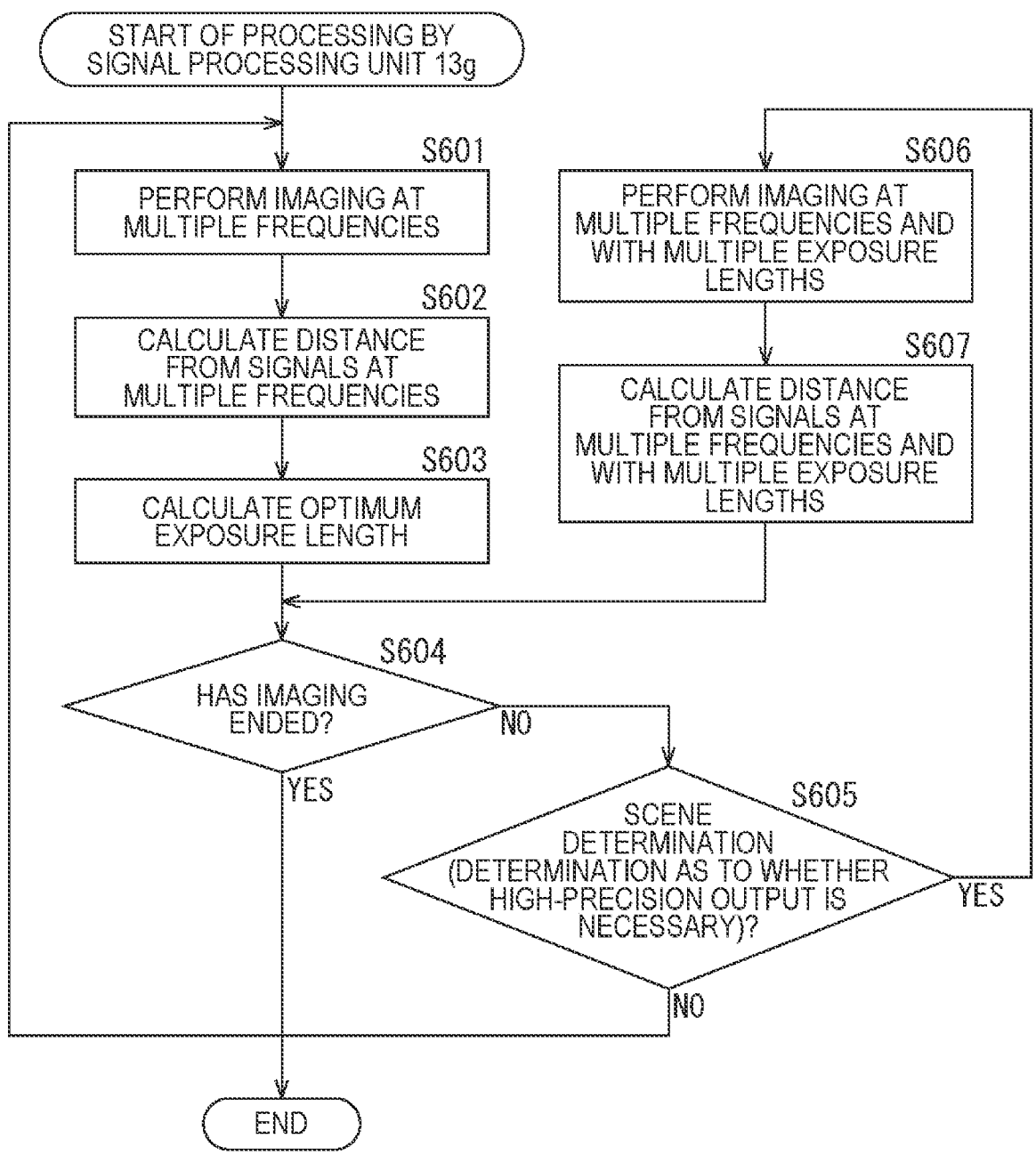
FIG. 45 is a chart for explaining operation of the signal processing unit.

Referring now to a flowchart shown in FIG. 45, an operation to be performed by the signal processing unit 13 shown in FIG. 44 is described. Explanation of processes similar to those to be performed by the signal processing unit 13f in the fifth embodiment is not made herein.

The processes in steps S601 to S604 are processes in the normal mode, like the processes in steps S502 to S505 (FIG. 41). After the frame l and the frame h are acquired in the normal mode, and a distance image is generated, the scene determination unit 601 determines whether or not the scene is a predetermined scene, using the generated distance image.

The predetermined scene may be determined from a black-and-white image, instead of a distance image. As shown in FIG. 2, the light receiving unit 12 includes the pixel array unit 41 in which the photodiodes 61 (FIG. 3) are two-dimensionally arranged, and performs imaging. By this imaging, a black-and-white image, or a monochrome image, can be obtained. Thus, the imaged object can be recognized from this monochrome image, and whether or not the object is a person's face can be determined.

In step S605, the scene determination unit 601 determines whether or not the scene is a scene for switching to the high-precision mode. The scene determination unit 601 analyzes the distance image (or the monochrome image), and determines that the scene is the predetermined scene in a case where there is a region that can be determined to be a face, for example.

If the scene determination unit 601 in step S605 determines the scene not to be the predetermined scene that requires a high-precision output, the process returns to step S601, and the processing thereafter is repeated.

If the scene determination unit 601 in step S605 determines the scene to be the predetermined scene that requires a high-precision output, on the other hand, the process moves on to step S606. As the scene is determined to be the predetermined scene that requires a high-precision output, distance measurement in the high-precision mode is performed.

The processes in steps S606 and S607 are processes in the high-precision mode, like the processes in steps S506 and S507 (FIG. 41).

As described above, when face authentication is performed on a predetermined scene, for example, the mode switches to the high-precision mode, and an image captured with high accuracy is used, so that a processing unit in a later stage can perform a face authentication process.

Seventh Embodiment

<Method for Adjusting Exposure Times>

In the above description, a case where long-time exposure and short-time exposure are controlled by adjusting the exposure time of the image sensor of the light receiving unit 12 has been described as an example.

Figure 46:
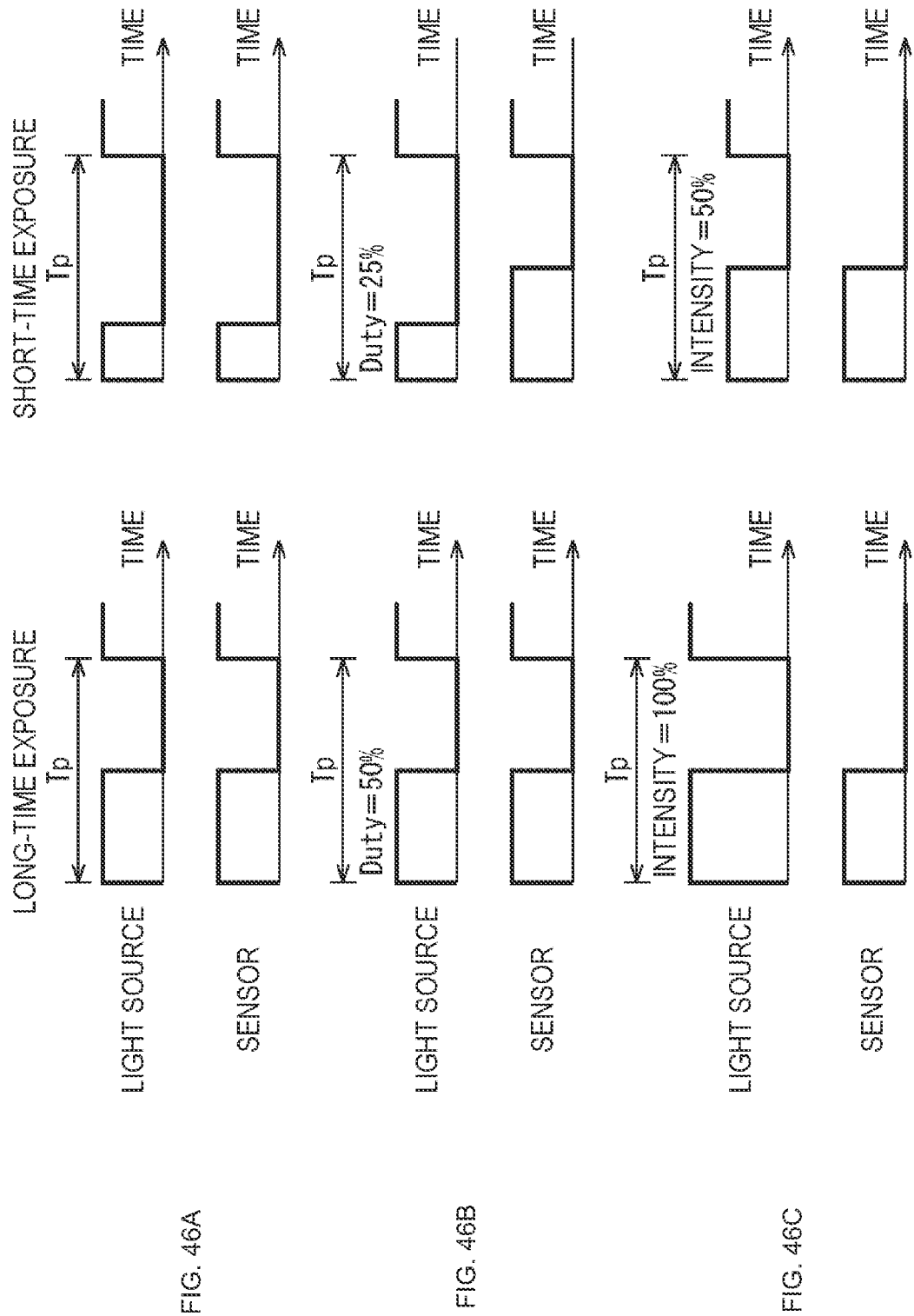
FIGS. 46A, 46B, and 46C are charts for explaining how to realize long-time exposure and short-time exposure.

In the above description, in a case where imaging is performed through long-time exposure using high-frequency irradiation light, and imaging is then performed through short-time exposure using high-frequency irradiation light, the light emission time (the time during which light emission is on) of the light source (the light emitting unit 14) in one cycle is set at a longer time than the light emission time in the case of long-time exposure, as shown in FIG. 46A, for example. Also, as for the exposure time of the sensor (the light receiving unit 12), long-time exposure (the left-side chart in FIG. 46A) is longer than short-time exposure (the right-side chart in FIG. 46B). As shown in FIG. 46A, the light emission time and the exposure time of the light source are set at the same time.

It is possible to realize long-time exposure and short-time exposure on the light receiving side as described above. By controlling the light emission on the light emitting side, it is also possible to create a state of long-time exposure and a state of short-time exposure. Further, the light emission time of the light emitting unit 14 may be the same between long-time exposure and short-time exposure, but it is possible to lower power consumption by shortening the light emission time of the light emitting unit 14 during the short-time exposure.

FIG. 46B indicates a state of long-time exposure and a state of short-time exposure with duty ratios. The left-side chart in FIG. 46B shows a state of long-time exposure, and the right-side chart shows a state of short-time exposure.

Referring to the chart of the sensor side shown in the lower portion of FIG. 46B, the same exposure time is set for the long-time exposure and the short-time exposure on the sensor side. On the other hand, referring to the chart of the light source side shown in the upper portion of FIG. 46B, the duty ratio is set at 50% (Duty=50% in the chart) so as to create a state of long-time exposure on the light source side, and the duty ratio is set at 25% (Duty=25% in the chart) so as to create a state of short-time exposure.

In a case where it is assumed that only the reflected light generated by light emission from the light source is received on the sensor side, even if the sensor is performing exposure, the reflected light is not received unless the light source is emitting light. In the example illustrated in FIG. 46B, while the duty ratio is 50% during the period corresponding to long-time exposure in the light emission time, the duty ratio is halved to 25% during the period corresponding to short-time exposure in the light emission time.

Therefore, on the sensor side, even if the exposure time is the same between the period corresponding to long-time exposure and the period corresponding to short-time exposure, the actual light receiving time during the period corresponding to short-time exposure is about half the actual light receiving time during the period corresponding to long-time exposure.

Thus, it is possible to adjust the exposure time on the sensor side, by adjusting the light emission time on the light emitting side.

FIG. 46C shows a case where a state of long-time exposure and a state of short-time exposure are created by controlling the light emission intensity on the light emitting side. The left-side chart in FIG. 46C indicates a state of long-time exposure, and the right-side chart indicates a state of short-time exposure.

Referring to the chart of the sensor side shown in the lower portion of FIG. 46C, the same exposure time is set for the long-time exposure and the short-time exposure on the sensor side. On the other hand, referring to the chart of the light source side shown in the upper portion of FIG. 46C, the light source intensity is set at 100% so as to create a state of long-time exposure on the light source side, and the light source intensity is set at 50% so as to create a state of short-time exposure.

In a case where it is assumed that only the reflected light generated by light emission from the light source is received on the sensor side, even if the sensor is performing exposure, the reflected light is not received unless the light source is emitting light. Further, if the emission intensity of the light source is high, the amount of light received per unit time also increases.

In the example illustrated in FIG. 46C, while the emission intensity is 100% during the period corresponding to long-time exposure in the light emission time, the emission intensity is halved to 50% during the period corresponding to short-time exposure in the light emission time.

Therefore, on the sensor side, even if the exposure time is the same between the period corresponding to long-time exposure and the period corresponding to short-time exposure, the amount of light to be received per unit time varies, and the amount light to be received during the period corresponding to short-time exposure is about half the amount of light to be received during the period corresponding to long-time exposure.

Thus, it is possible to adjust the exposure time on the sensor side, by adjusting the emission intensity on the light emitting side.

Such a method for creating the period corresponding to long-time exposure and the period corresponding to short-time exposure can be combined with any of the first to sixth embodiments described above. As an example, a case where the method is combined with the sixth embodiment is now described.

The example configuration of the signal processing unit 13 shown in FIG. 44 is again referred to herein. In a case where the period corresponding to long-time exposure and the period corresponding to short-time exposure are created by adjusting the exposure time on the sensor side described above with reference to FIG. 46A, the normal mode control unit 501 or the high-precision mode control unit 503 outputs, to the light receiving unit 12, a control signal for controlling the exposure by the light receiving unit 12 with the exposure length supplied from the optimum exposure calculation unit 502.

When high-frequency irradiation light is to be emitted, the normal mode control unit 501 or the high-precision mode control unit 503 outputs, to the light emission control unit 15, a control signal for controlling the light emitting unit 14 to emit high-frequency irradiation light. When low-frequency irradiation light is to be emitted, the normal mode control unit 501 or the high-precision mode control unit 503 outputs, to the light emission control unit 15, a control signal for controlling the light emitting unit 14 to emit low-frequency irradiation light.

In a case where the period corresponding to long-time exposure and the period corresponding to short-time exposure are created by adjusting the duty ratio on the light source side described above with reference to FIG. 46B, the normal mode control unit 501 and the high-precision mode control unit 503 calculate the duty ratio corresponding to the exposure length supplied from the optimum exposure calculation unit 502, and output, to the light emission control unit 15, a control signal for controlling light emission from the light emitting unit 14 at the duty ratio.

In this case, the optimum exposure calculation unit 502 may function as an optimum duty ratio calculation unit that calculates an optimum duty ratio, and the normal mode control unit 501 and the high-precision mode control unit 503 may output the duty ratio supplied from the optimum duty ratio calculation unit to the light emission control unit 15.

When high-frequency irradiation light is to be emitted, the normal mode control unit 501 or the high-precision mode control unit 503 also outputs, to the light emission control unit 15, a control signal for controlling the light emitting unit 14 to emit high-frequency irradiation light, as well as the duty ratio. When low-frequency irradiation light is to be emitted, the normal mode control unit 501 or the high-precision mode control unit 503 outputs, to the light emission control unit 15, a control signal for controlling the light emitting unit 14 to emit low-frequency irradiation light, as well as the duty ratio.

In a case where the period corresponding to long-time exposure and the period corresponding to short-time exposure are created by adjusting the emission intensity on the light source side described above with reference to FIG. 46C, the normal mode control unit 501 and the high-precision mode control unit 503 calculate the emission intensity corresponding to the exposure length supplied from the optimum exposure calculation unit 502, and output, to the light emission control unit 15, a control signal for controlling light emission from the light emitting unit 14 at the emission intensity.

In this case, the optimum exposure calculation unit 502 may function as an optimum emission intensity calculation unit that calculates an optimum emission intensity, and the normal mode control unit 501 and the high-precision mode control unit 503 may output the emission intensity supplied from the optimum emission intensity calculation unit to the light emission control unit 15.

When high-frequency irradiation light is to be emitted, the normal mode control unit 501 or the high-precision mode control unit 503 also outputs, to the light emission control unit 15, a control signal for controlling the light emitting unit 14 to emit high-frequency irradiation light, as well as the emission intensity. When low-frequency irradiation light is to be emitted, the normal mode control unit 501 or the high-precision mode control unit 503 outputs, to the light emission control unit 15, a control signal for controlling the light emitting unit 14 to emit low-frequency irradiation light, as well as the emission intensity.

As the normal mode control unit 501 or the high-precision mode control unit 503 adjusts the exposure time on the light receiving side, adjusts the duty ratio on the light source side, or adjusts the light emission intensity on the light source side in the above manner, the period corresponding to long-time exposure and the period corresponding to short-time exposure can be created.

As described above, the detection signals A0 to A270 and the detection signals B0 to B270 are acquired during the detection periods Q0 to Q3 (FIG. 16, for example). In a case where these detection signals are acquired with the light emission timing on the light emitting side shifted by the amounts of phase differences of 0 degrees, 90 degrees, 180 degrees, and 270 degrees, the case described above with reference to FIG. 46B may be applied, and light emission may be performed, with the phase difference and the duty ratio being controlled.

In a case where these detection signals are acquired with the light emission timing on the light emitting side shifted by the amounts of phase differences of 0 degrees, 90 degrees, 180 degrees, and 270 degrees, the case described above with reference to FIG. 46C may be applied, and light emission may be performed, with the phase difference and the emission intensity being controlled.

In a case where these detection signals are acquired with the light reception start timing on the light receiving side shifted by the amounts of phase differences of 0 degrees, 90 degrees, 180 degrees, and 270 degrees, the case described above with reference to FIG. 46A may be applied, and light reception may be performed, with the phase difference and the exposure time being controlled.

According to the present technology, distance measurement with an extended measurable distance range can be performed. Also, according to the present technology, distance measurement with an improved dynamic range can be performed. Further, according to the present technology, even in a case where distance measurement with an extended measurable distance range and an improved dynamic range is performed, the time required for imaging and the time required for processing can be shortened, and the processing load can be reduced.

Also, according to the present technology, the number of frames to be processed can be reduced. Accordingly, the moving object resistance can be increased, and more frames can be acquired. Thus, higher-speed imaging (distance measurement) can be performed.

<Recording Medium>

The above described series of processes can be performed by hardware, or can be performed by software. In a case where the series of processes are to be performed by software, the program that forms the software is installed into a computer. Here, the computer may be a computer incorporated into special-purpose hardware, or may be a general-purpose personal computer or the like that can execute various kinds of functions, having various kinds of programs installed thereinto, for example.

Figure 47:
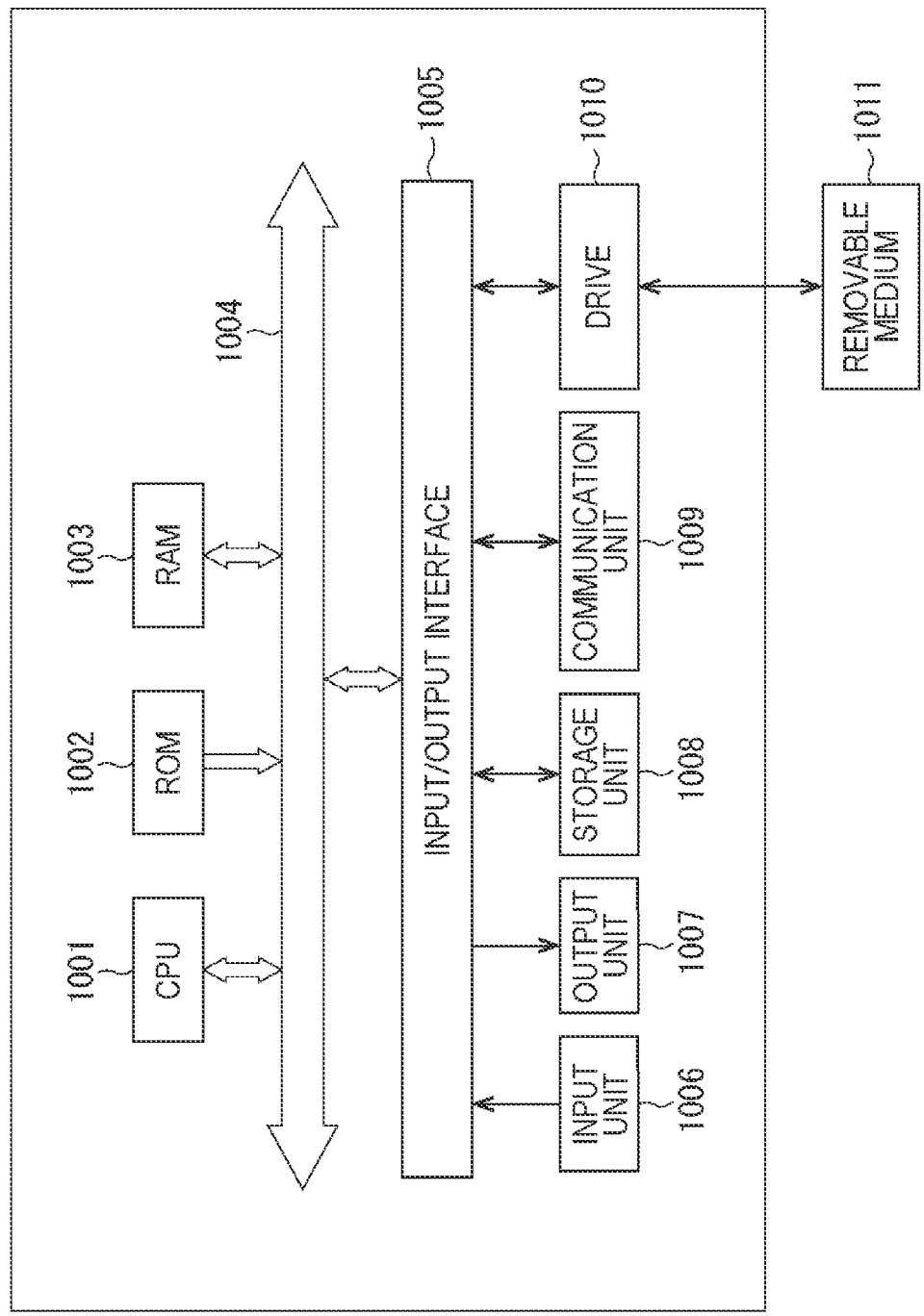
FIG. 47 is a diagram for explaining a recording medium.

FIG. 47 is a block diagram showing an example configuration of the hardware of a computer that performs the above described series of processes in accordance with a program.

In a computer, a central processing unit (CPU) 1001, a read only memory (ROM) 1002, and a random access memory (RAM) 1003 are connected to one another by a bus 1004. An input/output interface 1005 is further connected to the bus 1004. An input unit 1006, an output unit 1007, a storage unit 1008, a communication unit 1009, and a drive 1010 are connected to the input/output interface 1005.

The input unit 1006 is formed with a keyboard, a mouse, a microphone, and the like. The output unit 1007 is formed with a display, a speaker, and the like. The storage unit 1008 is formed with a hard disk, a nonvolatile memory, or the like. The communication unit 1009 is formed with a network interface or the like. The drive 1010 drives a removable medium 1011 such as a magnetic disk, an optical disk, a magnetooptical disk, or a semiconductor memory.

In the computer having the above described configuration, for example, the CPU 1001 loads a program stored in the storage unit 1008 into the RAM 1003 via the input/output interface 1005 and the bus 1004, and executes the program, so that the above described series of processes are performed.

The program to be executed by the computer (the CPU 1001) may be recorded on the removable medium 1011 and the like as a package medium to be provided, for example. Alternatively, the program can be provided via a wired or wireless transmission medium, such as a local area network, the Internet, or digital satellite broadcasting.

In the computer, the program can be installed into the storage unit 1008 via the input/output interface 1005 when the removable medium 1011 is mounted on the drive 1010. Also, the program may be received by the communication unit 1009 via a wired or wireless transmission medium, and be installed into the storage unit 1008. Alternatively, the program can be installed beforehand into the ROM 1002 or the storage unit 1008.

Note that the program to be executed by the computer may be a program for performing processes in chronological order in accordance with the sequence described in this specification, or may be a program for performing processes in parallel or performing a process when necessary, such as when there is a call.

<Example Applications to Mobile Structures>

The technology (the present technology) according to the present disclosure can be applied to various products. For example, the technology according to the present disclosure may be embodied as a device mounted on any type of mobile structure, such as an automobile, an electrical vehicle, a hybrid electrical vehicle, a motorcycle, a bicycle, a personal mobility device, an airplane, a drone, a vessel, or a robot.

Figure 48:
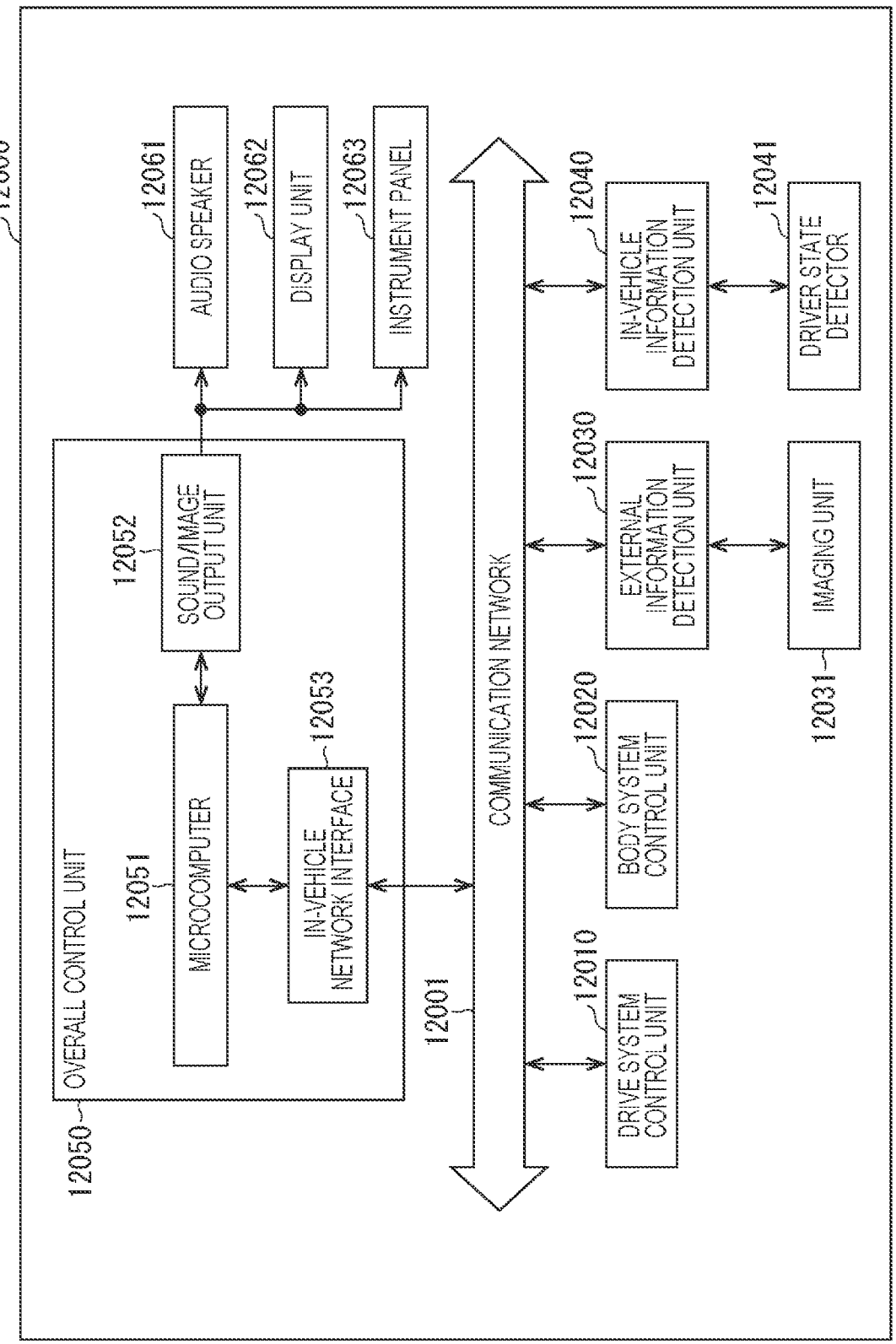
FIG. 48 is a block diagram schematically showing an example configuration of a vehicle control system.

FIG. 48 is a block diagram schematically showing an example configuration of a vehicle control system that is an example of a mobile structure control system to which the technology according to the present disclosure may be applied.

A vehicle control system 12000 includes a plurality of electronic control units connected via a communication network 12001. In the example shown in FIG. 48, the vehicle control system 12000 includes a drive system control unit 12010, a body system control unit 12020, an external information detection unit 12030, an in-vehicle information detection unit 12040, and an overall control unit 12050. Further, a microcomputer 12051, a sound/image output unit 12052, and an in-vehicle network interface (I/F) 12053 are also shown as the functional components of the overall control unit 12050.

The drive system control unit 12010 controls operations of the devices related to the drive system of the vehicle according to various programs. For example, the drive system control unit 12010 functions as control devices such as a driving force generation device for generating a driving force of the vehicle such as an internal combustion engine or a driving motor, a driving force transmission mechanism for transmitting the driving force to the wheels, a steering mechanism for adjusting the steering angle of the vehicle, and a braking device for generating a braking force of the vehicle.

The body system control unit 12020 controls operations of the various devices mounted on the vehicle body according to various programs. For example, the body system control unit 12020 functions as a keyless entry system, a smart key system, a power window device, or a control device for various lamps such as a headlamp, a backup lamp, a brake lamp, a turn signal lamp, a fog lamp, or the like. In this case, the body system control unit 12020 can receive radio waves transmitted from a portable device that substitutes for a key, or signals from various switches. The body system control unit 12020 receives inputs of these radio waves or signals, and controls the door lock device, the power window device, the lamps, and the like of the vehicle.

The external information detection unit 12030 detects information outside the vehicle equipped with the vehicle control system 12000. For example, an imaging unit 12031 is connected to the external information detection unit 12030. The external information detection unit 12030 causes the imaging unit 12031 to capture an image of the outside of the vehicle, and receives the captured image. On the basis of the received image, the external information detection unit 12030 may perform an object detection process for detecting a person, a vehicle, an obstacle, a sign, characters on the road surface, or the like, or perform a distance detection process.

The imaging unit 12031 is an optical sensor that receives light, and outputs an electrical signal corresponding to the amount of received light. The imaging unit 12031 can output an electrical signal as an image, or output an electrical signal as distance measurement information. Further, the light to be received by the imaging unit 12031 may be visible light, or may be invisible light such as infrared rays.

The in-vehicle information detection unit 12040 detects information about the inside of the vehicle. For example, a driver state detector 12041 that detects the state of the driver is connected to the in-vehicle information detection unit 12040. The driver state detector 12041 includes a camera that captures an image of the driver, for example, and, on the basis of detected information input from the driver state detector 12041, the in-vehicle information detection unit 12040 may calculate the degree of fatigue or the degree of concentration of the driver, or determine whether or not the driver is dozing off.

On the basis of the external/internal information acquired by the external information detection unit 12030 or the in-vehicle information detection unit 12040, the microcomputer 12051 can calculate the control target value of the driving force generation device, the steering mechanism, or the braking device, and output a control command to the drive system control unit 12010. For example, the microcomputer 12051 can perform cooperative control to achieve the functions of an advanced driver assistance system (ADAS), including vehicle collision avoidance or impact mitigation, follow-up running based on the distance between vehicles, vehicle velocity maintenance running, vehicle collision warning, vehicle lane deviation warning, or the like.

Further, the microcomputer 12051 can also perform cooperative control to conduct automatic driving or the like for autonomously running not depending on the operation of the driver, by controlling the driving force generation device, the steering mechanism, the braking device, or the like on the basis of information about the surroundings of the vehicle, the information having being acquired by the external information detection unit 12030 or the in-vehicle information detection unit 12040.

The microcomputer 12051 can also output a control command to the body system control unit 12030, on the basis of the external information acquired by the external information detection unit 12030. For example, the microcomputer 12051 controls the headlamp in accordance with the position of the leading vehicle or the oncoming vehicle detected by the external information detection unit 12030, and performs cooperative control to achieve an anti-glare effect by switching from a high beam to a low beam, or the like.

The sound/image output unit 12052 transmits an audio output signal and/or an image output signal to an output device that is capable of visually or audibly notifying the passenger(s) of the vehicle or the outside of the vehicle of information. In the example shown in FIG. 48, an audio speaker 12061, a display unit 12062, and an instrument panel 12063 are shown as output devices. The display unit 12062 may include an on-board display and/or a head-up display, for example.

Figure 49:
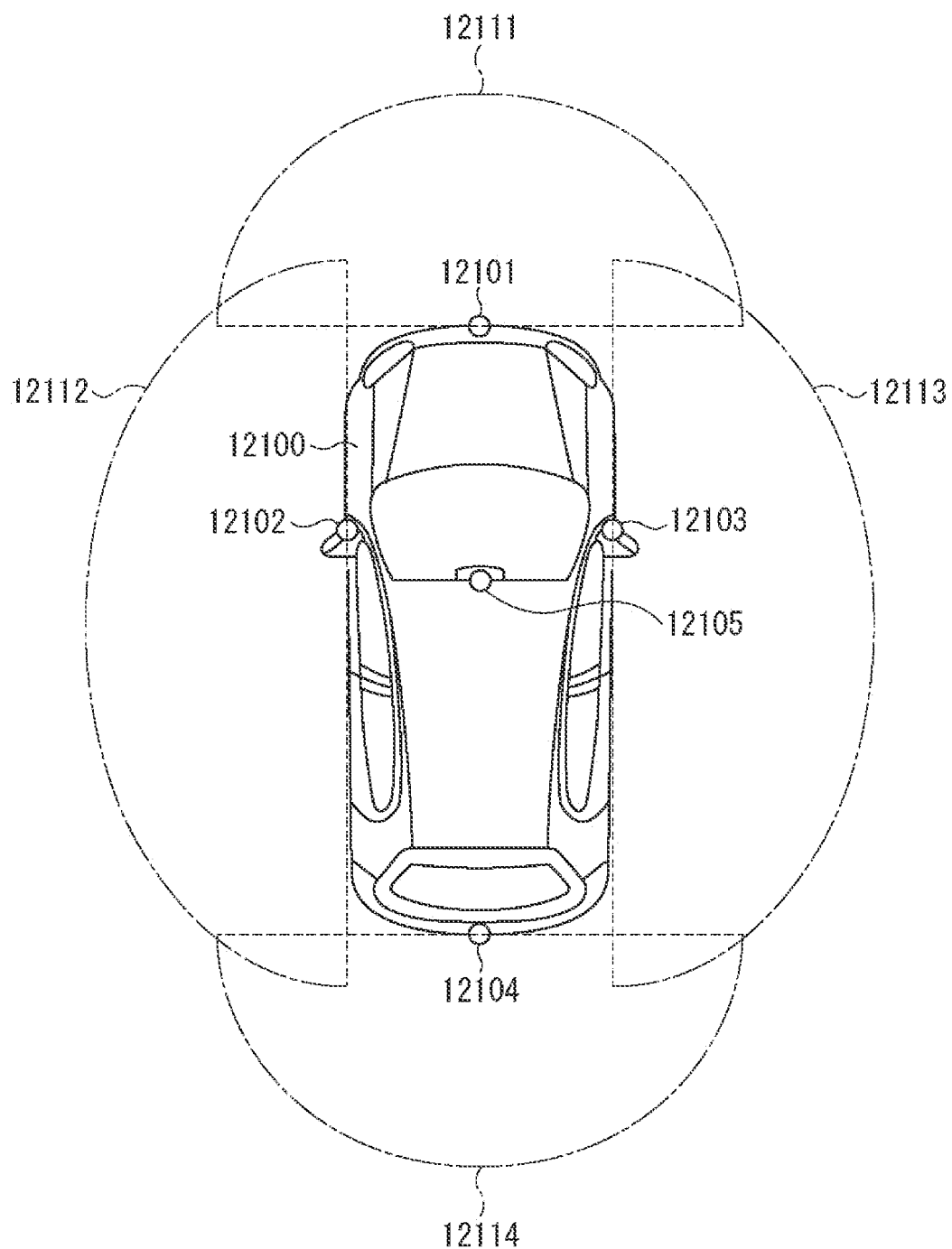
FIG. 49 is an explanatory diagram showing an example of installation positions of external information detectors and imaging units.

FIG. 49 is a diagram showing an example of installation positions of imaging units 12031.

In FIG. 49, imaging units 12101, 12102, 12103, 12104, and 12105 are included as the imaging units 12031.

Imaging units 12101, 12102, 12103, 12104, and 12105 are provided at the following positions: the front end edge of a vehicle 12100, a side mirror, the rear bumper, a rear door, an upper portion of the front windshield inside the vehicle, and the like, for example. The imaging unit 12101 provided on the front end edge and the imaging unit 12105 provided on the upper portion of the front windshield inside the vehicle mainly capture images ahead of the vehicle 12100. The imaging units 12102 and 12103 provided on the side mirrors mainly capture images on the sides of the vehicle 12100. The imaging unit 12104 provided on the rear bumper or a rear door mainly captures images behind the vehicle 12100. The imaging unit 12105 provided on the upper portion of the front windshield inside the vehicle is mainly used for detection of a vehicle running in front of the vehicle, a pedestrian, an obstacle, a traffic signal, a traffic sign, a lane, or the like.

Note that FIG. 49 shows an example of the imaging ranges of the imaging units 12101 to 12104. An imaging range 12111 indicates the imaging range of the imaging unit 12101 provided on the front end edge, imaging ranges 12112 and 12113 indicate the imaging ranges of the imaging units 12102 and 12103 provided on the respective side mirrors, and an imaging range 12114 indicates the imaging range of the imaging unit 12104 provided on the rear bumper or a rear door. For example, images captured from image data by the imaging units 12101 to 12104 are superimposed on one another, so that an overhead image of the vehicle 12100 viewed from above is obtained.

At least one of the imaging units 12101 to 12104 may have a function of acquiring distance information. For example, at least one of the imaging units 12101 to 12104 may be a stereo camera including a plurality of imaging elements, or may be imaging elements having pixels for phase difference detection.

For example, on the basis of distance information obtained from the imaging units 12101 to 12104, the microcomputer 12051 calculates the distances to the respective three-dimensional objects within the imaging ranges 12111 to 12114, and temporal changes in the distances (the velocities relative to the vehicle 12100). In this manner, the three-dimensional object that is the closest three-dimensional object on the traveling path of the vehicle 12100 and is traveling at a predetermined velocity (0 km/h or higher, for example) in substantially the same direction as the vehicle 12100 can be extracted as the vehicle running in front of the vehicle 12100. Further, the microcomputer 12051 can set beforehand an inter-vehicle distance to be maintained in front of the vehicle running in front of the vehicle 12100, and can perform automatic brake control (including follow-up stop control), automatic acceleration control (including follow-up start control), and the like. In this manner, it is possible to perform cooperative control to conduct automatic driving or the like to autonomously travel not depending on the operation of the driver.

For example, in accordance with the distance information obtained from the imaging units 12101 to 12104, the microcomputer 12051 can extract three-dimensional object data concerning three-dimensional objects under the categories of two-wheeled vehicles, regular vehicles, large vehicles, pedestrians, utility poles, and the like, and use the three-dimensional object data in automatically avoiding obstacles. For example, the microcomputer 12051 classifies the obstacles in the vicinity of the vehicle 12100 into obstacles visible to the driver of the vehicle 12100 and obstacles difficult to visually recognize. The microcomputer 12051 then determines collision risks indicating the risks of collision with the respective obstacles. If a collision risk is equal to or higher than a set value, and there is a possibility of collision, the microcomputer 12051 can output a warning to the driver via the audio speaker 12061 and the display unit 12062, or can perform driving support for avoiding collision by performing forced deceleration or avoiding steering via the drive system control unit 12010.

At least one of the imaging units 12101 to 12104 may be an infrared camera that detects infrared rays. For example, the microcomputer 12051 can recognize a pedestrian by determining whether or not a pedestrian exists in images captured by the imaging units 12101 to 12104. Such pedestrian recognition is carried out through a process of extracting feature points from the images captured by the imaging units 12101 to 12104 serving as infrared cameras, and a process of performing a pattern matching on the series of feature points indicating the outlines of objects and determining whether or not there is a pedestrian, for example. If the microcomputer 12051 determines that a pedestrian exists in the images captured by the imaging units 12101 to 12104, and recognizes a pedestrian, the sound/image output unit 12052 controls the display unit 12062 to display a rectangular contour line for emphasizing the recognized pedestrian in a superimposed manner. Further, the sound/image output unit 12052 may also control the display unit 12062 to display an icon or the like indicating the pedestrian at a desired position.

In this specification, a system means an entire apparatus formed with a plurality of devices.

Note that the advantageous effects described in this specification are merely examples, and the advantageous effects of the present technology are not limited to them or may include other effects.

Note that embodiments of the present technology are not limited to the above described embodiments, and various modifications may be made to them without departing from the scope of the present technology.

Note that the present technology may also be embodied in the configurations described below.

(1)

A distance measuring device including:

a light emitting unit that emits irradiation light;

a light receiving unit that receives reflected light of the irradiation light reflected by an object;

a calculation unit that calculates a distance to the object, on the basis of the time from emission of the irradiation light to reception of the reflected light; and a control unit that controls the light emitting unit and the light receiving unit, in which the control unit controls first imaging that causes the light receiving unit to perform exposure for a first exposure time, and second imaging that causes the light receiving unit to perform exposure for a second exposure time, and the calculation unit calculates the distance, using a signal obtained by the first imaging and a signal obtained by the second imaging.

(2)

The distance measuring device according to (1), in which the first exposure time is longer than the second exposure time.

(3)

The distance measuring device according to (1) or (2), in which the control unit controls first imaging that causes the light emitting unit to emit light at a first frequency, and causes the light receiving unit to perform exposure for the first exposure time, second imaging that causes the light emitting unit to emit light at the first frequency, and causes the light receiving unit to perform exposure for the second exposure time, and third imaging that causes the light emitting unit to emit light at a second frequency, and causes the light receiving unit to perform exposure for the first exposure time.

(4)

The distance measuring device according to (3), in which a high dynamic range image is generated from a first image obtained by the first imaging and a second image obtained by the second imaging, and the calculation unit calculates the distance, using the high dynamic range image and a third image obtained by the third imaging.

(5)

The distance measuring device according to (4), in which the high dynamic range image is generated from the first image when the first image is not saturated, and is generated from the second image when the first image is saturated.

(6)
  The distance measuring device according to (3), in which the control unit further controls
    fourth imaging that causes the light emitting unit to emit light at the second frequency, and causes the light receiving unit to perform exposure for the second exposure time.
(7)
  The distance measuring device according to any one of (3) to (6), in which
    the first frequency is a higher frequency than the second frequency.
(8)
  The distance measuring device according to (6) or (7), in which
    a first high dynamic range image is generated from a first image obtained by the first imaging and a second image obtained by the second imaging,
    a second high dynamic range image is generated from a third image obtained by the third imaging and a fourth image obtained by the fourth imaging, and
    the calculation unit calculates the distance, using the first high dynamic range image and the second high dynamic range image.
(9)
  A distance measuring method in which
  a distance measuring device that performs distance measurement includes:
    a light emitting unit that emits irradiation light;
    a light receiving unit that receives reflected light of the irradiation light reflected by an object;
    a calculation unit that calculates a distance to the object, on the basis of the time from emission of the irradiation light to reception of the reflected light; and
    a control unit that controls the light emitting unit and the light receiving unit,
    the control unit controls
    first imaging that causes the light receiving unit to perform exposure for a first exposure time, and
    second imaging that causes the light receiving unit to perform exposure for a second exposure time, and
    the calculation unit
    calculates the distance, using a signal obtained by the first imaging and a signal obtained by the second imaging.
(10)
  A program to be executed by a computer of a distance measuring device that includes:
    a light emitting unit that emits irradiation light;
    a light receiving unit that receives reflected light of the irradiation light reflected by an object;
    a calculation unit that calculates a distance to the object, on the basis of the time from emission of the irradiation light to reception of the reflected light; and
    a control unit that controls the light emitting unit and the light receiving unit,
    the program being for causing the computer to perform a process including steps in which
    the control unit controls
    first imaging that causes the light receiving unit to perform exposure for a first exposure time, and
    second imaging that causes the light receiving unit to perform exposure for a second exposure time, and
    the calculation unit
    calculates the distance, using a signal obtained by the first imaging and a signal obtained by the second imaging.
(11)
  A distance measuring device including:
    a light emitting unit that emits irradiation light;
    a light receiving unit that receives reflected light of the irradiation light reflected by an object;
    a calculation unit that calculates a distance to the object, on the basis of the time from emission of the irradiation light to reception of the reflected light; and
    a control unit that controls the light emitting unit and the light receiving unit,
    in which
    the control unit controls
    first imaging that causes the light emitting unit to emit light at a first duty ratio, and
    second imaging that causes the light receiving unit to emit light at a second duty ratio that is lower than the first duty ratio, and
    the calculation unit
    calculates the distance, using a signal obtained by the first imaging and a signal obtained by the second imaging.
(12)
  A distance measuring method in which
  a distance measuring device that performs distance measurement includes:
    a light emitting unit that emits irradiation light;
    a light receiving unit that receives reflected light of the irradiation light reflected by an object;
    a calculation unit that calculates a distance to the object, on the basis of the time from emission of the irradiation light to reception of the reflected light; and
    a control unit that controls the light emitting unit and the light receiving unit,
    the control unit controls
    first imaging that causes the light emitting unit to emit light at a first duty ratio, and
    second imaging that causes the light receiving unit to emit light at a second duty ratio that is lower than the first duty ratio, and
    the calculation unit
    calculates the distance, using a signal obtained by the first imaging and a signal obtained by the second imaging.
(13)
  A distance measuring device including:
    a light emitting unit that emits irradiation light;
    a light receiving unit that receives reflected light of the irradiation light reflected by an object;
    a calculation unit that calculates a distance to the object, on the basis of the time from emission of the irradiation light to reception of the reflected light; and
    a control unit that controls the light emitting unit and the light receiving unit,
    in which
    the control unit controls
    first imaging that causes the light emitting unit to emit light at a first emission intensity, and
    second imaging that causes the light receiving unit to emit light at a second emission intensity that is lower than the first emission intensity, and
    the calculation unit
    calculates the distance, using a signal obtained by the first imaging and a signal obtained by the second imaging.
(14)
  A distance measuring method in which
  a distance measuring device that performs distance measurement includes:
    a light emitting unit that emits irradiation light;
    a light receiving unit that receives reflected light of the irradiation light reflected by an object;

a calculation unit that calculates a distance to the object, on the basis of the time from emission of the irradiation light to reception of the reflected light; and
a control unit that controls the light emitting unit and the light receiving unit,
the control unit controls
first imaging that causes the light emitting unit to emit light at a first emission intensity, and
second imaging that causes the light receiving unit to emit light at a second emission intensity that is lower than the first emission intensity, and
the calculation unit
calculates the distance, using a signal obtained by the first imaging and a signal obtained by the second imaging.

REFERENCE SIGNS LIST

10 Distance measuring device
11 Lens
12 Light receiving unit
13 Signal processing unit
14 Light emitting unit
15 Light emission control unit
31 Photodiode
41 Pixel array unit
42 Vertical drive unit
43 Column processing unit
44 Horizontal drive unit
45 System control unit
46 Pixel drive line
47 Vertical signal line
48 Signal processing unit
50 Pixel
51 Tap
61 Photodiode
62 Transfer transistor
63 FD portion
64 Selection transistor
65 Reset transistor
101 Integration processing unit
201 HDR combining unit
301 HDR combining unit
302 Integration processing unit
501 Normal mode control unit
502 Optimum exposure calculation unit
503 High-precision mode control unit
504 Mode switching unit
505 HDR combining unit
506 Integration processing unit
551 RGB sensor
561 Mapping unit
562 Effect unit
601 Scene determination unit

The invention claimed is:

1. A distance measuring device, comprising:
a light emitting unit configured to emit irradiation light;
a light receiving unit configured to receive reflected light of the irradiation light reflected by an object;
a control unit configured to control the light emitting unit and the light receiving unit, wherein
the control unit is further configured to:
control a first imaging operation to obtain a first image, wherein the first imaging operation causes
the light emitting unit to emit light at a first frequency, and
the light receiving unit to perform exposure for a first exposure time;
control a second imaging operation to obtain a second image, wherein the second imaging operation causes
the light emitting unit to emit the light at the first frequency, and
the light receiving unit to perform exposure for a second exposure time;
control a third imaging operation to obtain a third image, wherein the third imaging operation causes
the light emitting unit to emit light at a second frequency, and
the light receiving unit to perform exposure for the first exposure time; and
generate a first high dynamic range image associated with the first frequency, from the first image and the second image; and
a calculation unit configured to calculate a distance to the object, based on the first high dynamic range image associated with the light of the first frequency and the third image associated with the light of the second frequency.

2. The distance measuring device according to claim 1, wherein the first exposure time is longer than the second exposure time.

3. The distance measuring device according to claim 1, wherein the control unit is further configured to:
generate the first high dynamic range image from the first image, in a case where the first image is not saturated; and
generate the first high dynamic range image from the second image, in a case where the first image is saturated.

4. The distance measuring device according to claim 1, wherein the control unit is further configured to control a fourth imaging operation that:
causes the light emitting unit to emit the light at the second frequency, and
causes the light receiving unit to perform exposure for the second exposure time.

5. The distance measuring device according to claim 1, wherein the first frequency is a higher frequency than the second frequency.

6. The distance measuring device according to claim 4, wherein
the control unit is further configured to generate a second high dynamic range image from the third image obtained by the third imaging operation and a fourth image obtained by the fourth imaging operation, and
the calculation unit is further configured to calculate the distance, based on the first high dynamic range image and the second high dynamic range image.

7. A distance measuring method, comprising:
emitting, by a light emitting unit, irradiation light;
receiving, by a light receiving unit, reflected light of the irradiation light reflected by an object;
controlling, by a control unit, first imaging to obtain a first image, wherein the first imaging causes
the light emitting unit to emit light at a first frequency, and
the light receiving unit to perform exposure for a first exposure time; and
controlling, by the control unit, second imaging to obtain a second image, wherein the second imaging causes
the light emitting unit to emit the light at the first frequency, and
the light receiving unit to perform exposure for a second exposure time; and controlling, by the control unit, third imaging to obtain a third image, wherein the third imaging causes
the light emitting unit to emit light at a second frequency, and
the light receiving unit to perform exposure for the first exposure time;
generating, by the control unit, a high dynamic range image associated with the first frequency, from the first image and the second image; and
calculating, by a calculation unit, a distance to the object, based on the high dynamic range image associated with the light of the first frequency and the third image associated with the light of the second frequency.

8. A non-transitory computer-readable medium having stored thereon, computer-executable instructions which, when executed by a computer, cause the computer to execute operations, the operations comprising:
emitting, by a light emitting unit, irradiation light;
receiving, by a light receiving unit, reflected light of the irradiation light reflected by an object;
controlling, by a control unit, first imaging to obtain a first image, wherein the first imaging causes
the light emitting unit to emit light at a first frequency, and
the light receiving unit to perform exposure for a first exposure time;
controlling, by the control unit, second imaging to obtain a second image, wherein the second imaging causes
the light emitting unit to emit the light at the first frequency, and
the light receiving unit to perform exposure for a second exposure time;
controlling, by the control unit, third imaging to obtain a third image, wherein the third imaging causes
the light emitting unit to emit light at a second frequency, and
the light receiving unit to perform exposure for the first exposure time;
generating, by the control unit, a high dynamic range image associated with the first frequency, from the first image and the second image; and
calculating, by a calculation unit, a distance to the object, based on the high dynamic range image associated with the light of the first frequency and the third image associated with the light of the second frequency.

9. A distance measuring device, comprising:
a light emitting unit configured to emit irradiation light;
a light receiving unit configured to receive reflected light of the irradiation light reflected by an object;
a control unit configured to control the light emitting unit and the light receiving unit, wherein
the control unit further configured to:
control a first imaging operation to obtain subframes, wherein the first imaging operation causes the light emitting unit to emit light at a first duty ratio;
determine an exposure length of an exposure for a second imaging operation, based on the subframes obtained by the first imaging operation;
determine a second duty ratio based on the exposure length of the exposure for the second imaging operation; and
control the second imaging operation to obtain a specific frame, wherein
the second imaging operation causes the light emitting unit to emit light at the determined second duty ratio, and
the second duty ratio is lower than the first duty ratio; and
a calculation unit configured to calculate a distance of the object, based on the subframes obtained by the first imaging operation and the specific frame obtained by the second imaging operation.

10. A distance measuring method, comprising:
emitting, by a light emitting unit, irradiation light;
receiving, by a light receiving unit, reflected light of the irradiation light reflected by an object;
controlling, by a control unit, first imaging to obtain subframes, wherein the first imaging causes the light emitting unit to emit light at a first duty ratio;
determining, by the control unit, an exposure length of an exposure for second imaging, based on the subframes obtained by the first imaging;
determining, by the control unit, a second duty ratio based on the exposure length of the exposure for the second imaging; and
controlling, by the control unit, the second imaging to obtain a specific frame, wherein
the second imaging causes the light emitting unit to emit light at the determined second duty ratio, and
the second duty ratio is lower than the first duty ratio; and
calculating, by a calculation unit, a distance to the object, based on the subframes obtained by the first imaging and the specific frame obtained by the second imaging.

11. A distance measuring device, comprising:
a light emitting unit configured to emit irradiation light;
a light receiving unit configured to receive reflected light of the irradiation light reflected by an object;
a control unit configured to control the light emitting unit and the light receiving unit, wherein
the control unit further configured to:
control a first imaging operation to obtain subframes, wherein the first imaging operation causes the light emitting unit to emit light at a first emission intensity;
determine an exposure length of an exposure for a second imaging operation, based on the subframes obtained by the first imaging operation;
determine a second emission intensity based on the exposure length of the exposure for the second imaging operation; and
control the second imaging operation to obtain a specific frame, wherein
the second imaging operation causes the light emitting unit to emit light at the determined second emission intensity, and
the second emission intensity is lower than the first emission intensity; and
a calculation unit configured to calculate a distance of the object, based on the subframes obtained by the first imaging operation and the specific frame obtained by the second imaging operation.

12. A distance measuring method, comprising:
emitting, by a light emitting unit, irradiation light;
receiving, by a light receiving unit, reflected light of the irradiation light reflected by an object;
controlling, by a control unit, first imaging to obtain subframes, wherein the first imaging causes the light emitting unit to emit light at a first emission intensity;
determining, by the control unit, an exposure length of an exposure for second imaging, based on the subframes obtained by the first imaging;

determining, by the control unit, a second emission intensity based on the exposure length of the exposure for the second imaging; and controlling the second imaging to obtain a specific frame, wherein
- the second imaging causes the light emitting unit to emit light at the determined second emission intensity, and
- the second emission intensity is lower than the first emission intensity; and calculating, by a calculation unit, a distance of the object, based on the subframes obtained by the first imaging and the specific frame obtained by the second imaging.

\* \* \* \* \*